(12) United States Patent
Champaneri

(10) Patent No.: US 12,322,964 B2
(45) Date of Patent: *Jun. 3, 2025

(54) PROCESS FOR COMPONENTIZING OF ENERGY FLOWS

(71) Applicant: Jayesh Karsandas Champaneri, Los Gatos, CA (US)

(72) Inventor: Jayesh Karsandas Champaneri, Los Gatos, CA (US)

(73) Assignee: Jayesh Karsandas Champaneri, Los Gatos, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 18/301,898

(22) Filed: Apr. 17, 2023

(65) Prior Publication Data

US 2023/0253823 A1 Aug. 10, 2023

Related U.S. Application Data

(63) Continuation of application No. 17/015,349, filed on Sep. 9, 2020, now Pat. No. 11,658,511.

(60) Provisional application No. 62/898,492, filed on Sep. 10, 2019.

(51) Int. Cl.
*H02J 13/00* (2006.01)

(52) U.S. Cl.
CPC .. *H02J 13/00002* (2020.01); *H02J 13/00001* (2020.01); *H02J 13/00006* (2020.01); *H02J 13/00034* (2020.01)

(58) Field of Classification Search
CPC ........... H02J 13/00002; H02J 13/00006; H02J 13/00001; H02J 13/00034
See application file for complete search history.

(56) References Cited

U.S. PATENT DOCUMENTS

| | | | |
|---|---|---|---|
| 11,658,511 B2 * | 5/2023 | Champaneri | H02J 13/00034 702/62 |
| 2008/0177678 A1 * | 7/2008 | Di Martini | G06Q 10/06 705/412 |
| 2019/0237997 A1 | 8/2019 | Tsujii et al. | |

* cited by examiner

*Primary Examiner* — Mohamed Charioui
*Assistant Examiner* — Xiuqin Sun
(74) *Attorney, Agent, or Firm* — Perkins Coie LLP; Alberto Araiza; Adwait Jawale

(57) ABSTRACT

Energy flows are segmented into components for tracking the location of energy consumption and production. Data collected on energy flows is used to create profiles of energy production and consumption over specified time windows for specific clients. Data profiles are also created for an aggregation of clients. The portion of an energy flow that is distributed to each client within an area is calculated. Based on data obtained and portions calculated of the energy flow, incentives are created to encourage energy production and usage in locations that reduce energy losses due to transmission of the energy flow. Aggregated data and feedback information about production and consumption is sent back to clients. Incentives can be in the form of pricing adjustments for both production and consumption during specified time periods.

17 Claims, 43 Drawing Sheets

Equations - Energy Flow: RC7->DTD->SSSB->PSS->GSS
(ref. FIG. 31)

RC7 Energy produced: 150 units (C)

$$150 = r1 \cdot (170)$$
$$+ r1 \cdot r2 \cdot (30)$$
$$+ r1 \cdot r2 \cdot r3 \cdot (30)$$
$$+ r1 \cdot r2 \cdot r3 \cdot r4 \cdot (150)$$

$$150 = \frac{3}{5} \cdot (170) \implies (102)$$
$$+ \frac{3}{5} \cdot \frac{8}{21} \cdot (30) \implies (6.86)$$
$$+ \frac{3}{5} \cdot \frac{8}{21} \cdot 1 \cdot (30) \implies (6.86)$$
$$+ \frac{3}{5} \cdot \frac{8}{21} \cdot 1 \cdot 1 \cdot (150) \implies (34.28)$$

$$150 = \frac{3}{5} \cdot ((170) + \frac{8}{21} \cdot ((30) + (30) + (150)))$$

$$150 = \frac{3}{5} \cdot ((170) + \frac{8}{21} \cdot (210))$$

$$150 = \frac{3}{5} \cdot (170 + 80) = 150$$

FIG. 36

Equations - Energy Flow: RC7->DTD->SSSB->PSS->SSA->DTA->RC3
(ref. FIG. 31)

RC7 Energy produced: 150 units (C)

$$150 = r1 \cdot (170)$$
$$+ r1 \cdot r2 \cdot (30)$$
$$+ r1 \cdot r2 \cdot r3 \cdot (150)$$
$$+ r1 \cdot r2 \cdot r3 \cdot r4 \cdot (50)$$
$$+ r1 \cdot r2 \cdot r3 \cdot r4 \cdot r5 \cdot (110)$$
$$+ r1 \cdot r2 \cdot r3 \cdot r4 \cdot r5 \cdot r6 \cdot (120)$$

$$150 = \frac{3}{5} \cdot (170) \quad \Longrightarrow \quad (102)$$
$$+ \frac{3}{5} \cdot \frac{8}{21} \cdot (30) \quad \Longrightarrow \quad (6.86)$$
$$+ \frac{3}{5} \cdot \frac{8}{21} \cdot 1 \cdot (150) \quad \Longrightarrow \quad (34.28)$$
$$+ \frac{3}{5} \cdot \frac{8}{21} \cdot 1 \cdot \frac{3}{13} \cdot (50) \quad \Longrightarrow \quad (2.64)$$
$$+ \frac{3}{5} \cdot \frac{8}{21} \cdot 1 \cdot \frac{3}{13} \cdot \frac{8}{23} \cdot (110) \quad \Longrightarrow \quad (2.02)$$
$$+ \frac{3}{5} \cdot \frac{8}{21} \cdot 1 \cdot \frac{3}{13} \cdot \frac{8}{23} \cdot 1 \cdot (120) \quad \Longrightarrow \quad (2.20)$$

Equations - Energy Flow: RC3<-DTA<-SSSA<-PSS<-GSS
(ref. FIG. 32)

RC3 Energy consumed: 100 units $$100 = q1 \cdot (90)$$
$$+ q1 \cdot q2 \cdot (50)$$
$$+ q1 \cdot q2 \cdot q3 \cdot (75)$$
$$+ q1 \cdot q2 \cdot q3 \cdot q4 \cdot (25)$$

$$100 = \frac{10}{17} \cdot (90) \implies (52.94)$$
$$+ \frac{10}{17} \cdot \frac{8}{15} \cdot (50) \implies (15.69)$$
$$+ \frac{10}{17} \cdot \frac{8}{15} \cdot 1 \cdot (75) \implies (23.53)$$
$$+ \frac{10}{17} \cdot \frac{8}{15} \cdot 1 \cdot 1 \cdot (25) \implies (7.84)$$

$$100 = \frac{10}{17} \cdot \left((90) + \frac{8}{15} \cdot ((50) + (75) + (25))\right)$$

$$100 = \frac{10}{17} \cdot \left((90) + \frac{8}{15} \cdot (150)\right)$$

$$100 = \frac{10}{17} \cdot (90 + 80) = 100$$

FIG. 41

PROCESS FOR COMPONENTIZING OF ENERGY FLOWS

CROSS-REFERENCE TO RELATED APPLICATIONS

This application is a continuation of U.S. patent application Ser. No. 17/015,349, filed Sep. 9, 2020, which claims the benefit of U.S. Provisional Patent Application Ser. No. 62/898,492 filed Sep. 10, 2019. The aforementioned applications are incorporated herein by reference in their entireties.

TECHNICAL FIELD

The present application is related to energy distribution in a power grid.

BACKGROUND

Traditionally, energy has been produced by a small number of utilities and then distributed across the power grid. Energy production by the utilities can travel large geographic distances from dams, solar arrays and power plants. Energy traveling over large distances can experience energy loss. The energy loss comes from transmission and inefficiencies in the power grid.

Increasingly energy is produced by smaller producers. One example of a small energy producer is a single family home with solar panels on the roof. With recent technologies, these single family homes produce energy to meet their own needs and excess energy that is sold back to the utility and distributed to the grid.

Meters for tracking the energy produced and consumed exist and are used for tracking production and consumption at particular points within the power grid. These meters can read electrical consumption and production over periods of time. The time period can be as small as a fraction of a second.

BRIEF DESCRIPTION OF THE DRAWINGS

The above summarized description of illustrative embodiments of the present invention will be more fully understood upon consideration of the following detailed description and attached drawings, in which like reference numbers denote like system components and/or method steps, as appropriate, and in which:

FIG. 36 shows the equations that map the energy flow and portions of consumption along various domain levels enabling the calculation of the portions of energy consumed at various domain levels.

FIG. 38 shows the equations that map the energy flow and portions of consumption along various domain levels enabling the calculation of the portions of energy consumed at various domain levels.

FIG. 41 shows equations that map the energy provided by various domains to the lowest level client.

DETAILED DESCRIPTION

Figure 1:
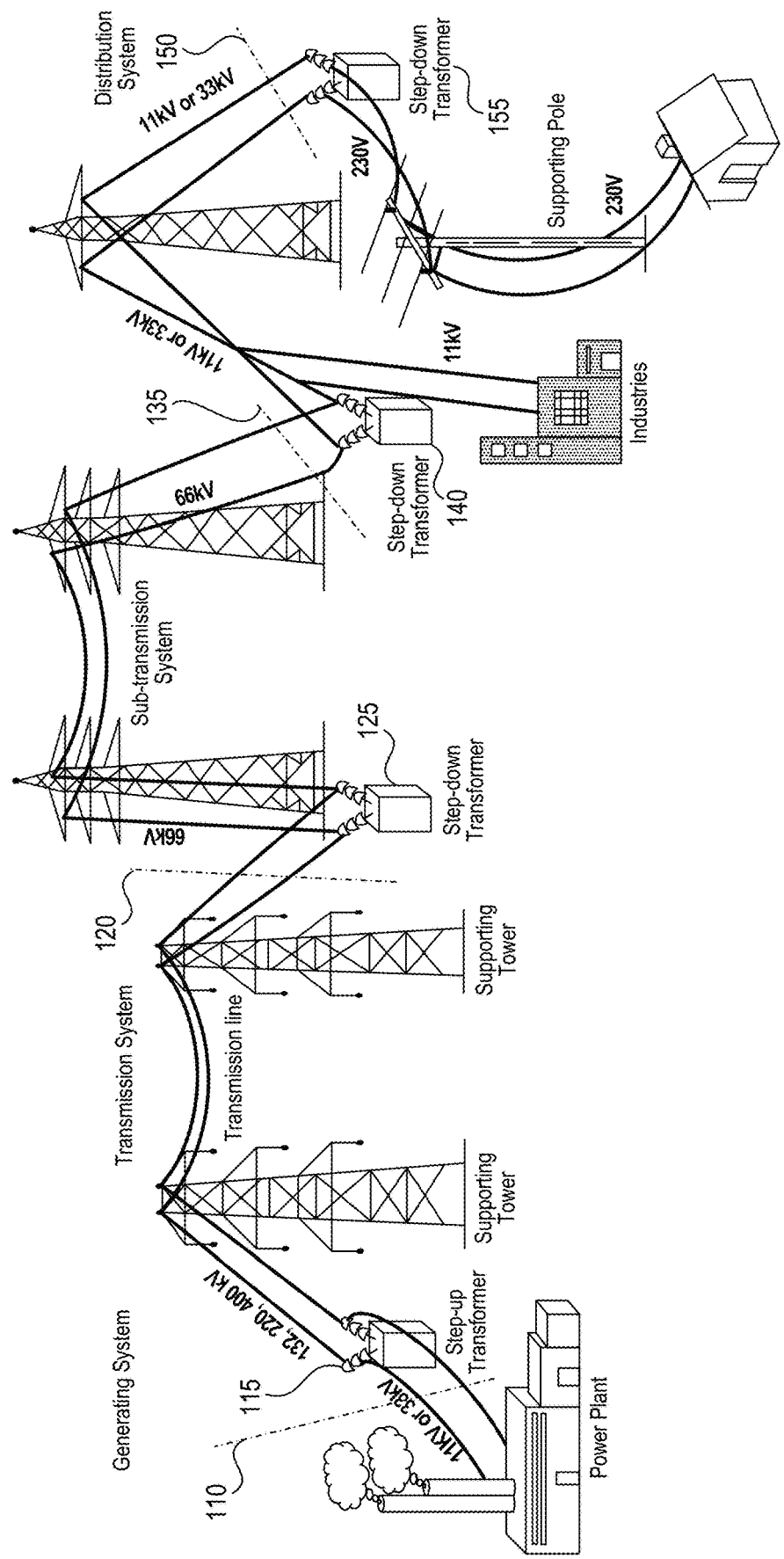
FIG. 1 is a representation of a typical electrical transmission system.

Today energy is produced by small households using solar panels or other methods. These households can sell the energy that they produce back to the utility who then sells that energy to their customers. Once the energy is sold back on to the grid there is not a way to determine where the energy is distributed. The energy could be sold to the next door neighbor of the household producing the energy or to a household many miles away.

A method for determining where the produced energy is consumed is described below. An electric power grid is divided into areas called domains. These areas are generally divided by the amount of impedance that energy passing through the domains would experience. The energy consumed and produced by each client within the domain is measured. Then with that data a determination of what fraction of the energy produced by an individual client is distributed to clients within the domain and each higher level domain. Feedback values are generated with this information to encourage production that will be distributed to fulfill local energy needs within the domain. Also, with feedback about energy use and production within the domain pricing of consumed and produced energy can be modified to encourage local production and consumption.

Relevant Terminology

Non-end nodes—nodes that have more than one link connected to the node, examples of non-end nodes might be distribution transformers, secondary substations, and primary substations.

End nodes or leaf nodes—nodes with only one link connected to the node. A special case root node can also have just one link connected to it.

PCC—Point of Common Coupling, typically between a generating facility and the electric system.

Domain—a grouping of nodes that are electrically connected. The domains are organized into a hierarchy.

"Primaries of" and "secondaries of"—these terms refer to transformer connections on the primary windings and secondary windings, respectively. Transformers are mainly used to step up or step down the voltages as needed and in some instances are used for electrically isolating the circuits on the primary and secondary side.

PV cells or arrays—photovoltaic cells or arrays also known as PVs or solar arrays.

Meter—Unless otherwise noted, the term meter refers to the energy meter that measures both the energy produced by a client and the energy consumed by a client.

Distance—distance does not necessarily mean physical distance. Here the meaning of distance is the amount of impedance or resistance that energy needs to pass through from one point to another. For example, low efficiency transformers or switches may have higher impedance or resistance, and hence a larger distance. In some cases, the physical distance can correlate to impedance. For example, very long transmission lines can have a higher impedance than shorter transmission lines. The greater the distance that energy needs to travel, the higher the loss of energy. Energy is lost typically as heat, vibration and/or noise.

Electrical distance—Same as "Distance" defined above. Electrical distance represents or correlates to the amount of the loss of energy when energy is moved from a given point to another point. A greater distance corresponds to greater energy losses, a shorter distance corresponds to smaller energy losses, in a given period of time.

"Electrically close" or "Electrically far"—the terms "electrically close" or "electrically far" here represent the amount of energy loss in a given period of time based on electrical distance or impedance.

RCx—represents any one of an end leaf node client, RC1 through RC11, in the Figures.

DTy—represents any one of the distribution transformers, DTA through DTF, in the Figures.

Service Area—the area under the purview of one or more utility companies. Within the service area the utility company provides energy, energy transmission, and generation infrastructure support and maintenance.

Client energy information—Information related to energy, such as the amount of energy that flowed through the metering device, the time period the direction of energy flow and the periodic time window of the energy flow. If energy flows into the client, then the client is consuming energy. If energy flows out of the client, then the client is producing energy.

Constituent or componentized flows of energy—the flows of energy when more than one energy source is present or when the flow of energy from the source is split and delivered to more than one consumer.

Dot Multiplication symbol—in the equations presented, the dot in the middle (·) indicates multiplication just like the (x). Both multiplication symbols are used and denote that the values to the left and the right of the symbol should be multiplied.

Time window, time slot, sampling window, periodic time window—all these are meant to be equivalent terms representing the duration of time between each reading of energy consumed or produced at the energy metering device.

In the electrical grid system used for servicing a geographic area, typically, power is generated at one or more locations and then distributed through transmission lines and transformers to end user clients.

About 5% of energy is lost in transmission and distribution (see https://www.eia.gov/tools/faqs/faq.php?id=105&t=3). The advancement made in this embodiment provides a framework and method to reduce the transmission and distribution losses given the increasing advent and deeper penetration of client level energy production and storage.

In one illustrative embodiment, data regarding energy produced or consumed by clients is measured at the same instant across all clients in a given service area. From this information the amount of energy flowing through key interconnect points or nodes is determined for each periodic time window.

In one illustrative system, the calculation of the amount of energy flow and other calculations described in detail below, can be performed at suitable time periods much larger than the measurement, collection and storage during the time window above.

One or more producers of energy for a given consumer client are determined, and one or more consumers of energy for a producer client are determined. Energy consumed by a client may be received wholly or in part from producers that are "electrically close" to the consumer client or "electrically far" from the consumer client. Similarly, energy produced by a client may have consumer clients that are "electrically close" or "electrically far." The least amount of energy is lost when consumers and producers are "electrically close" to each other.

According to the proposed model, the cost to the consumer for the energy will depend on the electrical distance or impedance experienced by the energy flow between the producer and the consumer. Likewise, the revenue for the energy producer will depend on the electrical distance to each of the consumer clients.

In the present embodiment, the topology of the electrical grid system is subdivided into hierarchical zones or domains. The term "domain" will be used in the rest of the description of this embodiment to refer to the topological subdivisions.

According to one embodiment, at the lowest subdivision a domain consists of a group of clients (residential, business, industrial clients, etc.) connected to a distribution transformer (DT). The point of connection where the group of clients connect to the distribution transformer is known as the Point of Common Coupling, or PCC. This group of clients together with the distribution transformer is defined as a domain.

One or more distribution transformers are connected to the next higher-level transformer such as a secondary substation transformer (SST). Similarly, the connection point on the secondary substation transformer is the PCC. The DTs connecting to the PCC at the SST form the next higher-level domain. This domain encompasses the lower level domains comprised of a DT and its respective clients.

The SSTs are further connected to the transformer known as primary substation transformers (PST) at the PCC. The group of SSTs with their DTs and clients form the next higher-level domain, the PST with its SSTs, DTs and clients form the next higher-level domain and so forth until the topmost domain is defined that encompasses all of the lower level domains and hence all of the clients in the service area.

Generally, most clients are connected to the PCC at the DTs, some large clients such are industrial clients or heavy industry clients (HIC) may be connected directly to the PCC of SST or the PCC of PST.

Some clients have a dual role as consumers and producers of energy. The clients may produce energy with PVs or solar arrays. From the point of view of the PCC or the view from "in front of the meter," such a client can be either an energy producer or consumer at any given point in time. Behind the meter, the client can be a producer and consumer of energy at the same time. For instance, a client may produce energy in excess of its needs whereby it not only consumes the energy it needs, but also puts excess energy out to the grid via the meter resulting in net energy production from the view of in front of the meter. Some clients who are energy consumers during certain times, may have energy storage capabilities, with or without solar arrays, such as battery storage or other means. These clients can also be energy producers when they put energy out on the grid from their storage device. Some clients are purely energy storage devices such as large arrays of batteries tied to the grid that act as energy consumers when storing the energy and as energy producers when putting energy out on the grid.

The net energy produced or consumed by a domain is calculated, within a given periodic time window, based on the energy consumed or produced by clients in a given domain. Similarly, energy consumed or produced by one or more next higher-level domains is calculated, up to the topmost domain. From these calculations, the quantities of energy produced by each of the source clients for a given consumer client are determined. Specifically, for a specific client domain the quantities of energy for the source domains are calculated. Likewise, the quantity of energy consumed by each of the consumer clients for a given producer client is determined.

In an alternative embodiment, a more specific granular breakdown of energy produced by the sources for a given consumer can be performed if needed. This will be described in more detail below.

The constituent flows of energy from producers in different hierarchical domains for a given consumer as the energy crosses the domain boundaries, is intended to be priced as follows—

$$PrCD_3 < PrCD_2 < PrCD_1 < PrCD_0,$$

Where the smaller suffix number corresponds to the topmost domain, for example $PrCD_0$ corresponds to the topmost domain, while $PrCD_3$ corresponds to the lowest domain. The lowest domain corresponding to the lowest price and the highest domain corresponding to the highest price. The breakdown of the nomenclature is as follows: Pr for price, C for consumer and Dx for the domain level x.

Likewise, the constituent flows of energy to consumers in different hierarchical domains from a given producer as the energy crosses the domain boundaries, is intended to be priced as follows—

$$PrPD_3 > PrPD_2 > PrPD_1 > PrPD_0,$$

Where the smaller suffix number corresponds to the topmost domain, for example $PrPD_0$ corresponds to the topmost domain, while $PrPD_3$ corresponds to the lowest domain. The lowest domain corresponding to the lowest price and the highest domain corresponding to the highest price. The breakdown of the nomenclature is as follows: Pr for price, P for producer and Dx for the domain level x.

As more energy traverses through more electrical grid components such as transformers and transmission lines, more losses occur in the form of heat and electromagnetic vibrations in transformers. These losses are referred to as electrical distance or impedance. These losses stress the system and lead to a reduced lifespan for the components, thereby increasing grid maintenance needs. With the system and method provided in this description, the maintenance entity of the electric grid can obtain its revenue based on the distance traversed by energy. A pricing structure indicated above helps facilitate a "distance-based" pricing. The embodiment described here enables such a pricing structure.

Energy profiles presented to each client at the individual client levels and at the domain levels as needed, provide a feedback mechanism to tune or adjust energy production or consumption amounts in the periodic time windows to reduce the price of energy for the consumer client and increase the selling price for the energy produced by the producer, thereby creating an incentivizing tool for both the energy consumer and producer.

Such a feedback mechanism to tune or adjust energy production or consumption amounts and the time windows for those amounts can be done either manually or using one or more of the devices and components behind the meter that produce, store and consume energy. The feedback mechanism can either provide a separate system of energy monitoring and control of such various devices and components, or, program the devices themselves to the extent the devices lend themselves to being programmed, or a combination of both and with or without programmatic machine learning techniques. Such a feedback mechanism may have the ability to predict what future energy profiles will be based on past profiles and adjust consumption and production accordingly.

FIG. 1 shows a simplified example of the electrical energy transmission system from energy generation in the power plant 105 to energy consumers in the form of an industrial client 145 and a residential home 160. The energy is carried through transmission lines 130 and various step-up and step-down transformers 115, 125, 140 and 150. Starting from the power plant 105, the first transformer 115 is the step-up Grid Substation transformer (GSS) that boosts the voltage, to lower the losses for long distance energy transmission. Closer to the region or regions of distribution, the transmission line 130 connects to a step-down Primary Substation transformer (PSS) 125 for a more localized regional distribution. Further into the individual region or regions, the voltage is further stepped down to intermediate levels through yet another step-down transformer 140 also known as a Secondary Substation transformer (SST) for distributing energy directly to the industrial client 145 or residential homes in localized neighborhoods in the region. For final distribution of energy into homes or small businesses, the voltage is further reduced to the levels suitable for residential homes 160 and small businesses via the step-down Distribution transformer (DT) 155.

FIG. 1 also shows virtual demarcation lines 110, 120, 135 and 150. These demarcation lines denote the separation between domains. The domains are organized in hierarchical levels. The hierarchical levels are Level 0 which is below demarcation line 110, containing the power plant 105, Level 1 is in between demarcation lines 110 and 120, Level 2 is in between demarcation lines 120 and 135, Level 3 which is in between demarcation lines 135 and 150, and Level 4 which is above demarcation line 150, containing the residential home 160.

Such an electrical energy transmission system comprising of grid level power plants with various step-up and step-down transformers, can be represented as managed by a grid management entity (GME), where the GME may be comprised of one or more sub-entities in the form of partners or collaborators, together responsible for ensuring reliable provision of energy to the end clients. The end clients may be producers of electricity via power plants or solar arrays and may have energy storage devices as illustrated below. Such a GME (or sub-entity within the GME) may be responsible for the overall grid reliability, resiliency and maintenance of the grid.

Figure 2:
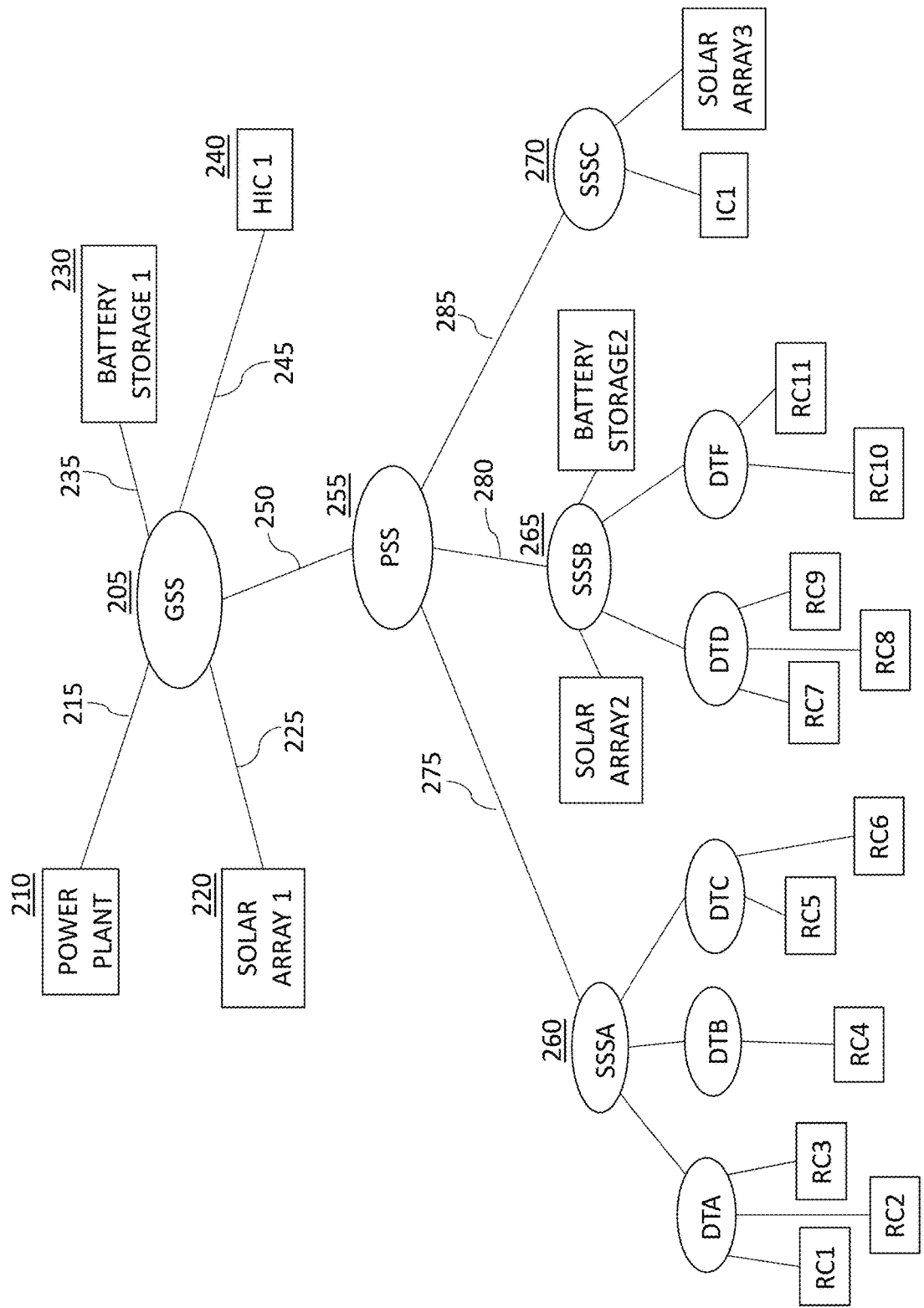
FIG. 2 is a representation of the components of a power grid consisting of substations, transformers, transmission lines, and energy consumers and producers.

FIG. 2 illustrates a representation of an electrical grid system. At the top of the hierarchy is the Grid Substation Transformer (GSS) 205 whose primary lines are connected to energy sources such as the power plant 210 via electric link 215, a high capacity grid level solar array (SOLAR ARRAY 1) 220 via electric link 225, a high capacity grid storage device (BATTERY STORAGE 1) 230 via electric link 235, and a Heavy Industry Client (HIC 1) 240 via electric link 245. Note that in practice an HIC connecting to the GSS 205 would be rare. However, it is presented here merely to illustrate possible configurations.

The GSS 205 is connected via electric link 250 to the Primary Sub-Station (PSS) 255. The PSS 255 is electrically linked to the Secondary Substation transformers SSSA 260, SSSB 265, and SSSC 270 via electric links 275, 280, and 285, respectively.

Figure 3:
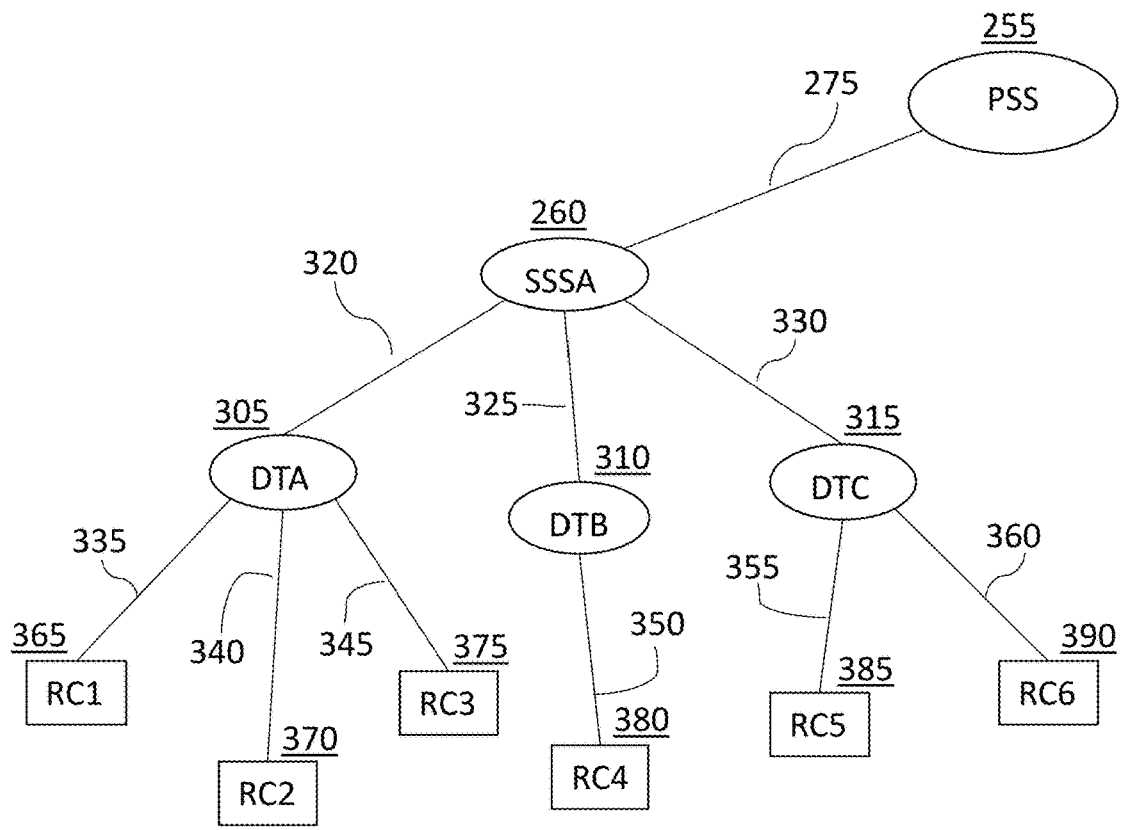
FIG. 3 illustrates an embodiment of a configurations of nodes containing a selection of substations, transformers, energy producers and energy consumers.
Figure 4:
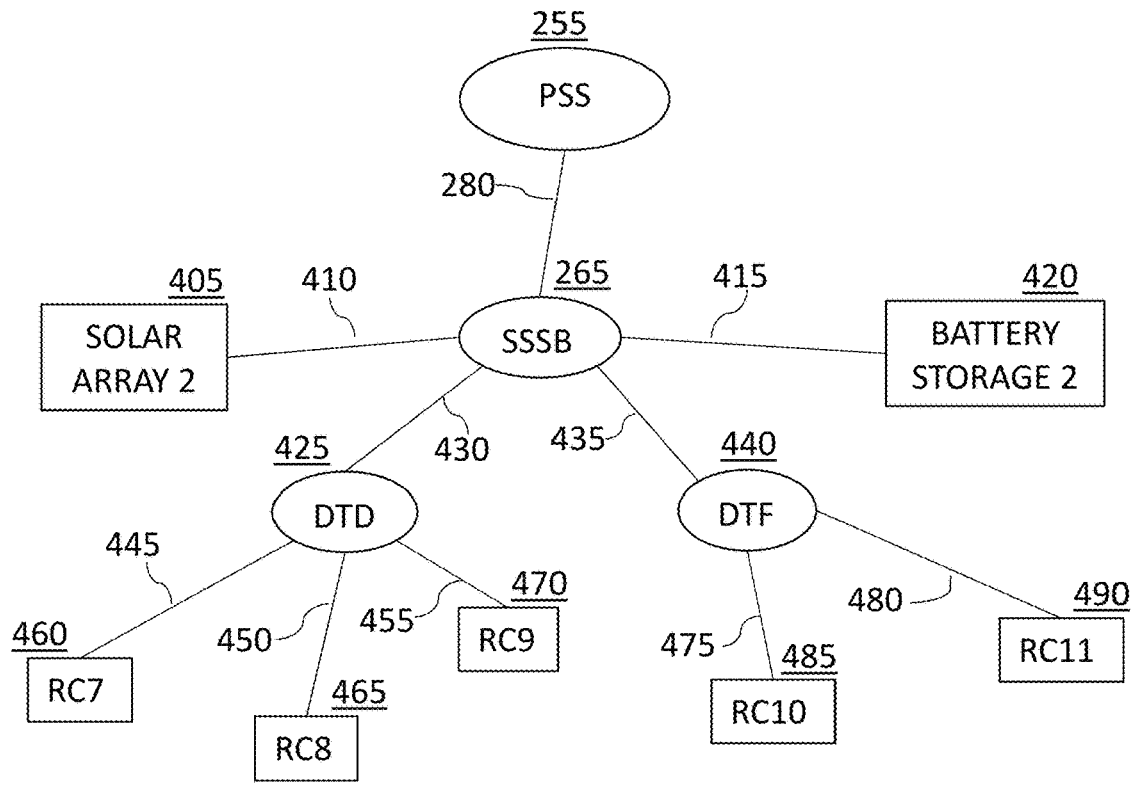
FIG. 4 illustrates an embodiment of a configurations of nodes containing a selection of substations, transformers, energy producers and energy consumers.
Figure 5:
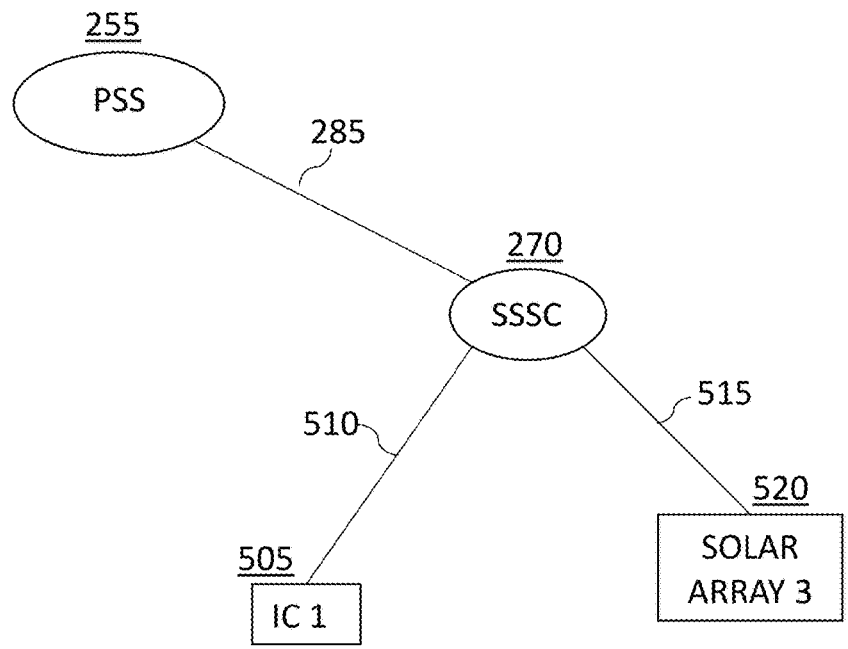
FIG. 5 illustrates an embodiment of a configurations of nodes containing a selection of substations, transformers, energy producers and energy consumers.

FIGS. 3-5 show examples of variations of the kind and number of clients supported via Secondary Substation transformers (SSTs). Many other such variations may exist.

FIG. 3 shows one possible configuration of nodes containing a selection of substations, transformers, energy producers and energy consumers. The nodes are arranged around SSSA 260. The electrical link 275 connecting SSSA 260 to the PSS 255 is depicted as well as the electrical links 320, 325, and 330 between the SSSA 260 and the Distribution Transformers DTA 305, DTB 310, and DTC 315. DTA 305, DTB 310, and DTC 315 are connected to residential or small business clients RC1 365, RC2 370, RC3 375, RC4 380, RC5 385, and RC6 390 by respective electric links 335, 340, 345, 350, 355, and 360. RC1 365, RC2 370, RC3 375, RC4 380, RC5 385, and RC6 390 are consumers or producers of energy. Some DTs are connected to multiple clients such as DTA 305 and DTC 315. Some distribution transformers such as DTB 310 may be connected by an electric link 350 to a single client, RC4 380, which may be a very large home or business.

FIG. 4 shows one possible configuration of nodes containing a selection of substations, transformers, energy producers and energy consumers. SSSB 265 is connected to the PSS 255 by electrical link 280. SSSB 265 is electrically linked to DTD 425 and DTF 440 by electric links 430 and 435, respectively. DTD 425 is further connected to clients RC7 460, RC8 465, and RC9 470 with electric links 445, 450, and 455 and DTF 440 is further connected to RC10 485, and RC11 490 with electric links 475 and 480. SSSB 265 also has a solar array client (SOLAR ARRAY 2) 405 and a storage device client (BATTERY STORAGE 2) 420 connected to SSSB 265 by electric links 410 and 415, respectively. The solar array client SOLAR ARRAY 2 405 and storage device client BATTERY STORAGE 2 420 that are connected to SSSB 265 are typically large grid level solar arrays and storage devices. They may be managed and operated by the GME or by a third-party business client in the business of producing and storing energy.

Figure 6:
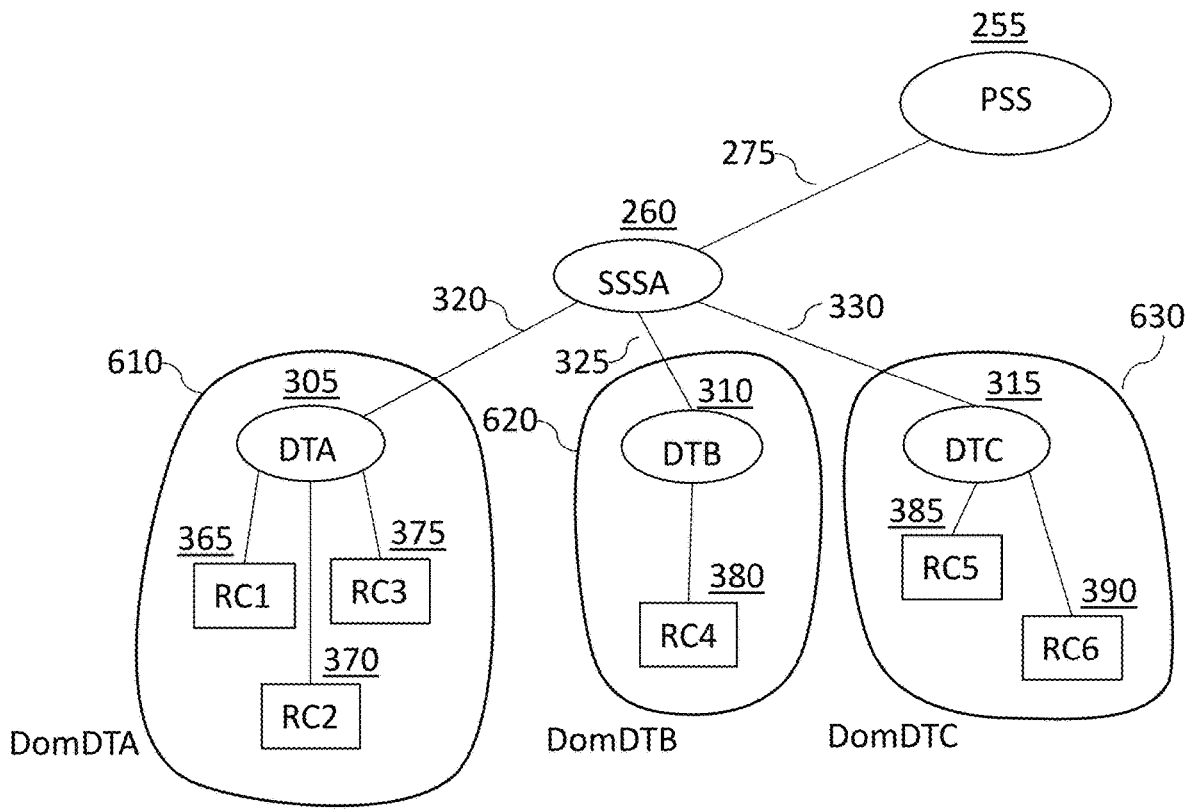
FIG. 6 illustrates an embodiment of enclosed boundaries signifying domains.

FIG. 5 shows one possible configuration of nodes containing a selection of substations, transformers, energy producers and energy consumers. In FIG. 5 the Secondary Substation transformer SSSC 270 is not connected to a DT, but rather to a large solar array (SOLAR ARRAY 3) 520 and to an industrial client (IC1) 505 via electric links 510 and 515, respectively. SSSC 270 is also connected to the PSS by 255 by electric link 285. FIG. 6 shows virtual boundaries 610, 620 and 630 encompassing DTA 305, DTB 310 and DTC 315 and their respective clients. These virtual boundaries represent domains. The domain surrounding DTA 305 is DomDTA 610 and is signified by a boundary line and contains DTA 305, RC1 365, RC2 370 and RC3 375. The domain surrounding DTB 310 is DomDTB 620 and is signified by a boundary line and contains DTB 310 and RC4 380. The domain surrounding DTC 315 is DomDTC 315 and is signified by a boundary line and contains DTC 315, RC5 385, and RC6 390. These virtual boundaries are similar to the boundary line 167 (Level 3) illustrated in FIG. 1. This virtual boundary is representative of a domain. Domains are identified below with a prefix "Dom" followed by the transformer name, substation name, or primary substation name. In this embodiment, the transformer is also a parent node to the child or leaf nodes below it, which may be other transformers (parent nodes). That is, the domain encompassing DTA 305 and its child nodes RC1 365, RC2 370 and RC3 375 is named as DomDTA 610. A domain containing a child node and a distribution transformer is at a lower level than a domain containing a child node, a distribution transformer, and a substation transformer.

Figure 7:
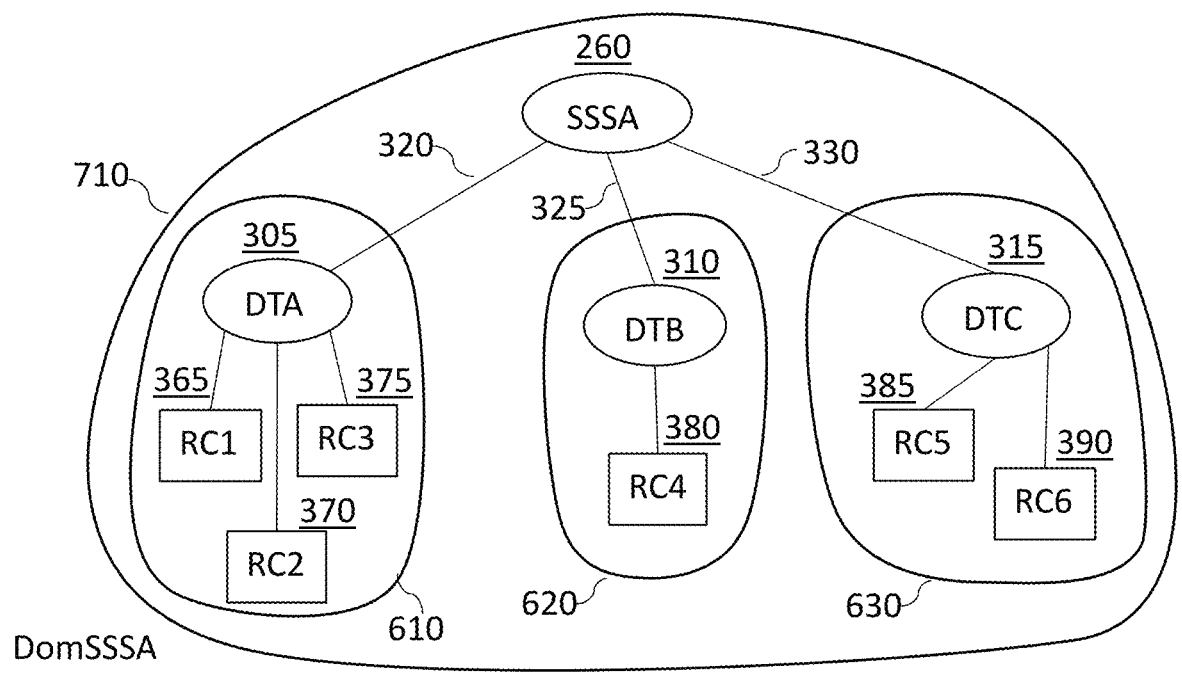
FIG. 7 illustrates an embodiment of enclosed boundaries signifying domains.

FIG. 7 shows the domain DomSSSA 710 comprised of SSSA 260 and the surrounding domains DomDTA 610, DomDTB 620, and DomDTC 630. Hierarchically, the domain DomSSSA 710 encapsulating SSSA is a higher level domain than the domains DomDTA 610, DomDTB 620 and DomDTC 630.

Figure 8:
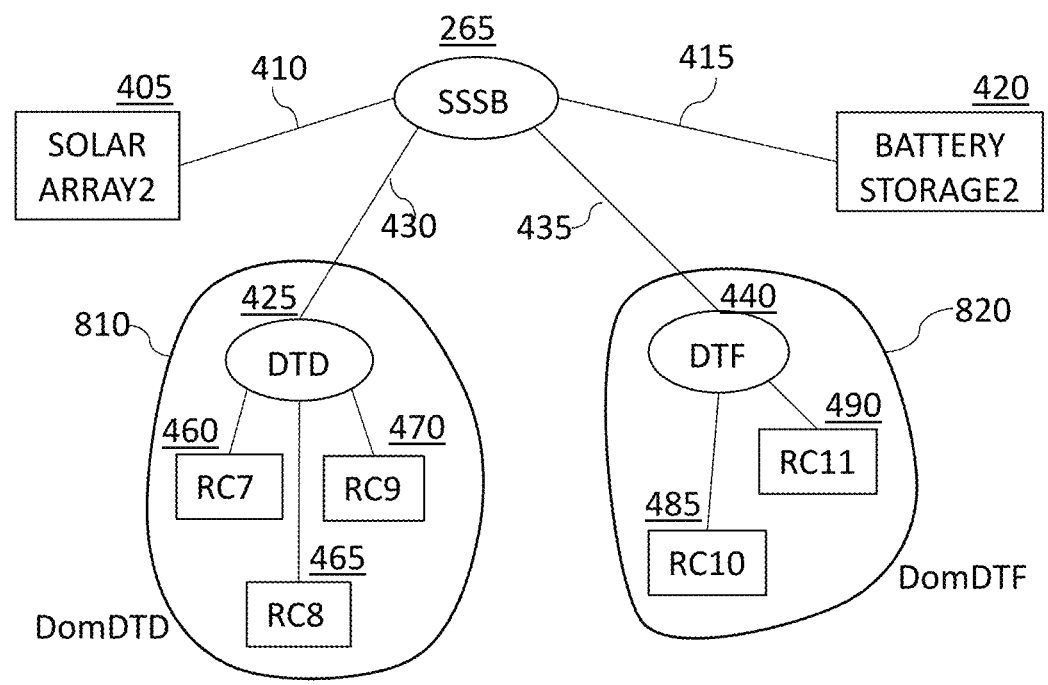
FIG. 8 illustrates an embodiment of enclosed boundaries signifying domains.

FIG. 8 shows the domains of transformers DTD 425 and DTF 440 that are electrically linked to SSSB 265 by respective electric links 430 and 435. DomDTD 810 encompasses DTD 425, RC7 460, RC8 465, and RC9 470 and the respective electrical links 460, 465, and 470 between DTD 425 and RC7 460, RC8 465, and RC9 470. DomDTF 820 encompasses DTF 440, RC10 485 and RC11 490 and the respective electrical links 485 and 490 between DTF 440 and RC10 485 and RC11 490.

Figure 9:
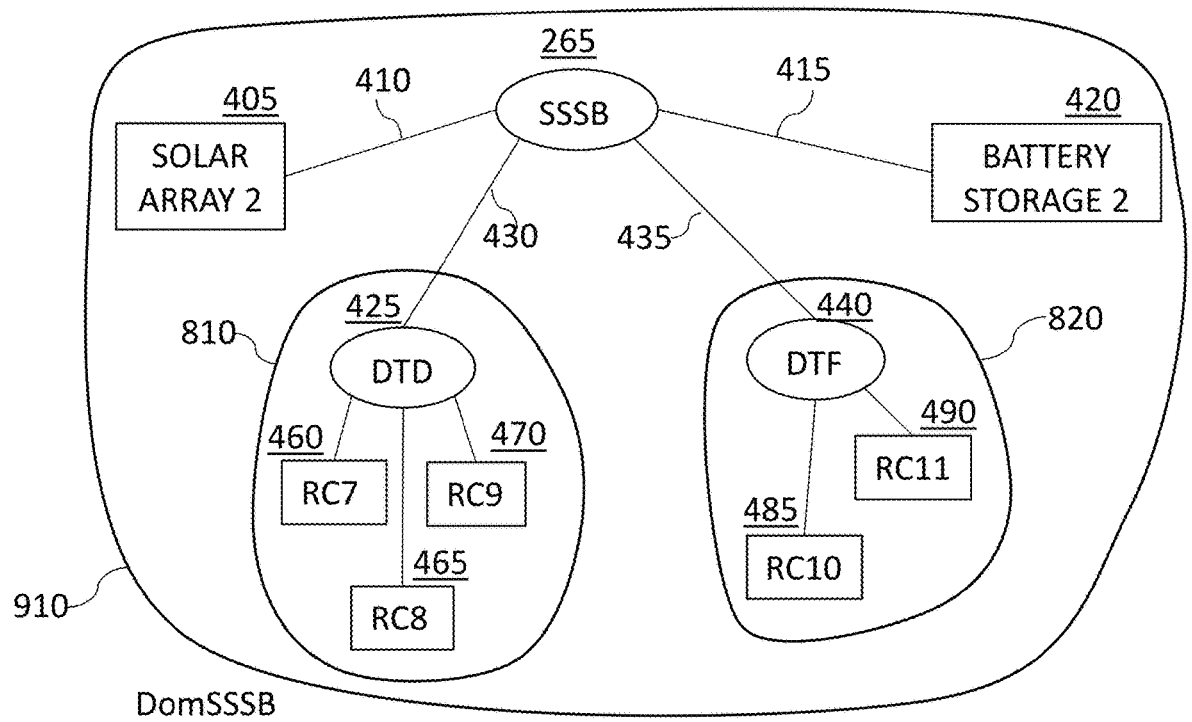
FIG. 9 illustrates an embodiment of enclosed boundaries signifying domains.

FIG. 9 shows the domain surrounding SSSB 265, DomSSSB 910. DomSSSB 910 is one level higher than DomDTD 810 and DomDTF 820 shown in FIG. 8. In addition to encompassing DomDTD 810 and DomDTF 820, DomSSSB 910 also encompasses SOLAR ARRAY 2 405 and BATTERY STORAGE 2 420.

Figure 10:
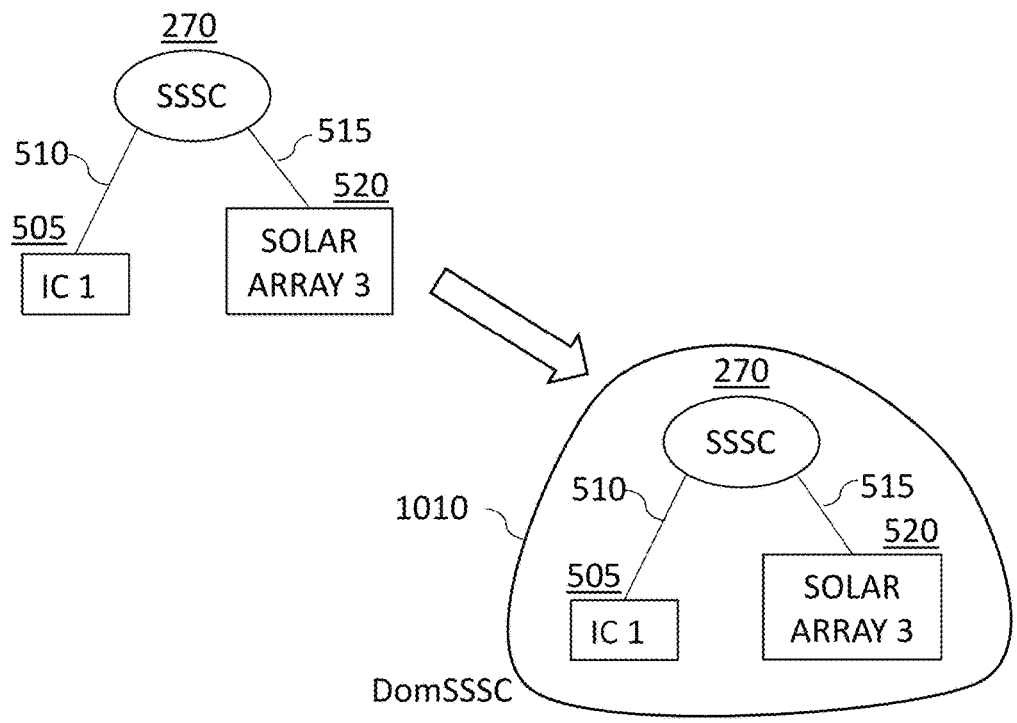
FIG. 10 illustrates an embodiment of enclosed boundaries signifying domains.

FIG. 10 shows how SSSC 270 is separated into a domain, DomSSSC 1010. DomSSSC 1010 encompasses SSSC 270, IC 1 505 and SOLAR ARRAY 3 520.

Figure 11:
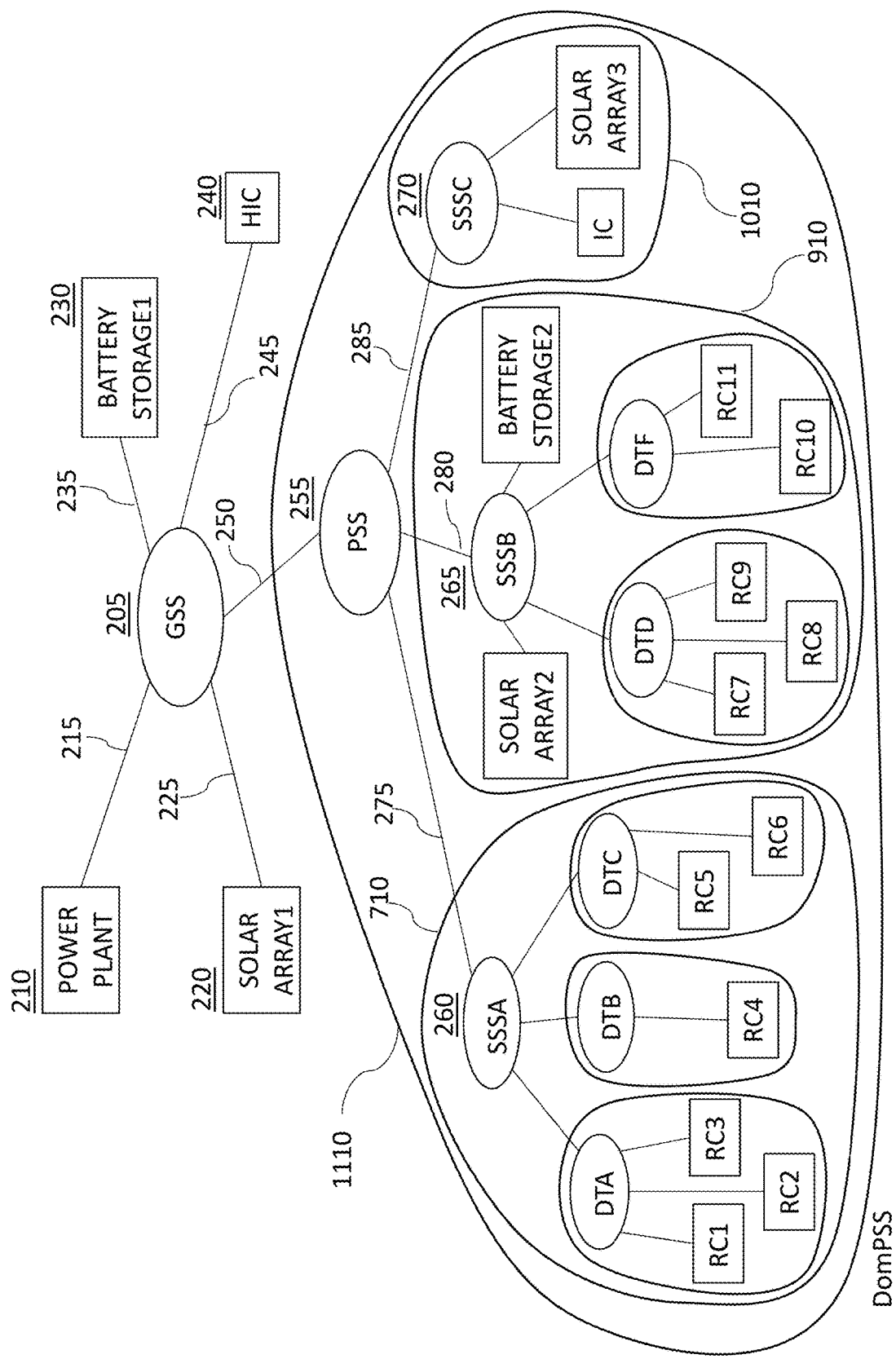
FIG. 11 illustrates an embodiment of enclosed boundaries signifying domains.

FIG. 11 shows the further domain encapsulation of PSS 255, this domain is DomPSS 1110. Dom PSS 1110 encapsulates the Primary Substation transformer PSS 255 and the Secondary Substation transformers SSSA 260, SSSB 265, and SSSC 270 and their clients via Distribution transformers or direct connection.

Figure 12:
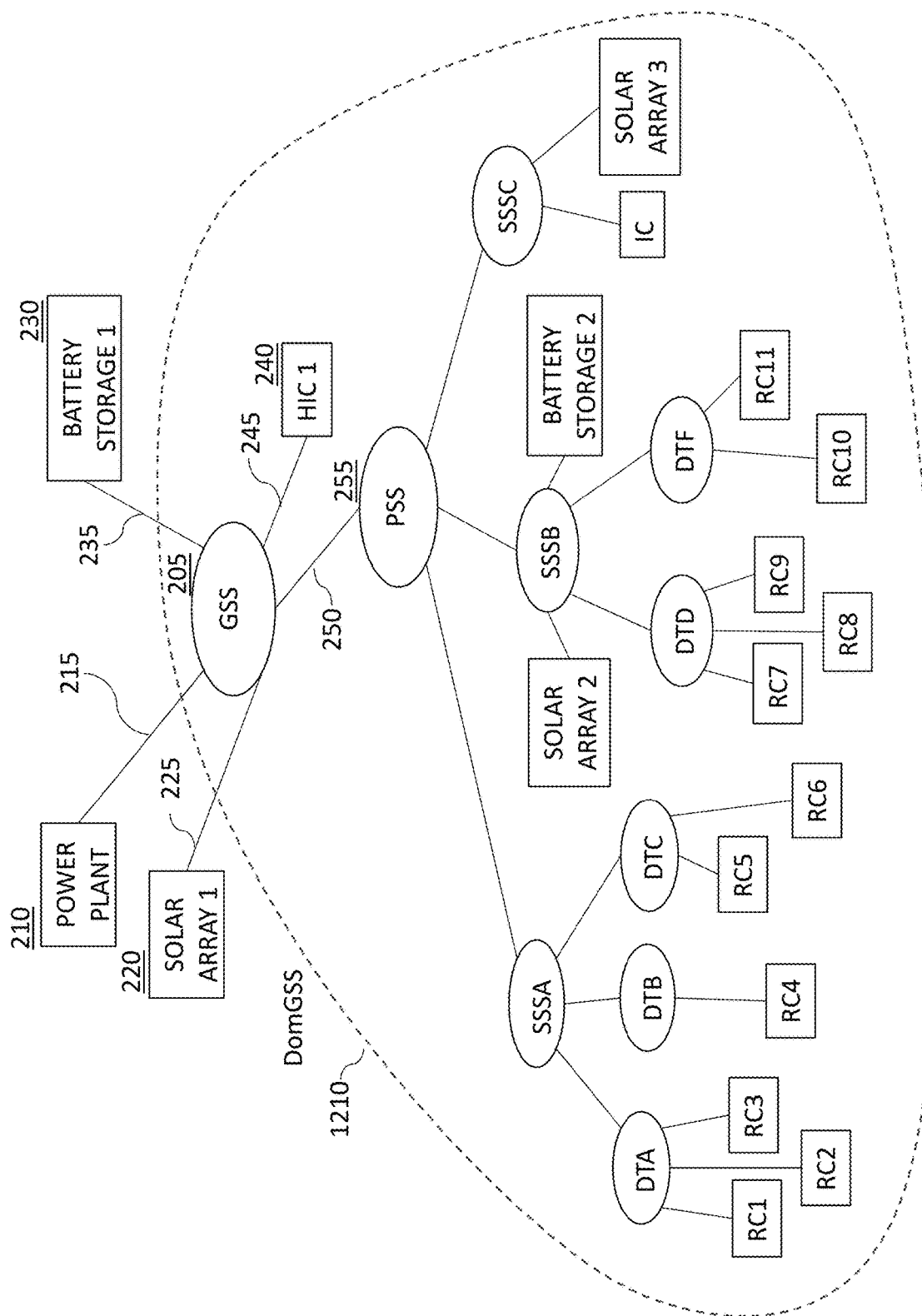
FIG. 12 illustrates an embodiment of enclosed boundaries signifying domains.

FIG. 12 shows the domain encapsulation, DomGSS 1210, that includes the step-up Grid Substation transformer GSS 205, a heavy industry client HIC 1 240 and PSS 255 and all of its clients. The domain encapsulation DomGSS 1210 in this Figure is shown as a dashed line to visualize this domain level. Power Plant 210, Solar Array 1 220, and Battery Storage 1 230 are also connected to the GSS 205 but are not part of DomGSS 1210.

Figure 13:
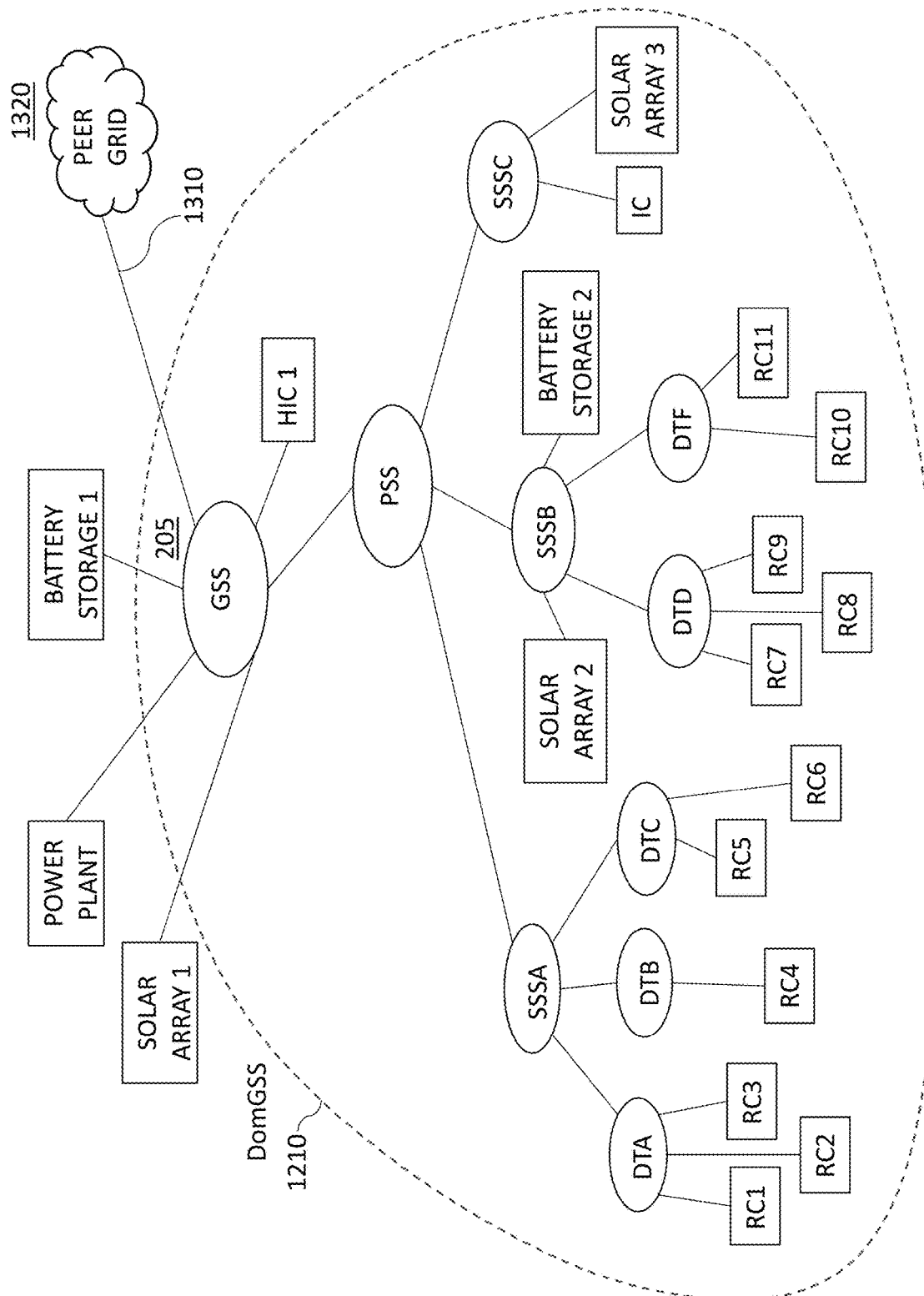
FIG. 13 illustrates an embodiment of enclosed boundaries signifying domains.

In FIG. 13, GSS 205 has an additional electric connection 1310 to a Peer Grid 1320 at an equivalent point in the other Peer Grid 1320 (not shown). The electrical connection 1310 to the peer grid 1320 is illustrated to show that such a connection can act as another provider of energy to the domain DomGSS 1210 indicated here, or appear as a consumer of energy to DomGSS 1210. However, it will not be used in any energy flow calculations in the examples cited here, since at this level the control is with the GME. That does not limit or diminish the system and method capabilities in this disclosure. However, in practice if need be, energy flow calculations as described in this disclosure can be performed with proper metering of the different devices.

Figure 14:
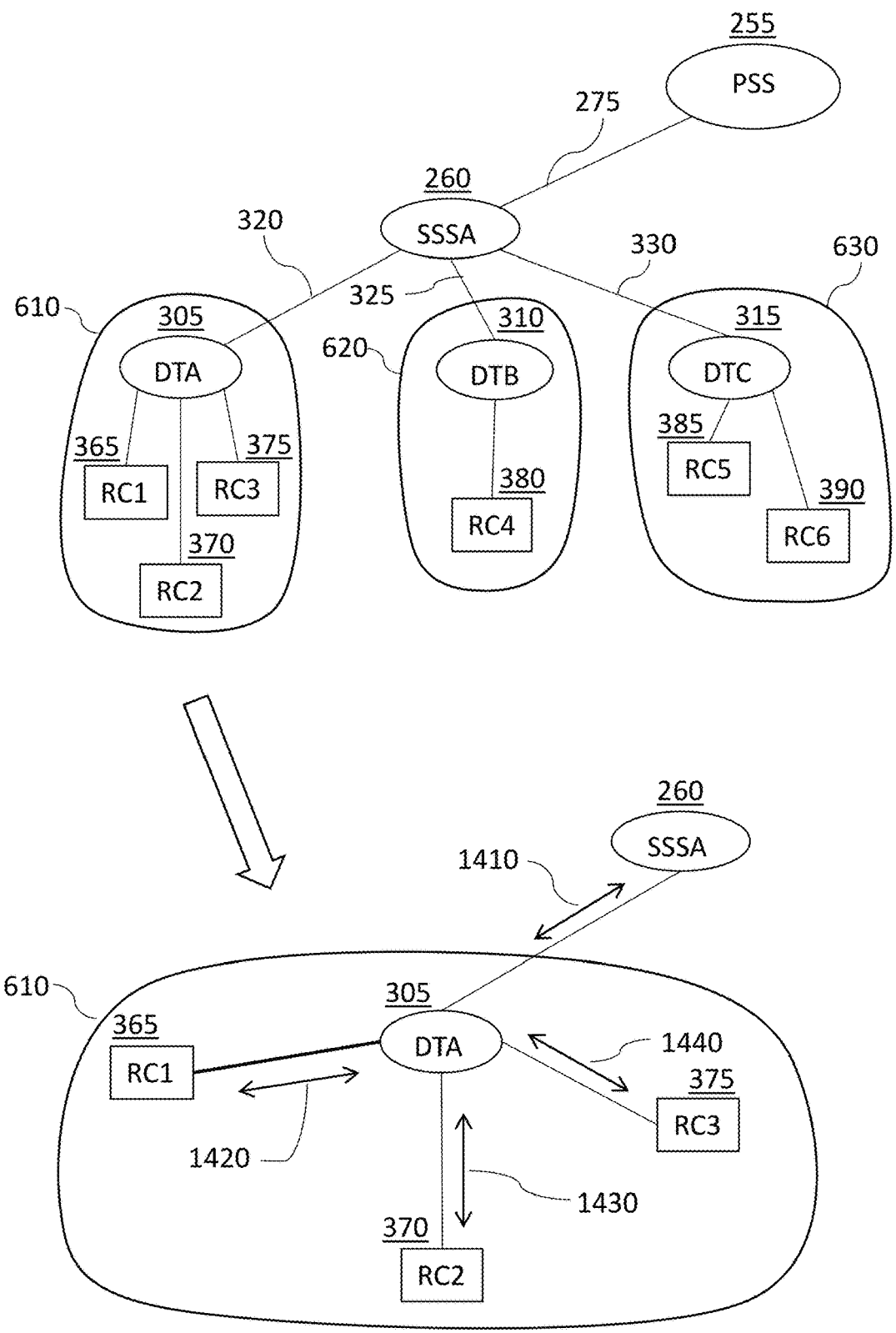
FIG. 14 shows the bidirectional energy flow between the domain and the parent node and between the transformer node and the leaf nodes within the domain.

FIG. 14 illustrates as an example the energy flows 1410, 1420, 1430, and 1440 between DTA 305 and the end node clients RC1 365, RC2 370 and RC3 375. Energy flow between any two connection points can flow in either direction. The end node clients can be consumers of electrical energy or producers via solar arrays or stored energy. The net result of energy in the domain DomDTA 450 and its end node clients RC1 365, RC2 370 and RC3 375, can flow 1410 in or out of the domain to SSSA 260. At any given instant in time, energy can only flow in one direction between any two nodes.

It is also possible for the net result of energy within an encapsulated domain to be zero. That is, all energy produced within the domain by the end node clients is completely consumed by other end node clients. If there is excess energy in the domain, then the excess energy will move out to the next higher-level domain, such as to the transformer that it is connected to.

Figure 15:
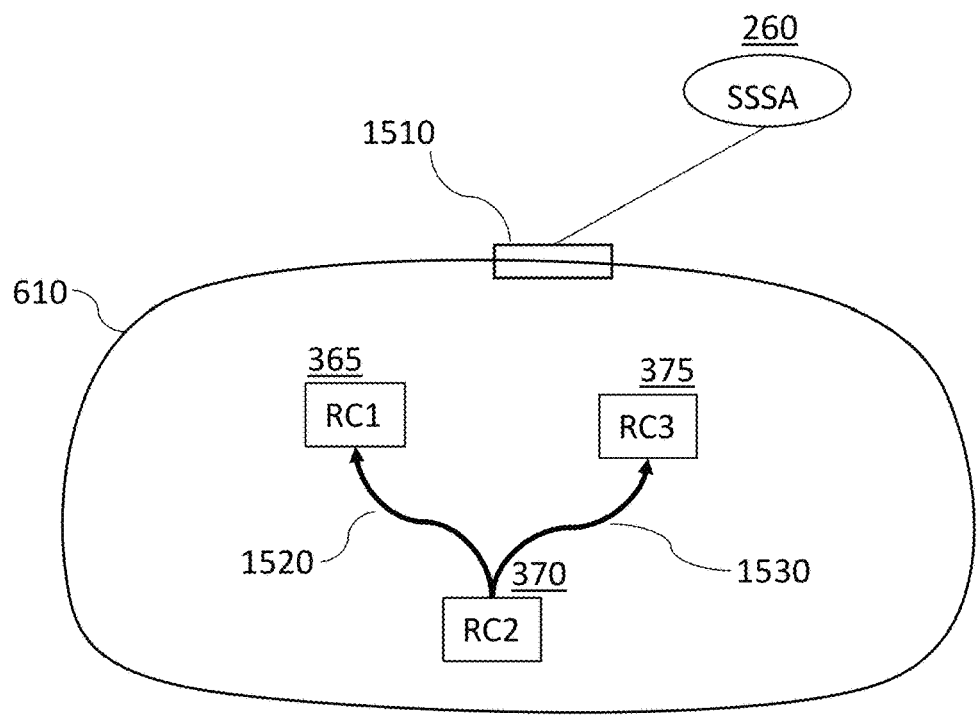
FIG. 15 shows an embodiment of the domain boundary and energy flow between the leaf nodes, the domain boundary and the parent node.

FIGS. 15-21 illustrate some of the scenarios of energy movement that can occur. In FIG. 15 the rectangular box 1510 shown at the domain boundary is a representation of the PCC for the Distribution transformer DTA 305. Inside of the domain boundary 610 the end node clients RC1 365, RC2 370 and RC3 375 are connected to the transformer. The Distribution transformer DTA 305 is connected to the SSSA 260 by the PCC 1510. FIG. 15 shows RC2 370 distributing energy to RC1 365 and RC3 375 within their domain DomDTA 610. Energy flow 1520 from RC2 370 to RC1 365 and energy flow 1530 from RC2 370 to RC3 375 are shown.

Figure 16:
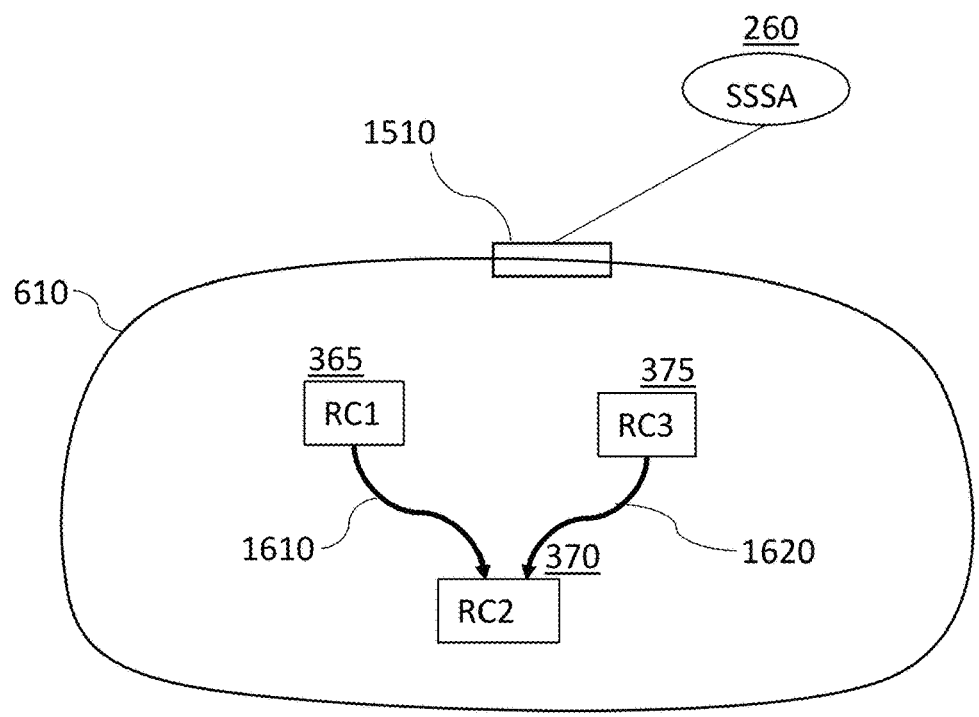
FIG. 16 shows an embodiment of the domain boundary and energy flow between the leaf nodes, the domain boundary and the parent node.

FIG. 16 shows one potential scenario of energy flows within DomDTA 610. Energy flow 1610 travelling from producer RC1 365 to consumer RC2 370 and energy flow 1620 from RC3 375 to RC2 370. Here the energy produced by RC1 365 and RC3 375 is consumed within the domain DTA 610 at RC2 370.

Figure 17:
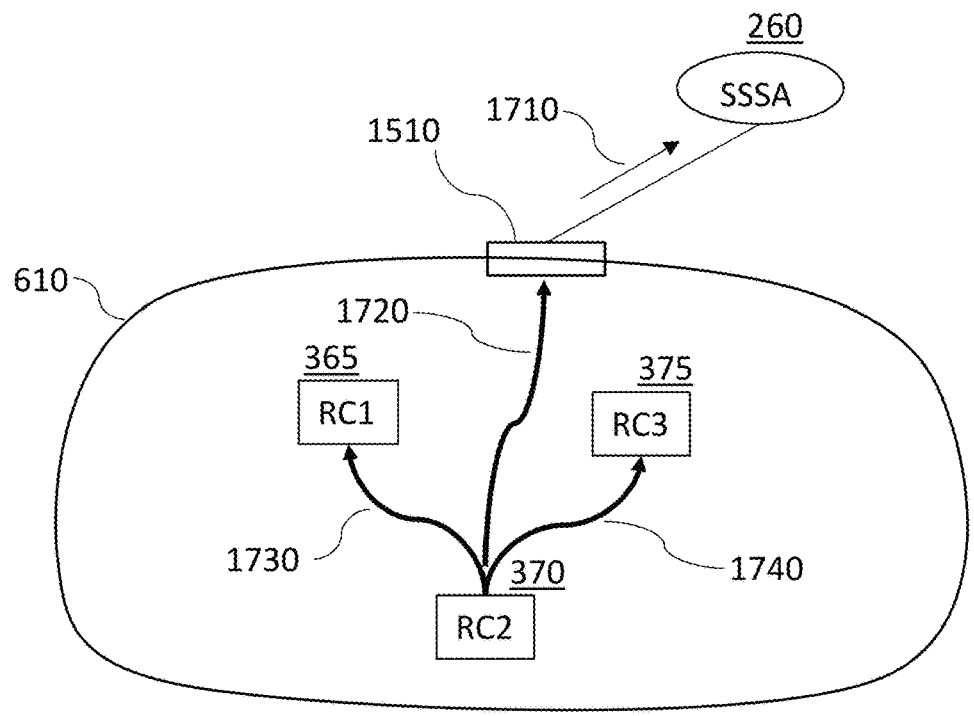
FIG. 17 shows an embodiment of the domain boundary and energy flow between the leaf nodes, the domain boundary and the parent node.

FIG. 17 shows one potential scenario of energy flows within DomDTA 610. Energy flow 1730 travelling from producer RC2 370 to consumer RC1 365 and energy flow 1740 from RC2 370 to RC3 375. Here RC2 370 produces excess energy beyond what is consumed by RC1 365 and RC3 375, the excess energy flows from RC2 370 to the PCC 1510 for DTA 305, the energy flow is labeled 1720. The energy flow 1710 shows the excess energy flowing from PCC 1510 to SSSA 260.

Figure 18:
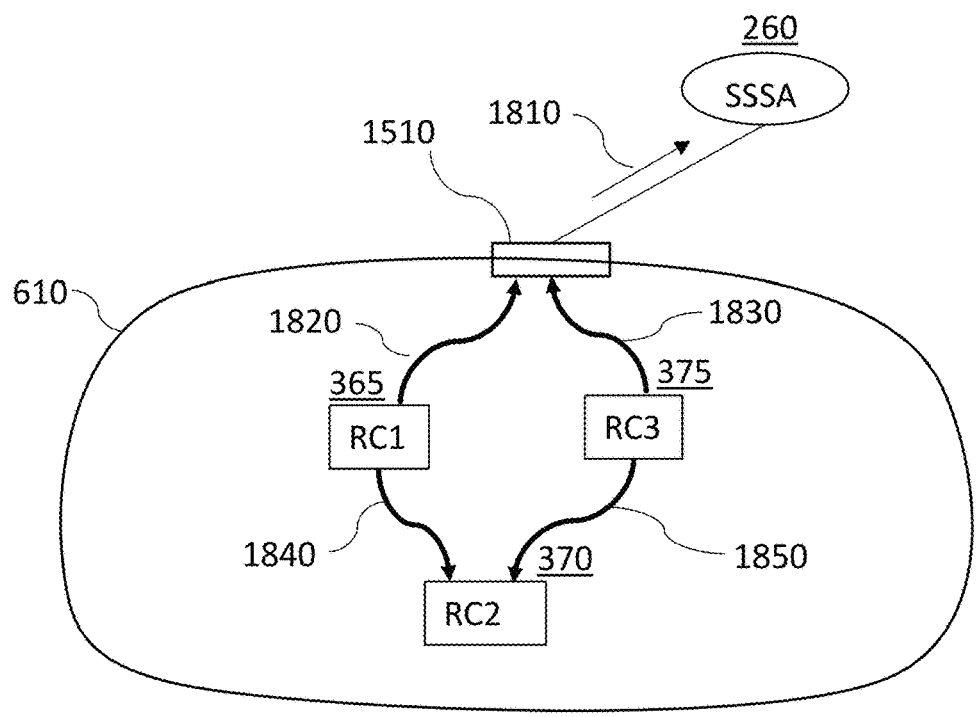
FIG. 18 shows an embodiment of the domain boundary and energy flow between the leaf nodes, the domain boundary and the parent node.

FIG. 18 shows one potential scenario of energy flows within DomDTA 610. Here, energy production by RC1 365 and RC3 375 are shown. Excess energy also flows back towards the PCC 1510 and the SSSA 260. Energy flow 1840 shows energy flowing from RC1 365 to RC2 370 and energy flow 1820 shows energy flowing from RC1 365 to the PCC 1510. Energy flow 1850 shows energy flowing from RC3 375 to RC2 370 and energy flow 1830 shows energy flowing from RC3 375 to the PCC 1510. Energy flow 1810 shows excess energy flowing from PCC 1510 to SSSA 260.

Figure 19:
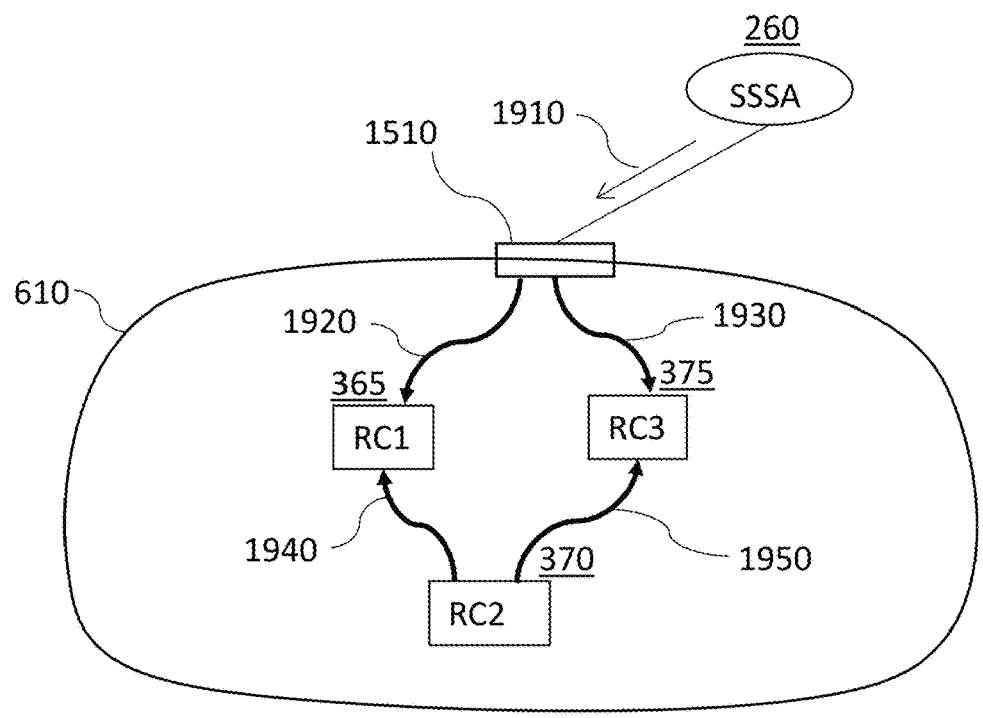
FIG. 19 shows an embodiment of the domain boundary and energy flow between the leaf nodes, the domain boundary and the parent node.

FIG. 19 shows one potential scenario where there is an energy deficit within DomDTA 610. Energy flow 1910 shows energy flowing from SSSA 260 to PCC 1510. Energy flow 1920 shows energy flowing from PCC 1510 to RC1 365 and energy flow 1940 shows energy flowing from RC2 370 to RC1 365. Energy flow 1930 shows energy flowing from PCC 1510 to RC3 375 and energy flow 1950 shows energy flowing from RC2 370 to RC3 375.

Figure 20:
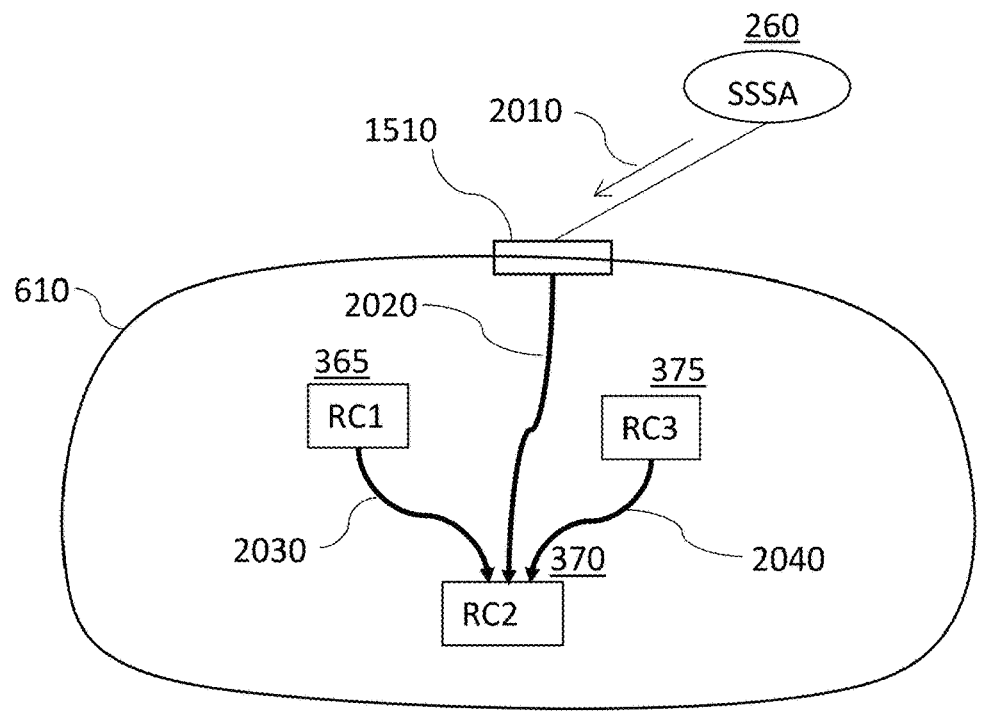
FIG. 20 shows an embodiment of the domain boundary and energy flow between the leaf nodes, the domain boundary and the parent node.

FIG. 20 shows one potential scenario where RC2 370 consumes all of the energy generated within the domain DomDTA 610 plus additional energy obtained from SSSA 260. The energy flow 2010 from SSSA 260 to PCC 1510 is shown, then the energy flow 2020 from PCC 1510 to RC2 370. The energy flow 2030 from RC1 365 to RC2 370 and the energy flow 2040 from RC3 375 to RC2 370 are also shown.

Figure 21:
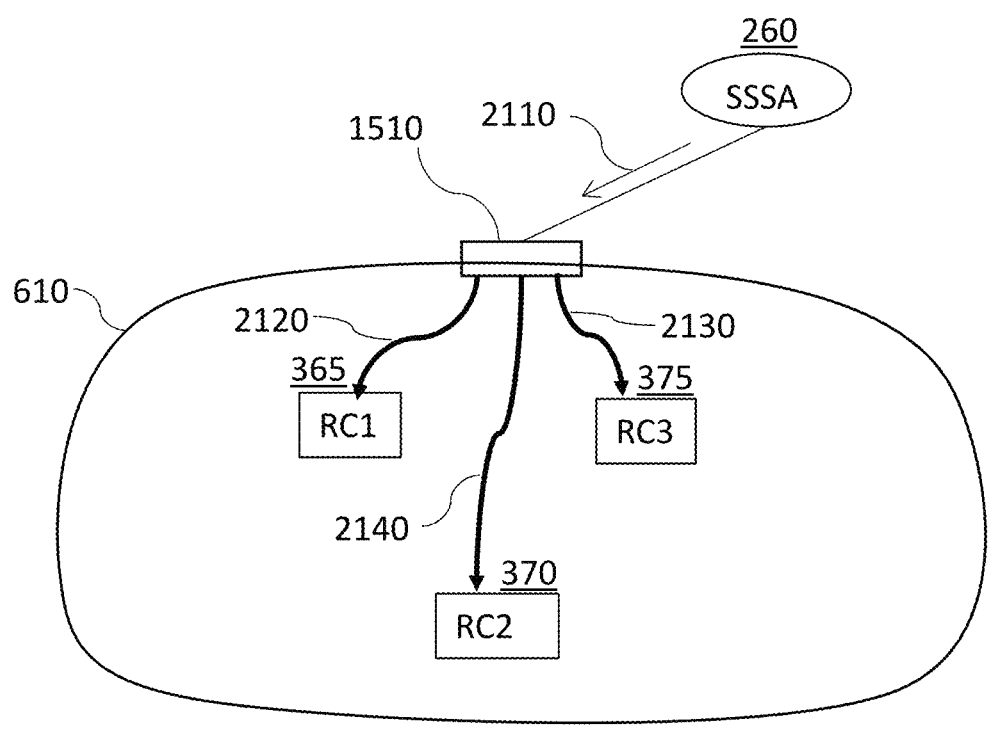
FIG. 21 shows an embodiment of the domain boundary and energy flow between the leaf nodes, the domain boundary and the parent node.

FIG. 21 shows all three clients RC1 365, RC2 370, and RC3 375 consuming more energy than is produced within DomDTA 610. RC1 365, RC2 370, and RC3 375 may not produce energy and may only be consumers or they may be consuming more energy than they produce. Energy flow 2110 shows energy flowing from SSSA 260 to PCC 1510. The energy flow 2120 from PCC 1510 to RC1 365, the energy flow 2140 from PCC 1510 to RC2 370 and the energy flow 2130 from PCC 1510 to RC3 375 are also shown.

Figure 22:
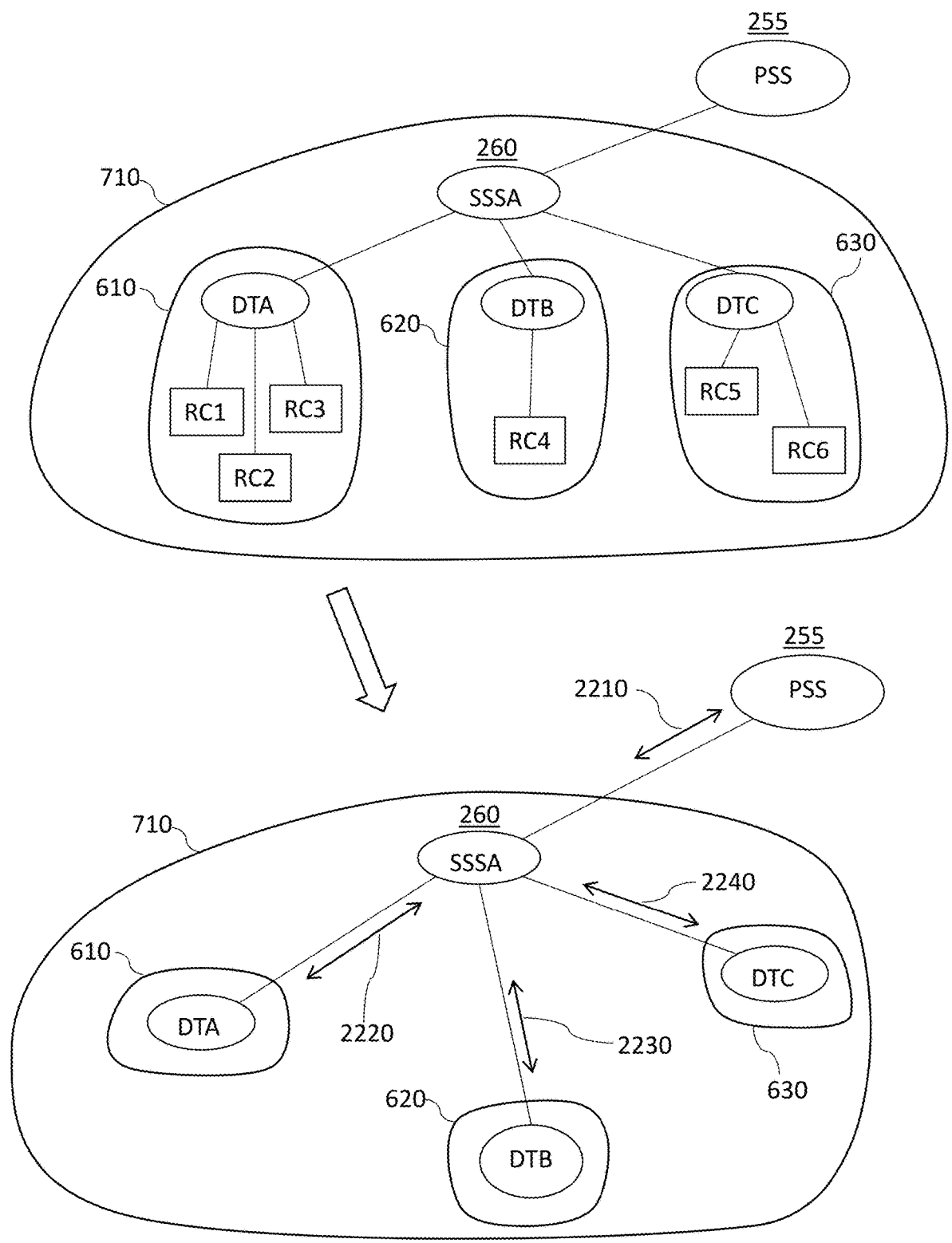
FIG. 22 shows an embodiment of energy flows within the domain boundary at a higher hierarchical level domain.

FIG. 22 shows energy movement viewed from the next higher-level domain DomSSSA 710 that encompasses the domains DomDTA 610, DomDTB 620 and DomDTC 630. Energy flows 2220, 2230 and 2240 between the inner domains, DomDTA 610, DomDTB 620 and DomDTC 630, and the Secondary Sub-station transformer SSSA 260 and encompassed by the outer domain DomSSSA 710 is shown. The net energy of this DomSSSA 710 can flow in either direction 2210 between SSSA 260 and the Primary Substation transformer PSS 255 through the domain boundary for DomSSSA 710. Energy flows between the inner domains DomDTA 610, DomDTB 620, and DomDTC 630 and SSSA 260 can be in either direction. Various scenarios for energy flow between the domains are shown in FIGS. 23-26. As above, the rectangular box in each of these figures represents the PCC at the Secondary Substation transformer SSSA 260 connection.

Figure 23:
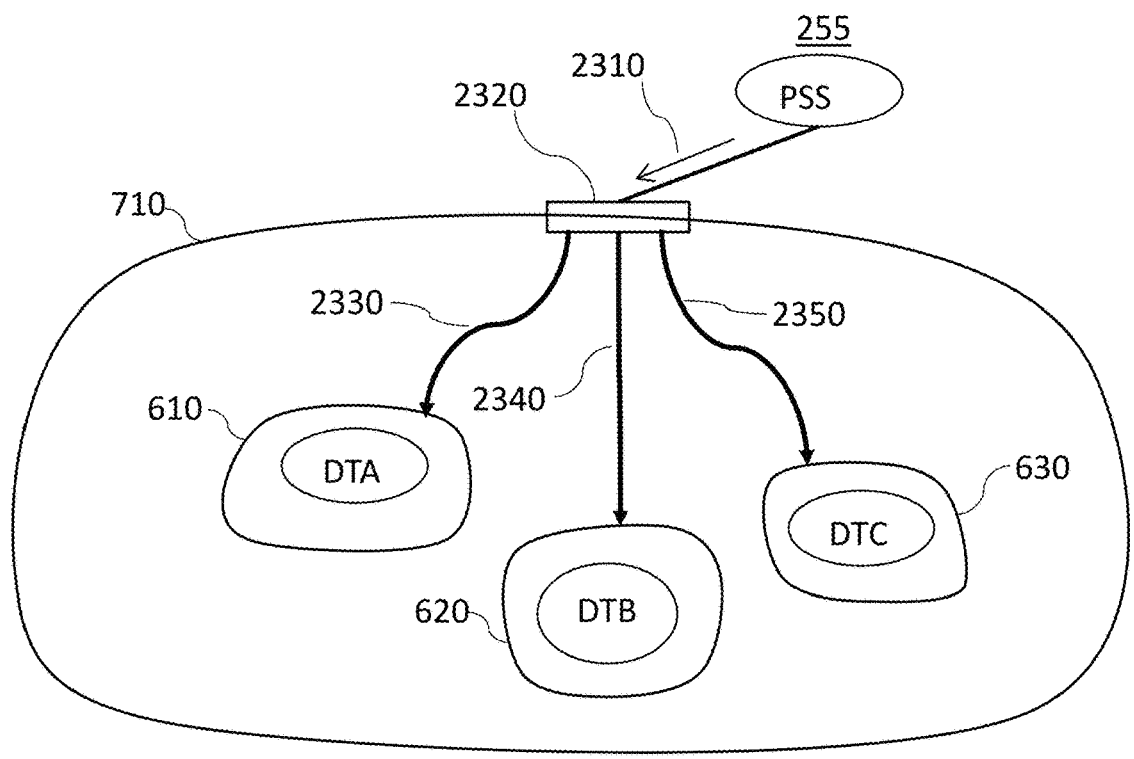
FIG. 23 shows an embodiment of energy flows within the domain boundary at a higher hierarchical level domain.

FIG. 23 shows energy flowing from the PSS 255 through the PCC 2320 to the domains DomDTA 610, DomDTB 620, and DomDTC 630. The energy flow 2310 from the PSS 255 to the PCC 2320, the energy flow 2330 from the PCC 2320 to DomDTA 610, the energy flow 2340 from the PCC 2320 to DomDTB 620, and the energy flow 2350 from the PCC 2320 to DomDTC 630, are shown. In this scenario DomSSSA 710 is a net consumer of energy.

Figure 24:
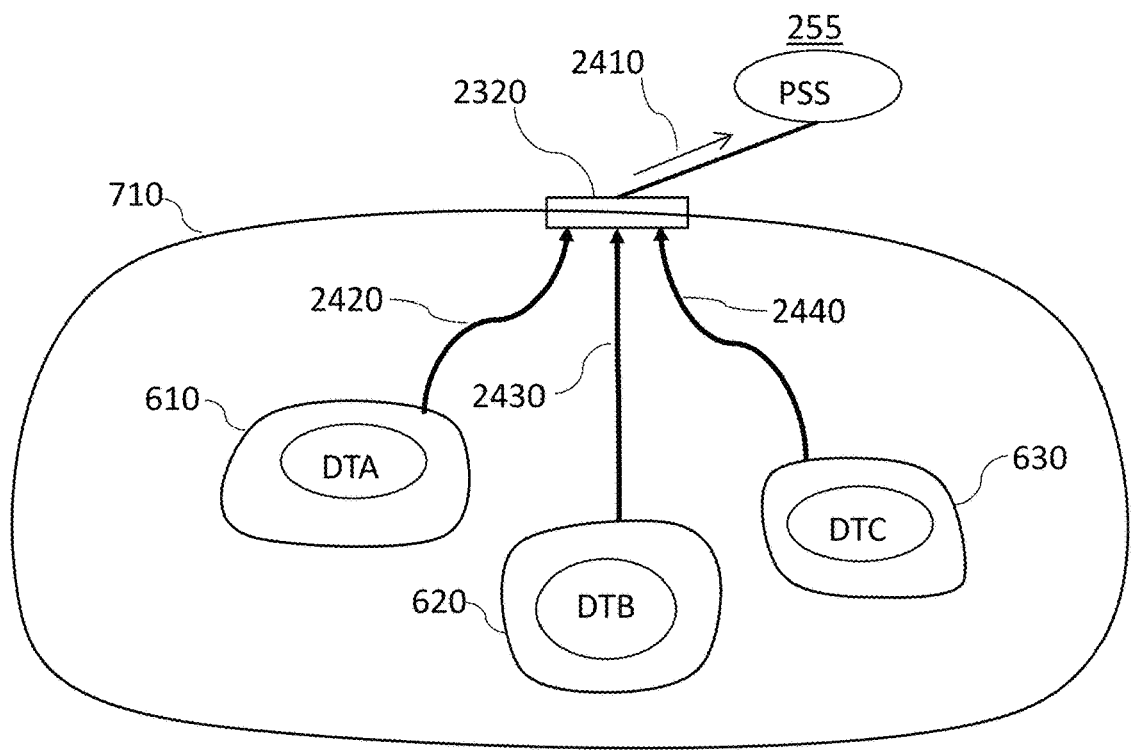
FIG. 24 shows an embodiment of energy flows within the domain boundary at a higher hierarchical level domain.

FIG. 24 shows energy flowing from the domains DomDTA 610, DomDTB 620, and DomDTC 630 through the PCC 2320 to the PSS 255. The energy flow 2420 from the DomDTA 610 to PCC 2320, the energy flow 2430 from the DomDTB 620 to PCC 2320, the energy flow 2440 from the DomDTC 630 to PCC 2320, and the energy flow 2410 from the PCC 2320 to the PSS 255, are shown. In this scenario DomSSSA 710 is a net producer of energy.

Figure 25:
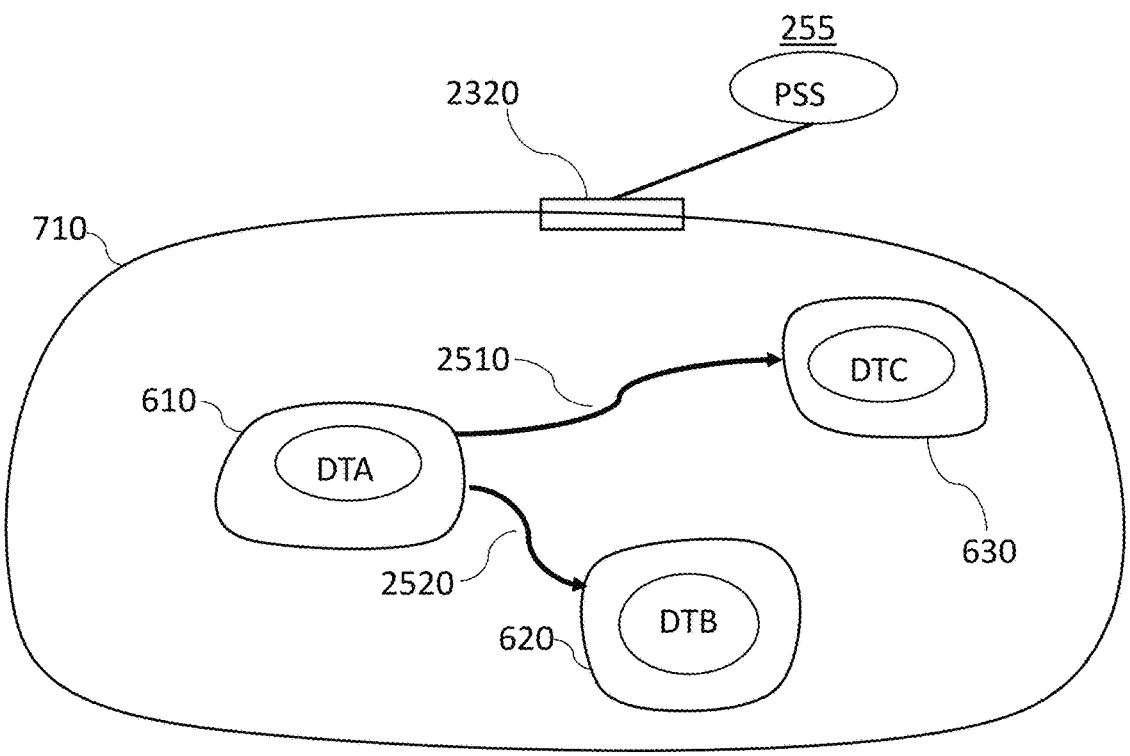
FIG. 25 shows an embodiment of energy flows within the domain boundary at a higher hierarchical level domain.

FIG. 25 shows energy flowing within DomSSSA 710, all energy produced within DomSSSA 710 is consumed within DomSSSA 710 according to this embodiment. The PSS 255 is connected to the PCC 2320. The energy flows 2520 from DomDTA 610 to DomDTB 620 and the energy flows 2510 from DomDTA 610 to DomDTC 630 are shown.

Figure 26:
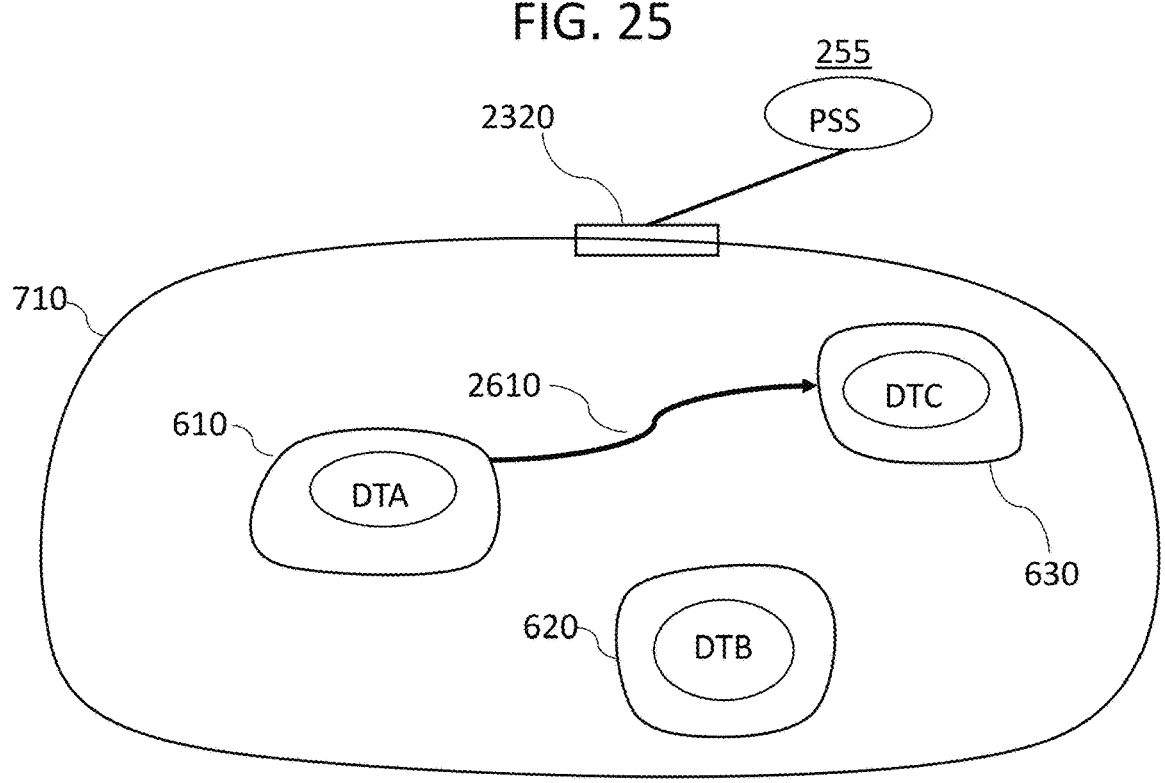
FIG. 26 shows an embodiment of energy flows within the domain boundary at a higher hierarchical level domain.

FIG. 26 shows an embodiment where all energy produced within DomSSSA 710 is consumed within DomSSSA 710. Additionally, DomDTB 620 either is not consuming or producing energy at the current periodic time window or it is consuming all of the power that it is generating at the current periodic time window. The energy flow 2610 from DomDTA 610 to DomDTC 630 is shown.

Figure 27:
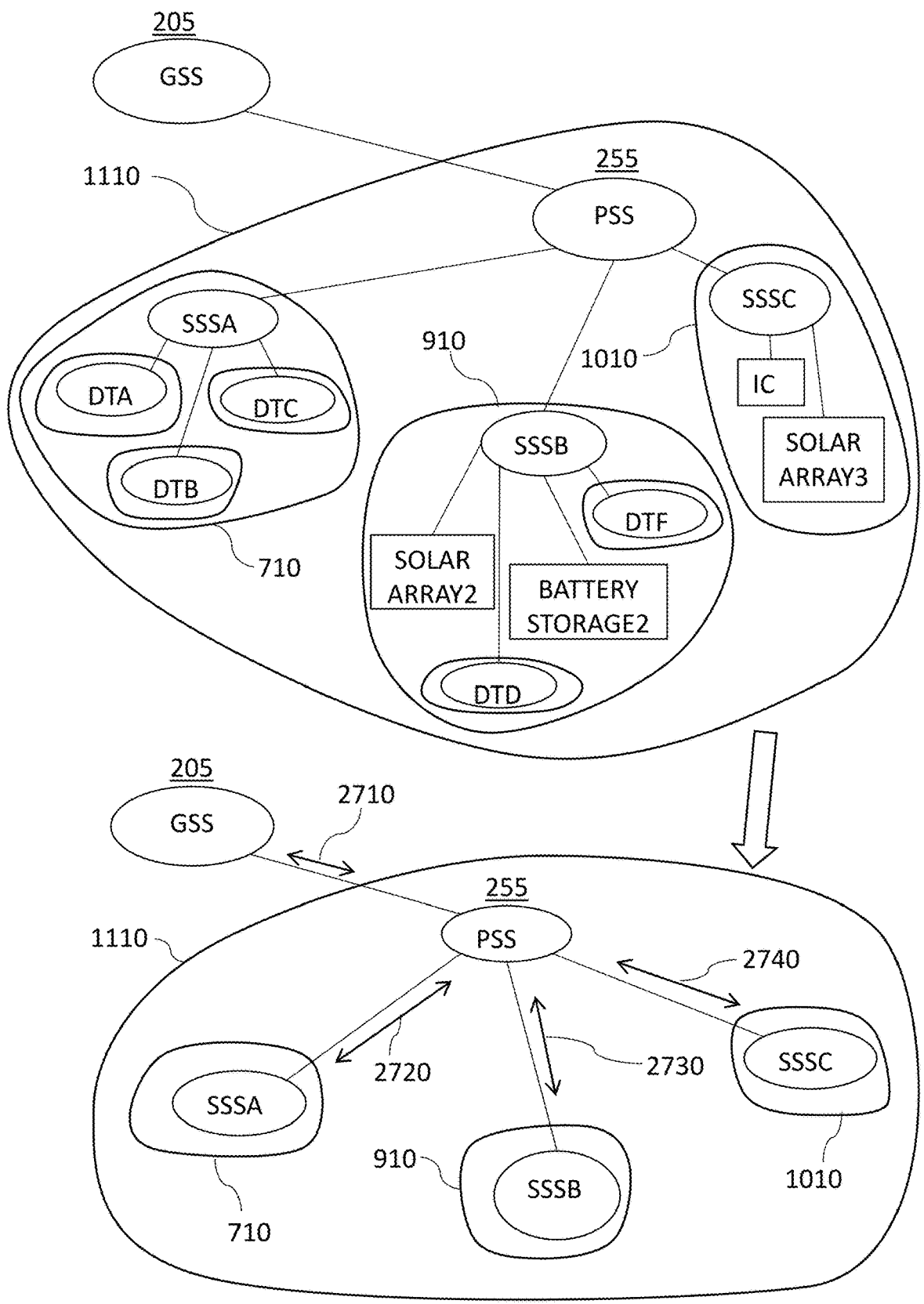
FIG. 27 shows an embodiment of the energy flows at the top domain boundary and parent node.

FIG. 27 shows energy flows within the next higher-level domain, DomPSS 255. Possible directions of energy flow between the domains DomSSSA 710, DomSSSB 910 and DomSSSC 1010 encapsulating SSSA 260, SSSB 265 and SSSC 270 and all their child nodes, and the Primary Substation transformer PSS 255 are shown in FIG. 27. Energy flow in either direction 2710 takes place between the higher-level domain DomPSS 1110 and GSS 205. The energy flow 2720 flows in either direction between PSS 255 and DomSSSA 710, the energy flow 2730 flows in either direction between PSS 255 and DomSSSB 910, and the energy flow 2740 flows in either direction between PSS 255 and DomSSSC 1010, are shown.

Energy being produced within one domain such as DomSSSA 710 and consumed within DomSSSA 710 experiences the least impedance because it does not cross a domain boundary. When energy flows cross the boundary line of DomSSSA 710 and pass into DomPSS 1110 the energy flow experiences increased impedance. If the same energy flow then travels into DomSSSB 910, the energy flow experiences increased impedance when it enters DomSSSB.

Another example is that an energy flow flowing from GSS 205 experiences increased impedance when it crosses into DomPSS 255. The energy flow then experiences increased impedance when it travels into DomSSSA 710. Whereas if energy that is consumed in DomSSSA 710 is produced in DomSSSA 710, that energy flow will experience less impedance than the energy flow travelling from GSS 205.

Figure 28:
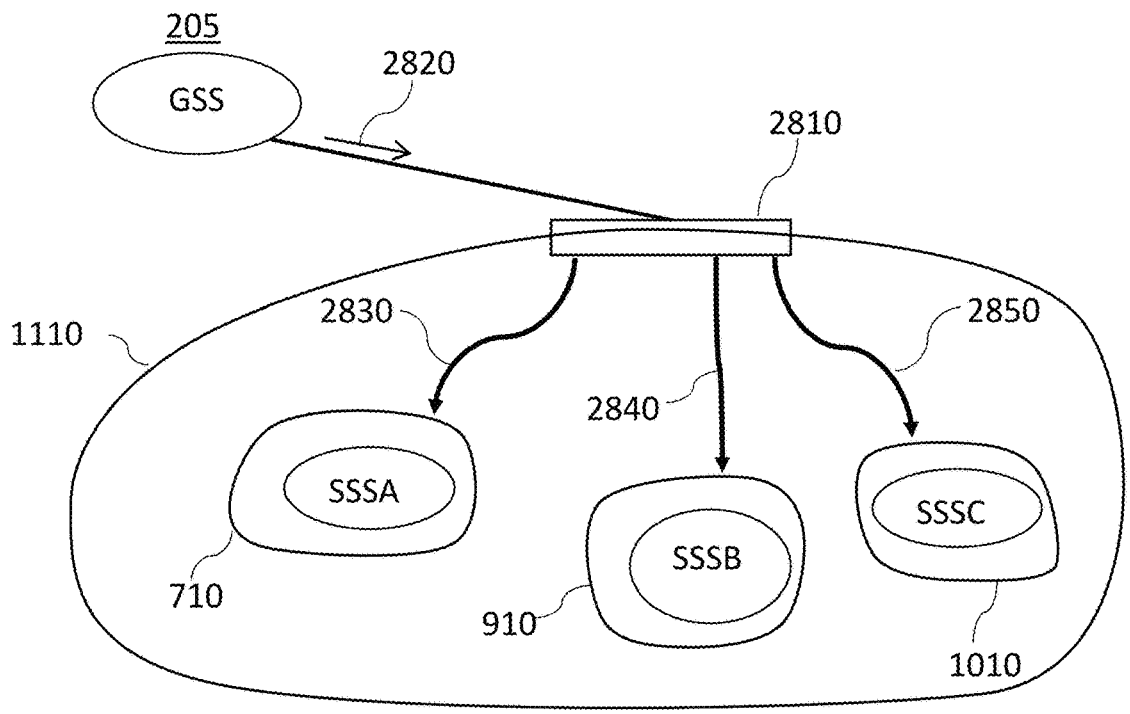
FIG. 28 shows an embodiment of the energy flows at the top domain boundary and parent node.
Figure 29:
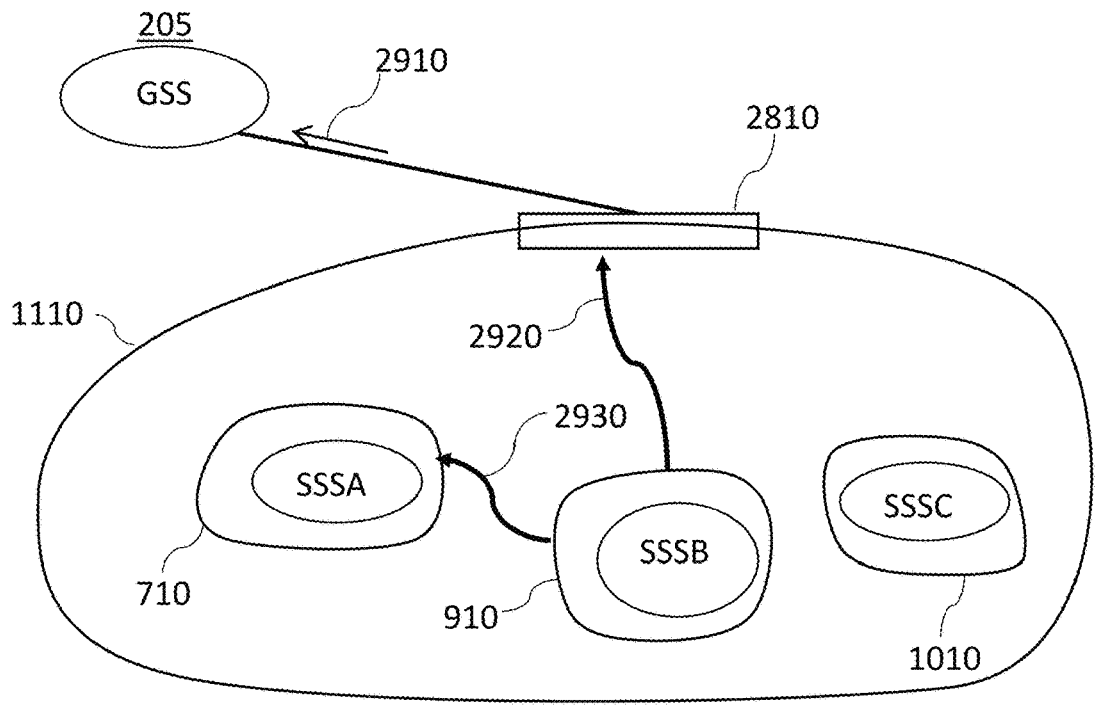
FIG. 29 shows an embodiment of the energy flows at the top domain boundary and parent node.

A couple representative energy flow scenarios are illustrated in FIGS. 28 and 29. Many other scenarios of various energy flow combinations within the domains can exist. The central idea of the flow of energy is important for the understanding of the subsequent flow determinations. It is not essential to show all flow combinations, since many different flow combinations are possible. As above, the rectangular box 2810 represents the PCC at the Primary Substation transformer PSS 255.

FIG. 28 shows an embodiment where energy is flowing from the GSS 205 into DomPSS 1110 through the PCC 2810 to DomSSSA 710, DomSSSB 910, and DomSSSC 1010. In this embodiment DomPSS 1110 is a net energy consumer. Energy flow 2820 flows from the GSS 205 to PCC 2810, then energy flow 2830 flows from the PCC 2810 to DomSSSA 710, and energy flow 2840 flows from the PCC 2810 to DomSSSB 910 and energy flow 2850 flows from the PCC 2810 to DomSSSA 1010, as shown. DomSSSA 710, DomSSSB 910, and DomSSSC 1010 are all with DomPSS 1110.

FIG. 29 shows an embodiment where DomPSS 1110 is a net energy producer. Energy flows from DomSSSB 910 out to DomSSSA 710 and out of DomPSS 1110 towards the GSS 205. DomSSSC 1010 does not have energy flowing into or out of it, either the energy produced by DomSSSC 1010 is completely consumed within DomSSSC 1010 or there is neither energy production nor consumption within DomSSSC 1010. The energy flow 2930 shows energy flowing from DomSSSB 910 to DomSSSA 710. The energy flow 2920 shows energy flowing from DomSSSB 910 to PCC 2810. The energy flow 2910 shows energy flowing from PCC 2810 to GSS 205.

Figure 30:
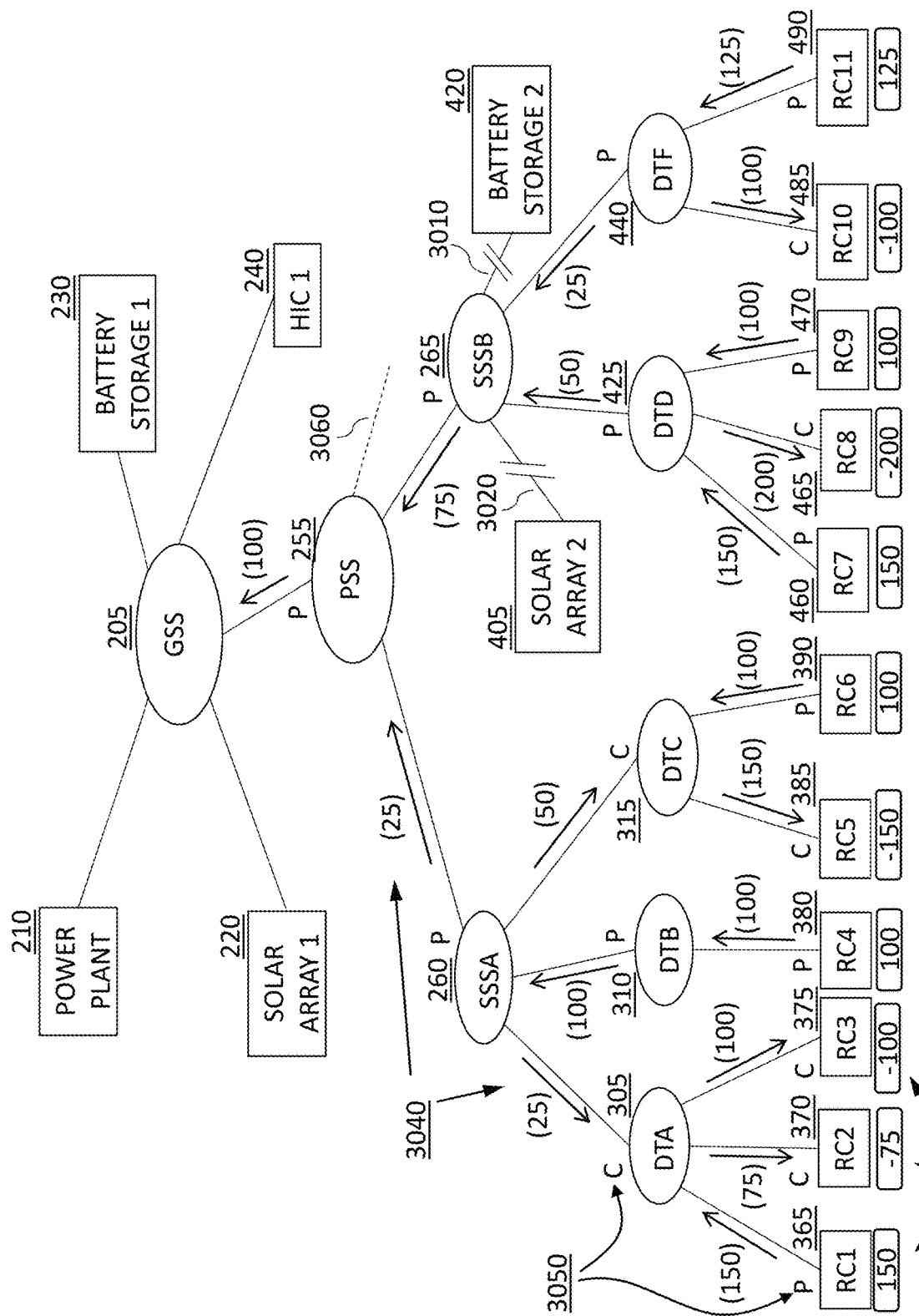
FIG. 30 shows an embodiment of the energy consumed or produced at various nodes and the energy flows across the nodes.
Figure 31:
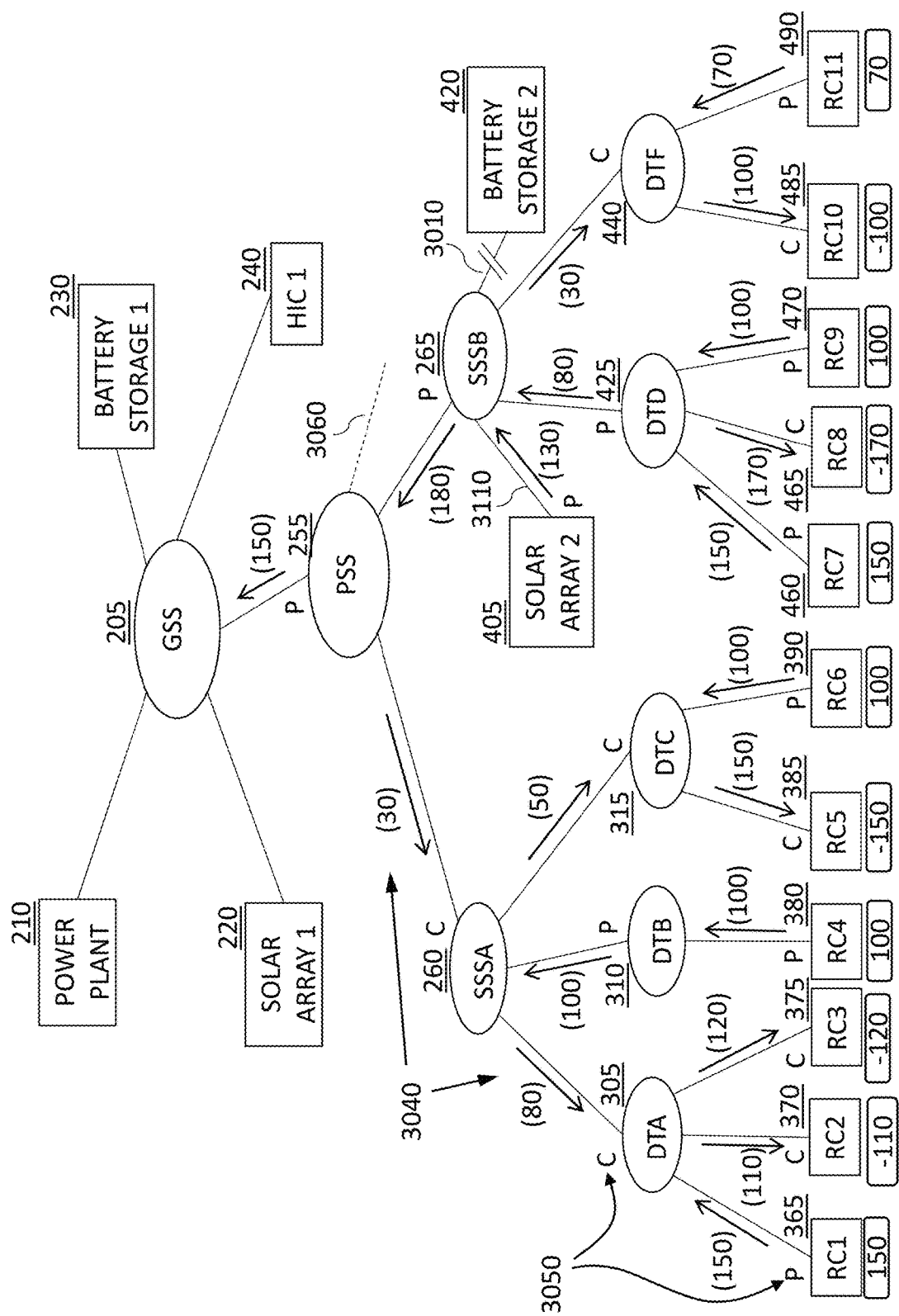
FIG. 31 shows an embodiment of the energy consumed or produced at various nodes and the energy flows across the nodes.
Figure 32:
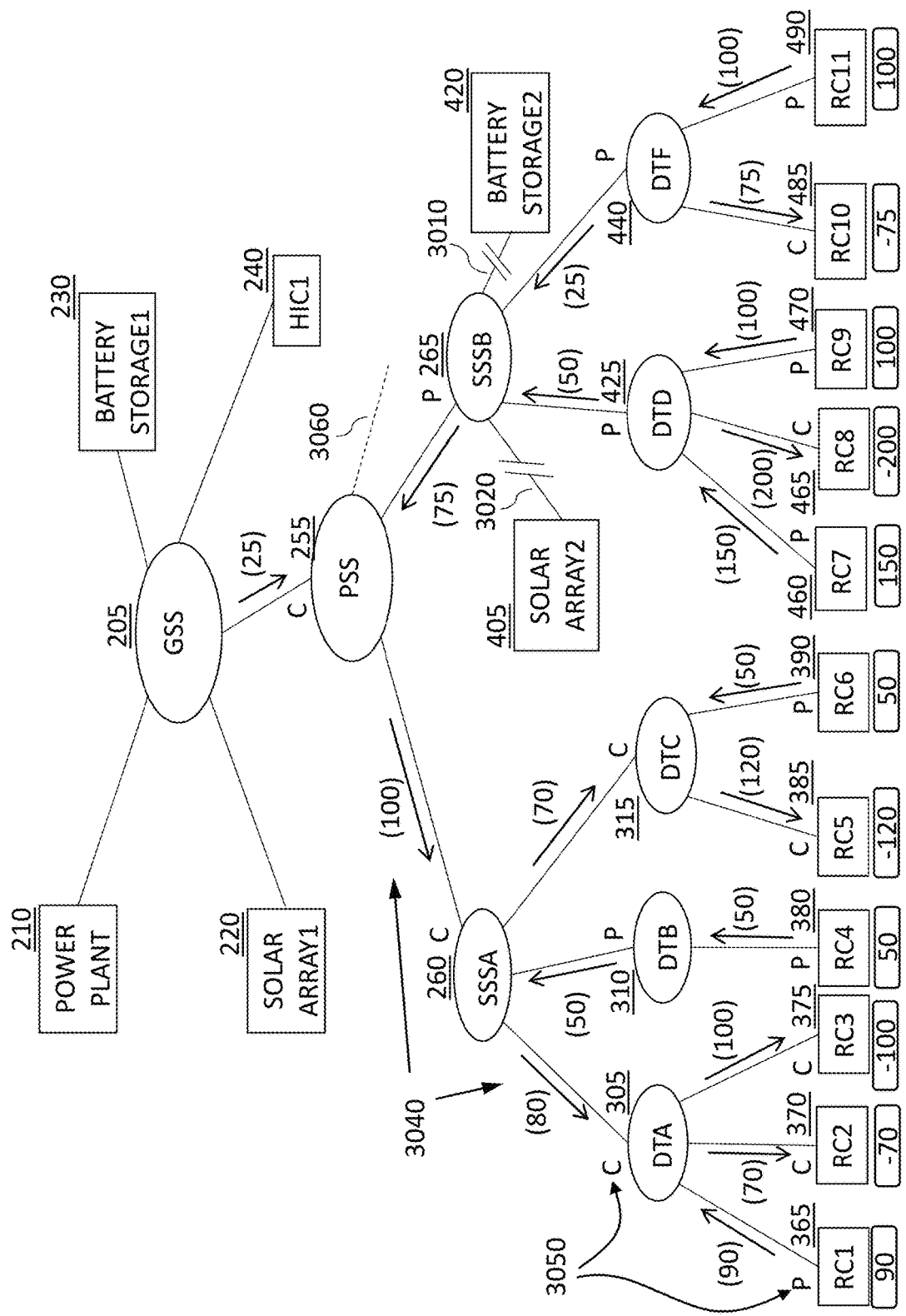
FIG. 32 shows an embodiment of the energy consumed or produced at various nodes and the energy flows across the nodes.

For the grid topology that has been described, a few example energy flows with the full topology in view are illustrated in FIGS. 30-32. To keep the illustration clearer and not overcrowded, the Secondary Substation transformer SSSC 270 and its client nodes IC 1 505 and SOLAR ARRAY 3 520 are not shown. For simplicity, the domain containing SSSC is shown with a dotted line 3060 in FIGS. 30-32. This in no way changes the idea or embodiment as described herein. This topology can be viewed as a tree graph with the end nodes or leaf nodes represented by RC1 365, RC2 370, RC3 375, RC4 380, RC5 385, RC6 390, RC7 460, RC8 465, RC9 470, RC10 485, RC11 490, SOLAR ARRAY 1 220, SOLAR ARRAY 2 405, BATTERY STORAGE 1 230, BATTERY STORAGE 2 420, POWER PLANT 210, and HIC 1 240. GSS 205 forms the root node. Since, the POWER PLANT 210, SOLAR ARRAY 1 220, BATTERY STORAGE 1 230, HIC 1 240 are end nodes directly connected to the root node GSS 205, the energy flow to or from these end nodes does not have an energy component of any higher node or domain level. For example, the heavy industry client HIC 1 240, could consume energy that may be provided either by the POWER PLANT 210, SOLAR ARRAY 1 220, BATTERY STORAGE 1 230, or from the PSS 255, all via GSS 205.

Also, for further simplicity to clarify the method of determining the pertinent composition of energy sources or composition of energy to various consumers from a source, as the case may be, BATTERY STORAGE 2 420 is shown as disconnected 3010 from the grid in FIGS. 30-32. Similarly, SOLAR ARRAY 2 405 is shown disconnected 3020 in FIGS. 30 and 32, while it remains connected 3110 in FIG. 31. For further clarification, the energy consumed or produced 3030 by the end leaf node clients (RC1-RC11), is indicated by a positive or negative number. When the client produces energy, the number is positive and the arrow points from RCx towards the Distribution transformer DTy with the same absolute value 3040 indicated in parenthesis besides the arrow. Note that these values are for the energy consumed or produced in the given sampling time window as described in detail below. In RCx, x is from 1 to 11, and in DTy, y is A, B, C, D or F.

When the client consumes energy, the number 3030 is negative and the arrow points to RCx from the Distribution transformer DTy with the same absolute value 3040 indicated in parenthesis besides the arrow. Each of the client leaf nodes is indicated with either the letter P or C 3050, indicating that it is either an energy producer or energy consumer in the periodic time window. Each of the nodes above the leaf nodes, is also a parent node and is encompassed by the domain at that level. The letters P or C 3050, at the parent nodes also represents the net energy consumption or production at the domain level that encompasses the parent node.

FIG. 30 shows one embodiment of energy production and consumption on a power grid. Here individual clients like RC1 365 through RC11 490 can be energy producers or consumers. Net values of energy production and consumption are shown as the energy travels between the different nodes. If a node is a net producer then energy travels up to the next higher level domain. Such as RC9 470 produces energy 100 units that travels up to DTD 425. Then, since there is net production at the distribution transformer level the energy travels further up the hierarchy to SSSB 265.

Referring to FIG. 30, according to one embodiment, consider the client RC8 465. For the represented time window, RC8 465 consumes 200 units of energy. RC8 465 receives energy from the Distribution transformer DTD 425. Clients RC7 460 and RC9 470 are also connected to DTD 425 and produce energy and feed it to DTD 425. The sum total of energy produced by RC7 460 and RC9 470 is 150+100=250 units. 250 units is greater than the client node RC8's 465 consumption of 200 units. The domain DomDTD 810 encapsulating DTD 425, RC7 460, RC8 465 and RC9 470 will be a net producer of energy during the periodic time window. This means that RC8's 465 energy needs are being completely satisfied by the energy production within this domain, DomDTD 810.

As for the energy produced by RC7 460 and RC9 470, part of that energy is consumed by RC8 465, and part of the energy gets pushed up through the domain to the next higher-level domain DomSSSB 910 to the Secondary Substation transformer SSSB 265. If this higher-level domain is also a net energy producer for the same periodic time window, then the part of the energy produced by RC7 460 and RC9 470 that was not consumed by RC8 465, will get pushed up further to the next higher-level domain DomPSS 1110 to the Primary Substation transformer PSS 255, and so on. In the example in FIG. 30, this energy is pushed up further to GSS 205 together with energy produced by the domain DomSSSA 710 containing SSSA 260.

FIG. 31 shows energy flow within the power grid according to another embodiment. Here again the domain DomDTD 810 containing DTD 425 and its clients is a net producer of energy. The client energy producers RC7 460 and RC9 465 provide energy to RC8 465 which is in its local domain Dom DTD 810, but also the remaining energy is pushed to SSSB 265. While the domain DomSSSB 910 encompassing SSSB 265 is a net producer, the lower-level domain DomDTF 820 containing DTF 440, RC10 485 and RC11 490 is a consumer of energy during the periodic time window. Therefore, the energy pushed from DTD 425 gets split into some portion supplying energy to DTF 440, and the remaining portion of energy being pushed to PSS 255 via SSSB 265. Similarly, SOLAR ARRAY 2 405 connected to SSSB 265 produces energy that is split to contribute energy to DTF 440, and the remainder is pushed to PSS 255 via SSSB 265. This energy is split further at PSS 255 since some energy flows to SSSA 260 and some energy is pushed further up to GSS 205 via PSS 255. The method for calculating the amounts of these splits is presented below.

FIG. 32 shows yet another embodiment with different energy consumption and production values from FIGS. 30 and 31. Consider the client RC1 365, the energy produced by RC1 365 in a given periodic time window is 90 units. RC1 365 is connected to DTA 305. The domain DomDTA 610 containing DTA 305 is a lowest level domain and contains RC1 365, RC2 370 and RC3 375. RC2 370 and RC3 375 are energy consumers in the periodic time window. Their total energy consumption is 70+100=170 units. This is greater than the energy produced by RC1 365. Thus, domain DomDTA 610 is a net consumer of energy in the periodic time window. That means, the energy produced by RC1 365 is completely consumed by the energy needs within its domain DomDTA 610.

DomDTA 610 is a net consumer of energy as mentioned above. The client energy consumers RC2 370 and RC3 375 consume energy from RC1 365 and also consume energy from the domain DomSSSA 710 obtained from the next level up containing SSSA 260. Since, the domain DomSSSA 710 is a net consumer of energy in the periodic time window, that energy is obtained from the domain DomPSS 1110 at the next level up containing PSS 255, and so forth. That means, the energy consumed by clients RC2 370 and RC3 375 is composed of parts of energy from RC1 365, from the domain DomSSSA 710 at the next level up, and from the domain DomPSS 1110 even further up the next level domain, and also from GSS 205. The method for calculating the amounts of these constituent parts of energy consumed by RC2 370 or RC3 375 is discussed below.

To create a hierarchical tree structure of the domains. In an electrical grid, define nodes that represent impedance devices such as transformers, long transmission lines, or any other medium through which energy passes. Such nodes form a tree structure in the electrical topology. Each node has one parent node and one or more child nodes. The end nodes in the tree structure can be of two kinds. The node that has one parent but no child nodes are called leaf nodes. There will be one node that has one or more child nodes but no parent node. We call this node as a root node.

A domain is defined as an enclosed boundary containing the node with all its child nodes. By this definition, all leaf nodes also have a domain that contains just the leaf node. Also, by this definition, the enclosed boundary that defines the domain for the root node, will include each and every node including all the leaf nodes in the tree structure. There can be an impedance, or "cost" value assigned for each domain. Typically, at the leaf nodes, those leaf nodes that belong to the same parent, are likely to be physically close to the parent node and also have near identical impedances. The cost being the same, we can omit a domain boundary for such leaf nodes. The domain boundary of its parent node can be sufficient. To simplify the examples, the figures have omitted the domain boundaries containing single leaf nodes.

It is the tree structure in the topology with the above definition of domain boundary creation that gives rise to the domain hierarchies. The leaf nodes are encompassed by their immediate parent node. The parent nodes are encompassed by their parent nodes, and so forth. The domain at the root node is at the highest level from the point of view of a leaf node farthest from the root node. In other words, there can be a leaf node (node without children) whose parent is the root node. Such a leaf node is relatively close to the root node. Energy transfer takes places between leaf nodes. All other nodes including the root node are mediums of energy transfer with a certain impedance or cost. When energy transfers from source to destination through such mediums, thereby crossing domain boundaries, the impedances, or costs, get added cumulatively for that flow of energy transfer.

Figure 33:
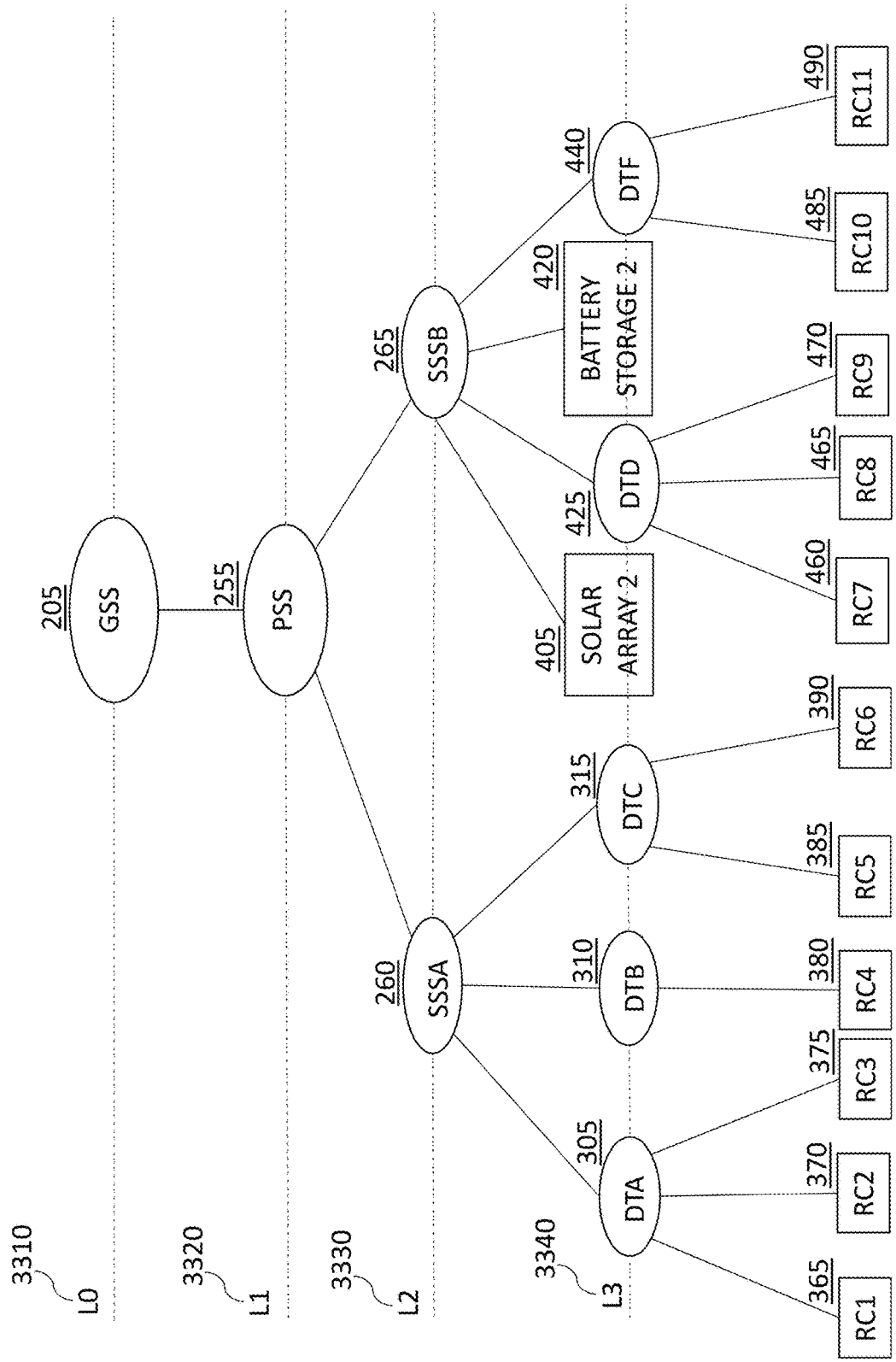
FIG. 33 shows hierarchical levels of substations, transformers, energy producers and energy consumers.

FIG. 33 is a depiction of the hierarchical levels of the domains. FIG. 33 illustrates the same node representations as in the previous FIGS. 30, 31, and 32. In FIG. 33, the different peer levels are illustrated at the same vertical level for easier visualization and clarity. The domain levels in previous FIGS. 6-9, 11 and 12 can be visualized as horizontal levels L3 3340, L2 3330, L1 3320 and L0 3310. L1 3320 is the level for DomPSS 1110. L2 is the level for DomSSSA 710, DomSSSB 910, and DomSSSC 1010 (not pictured). L3 3340 is the level for DomDTA 610, DomDTB 620, DomDTC 630, DomDTD 810, and DomDTF 820.

The stages for computation of the constituent parts of energy flows are presented in the following paragraphs.

Figure 34:
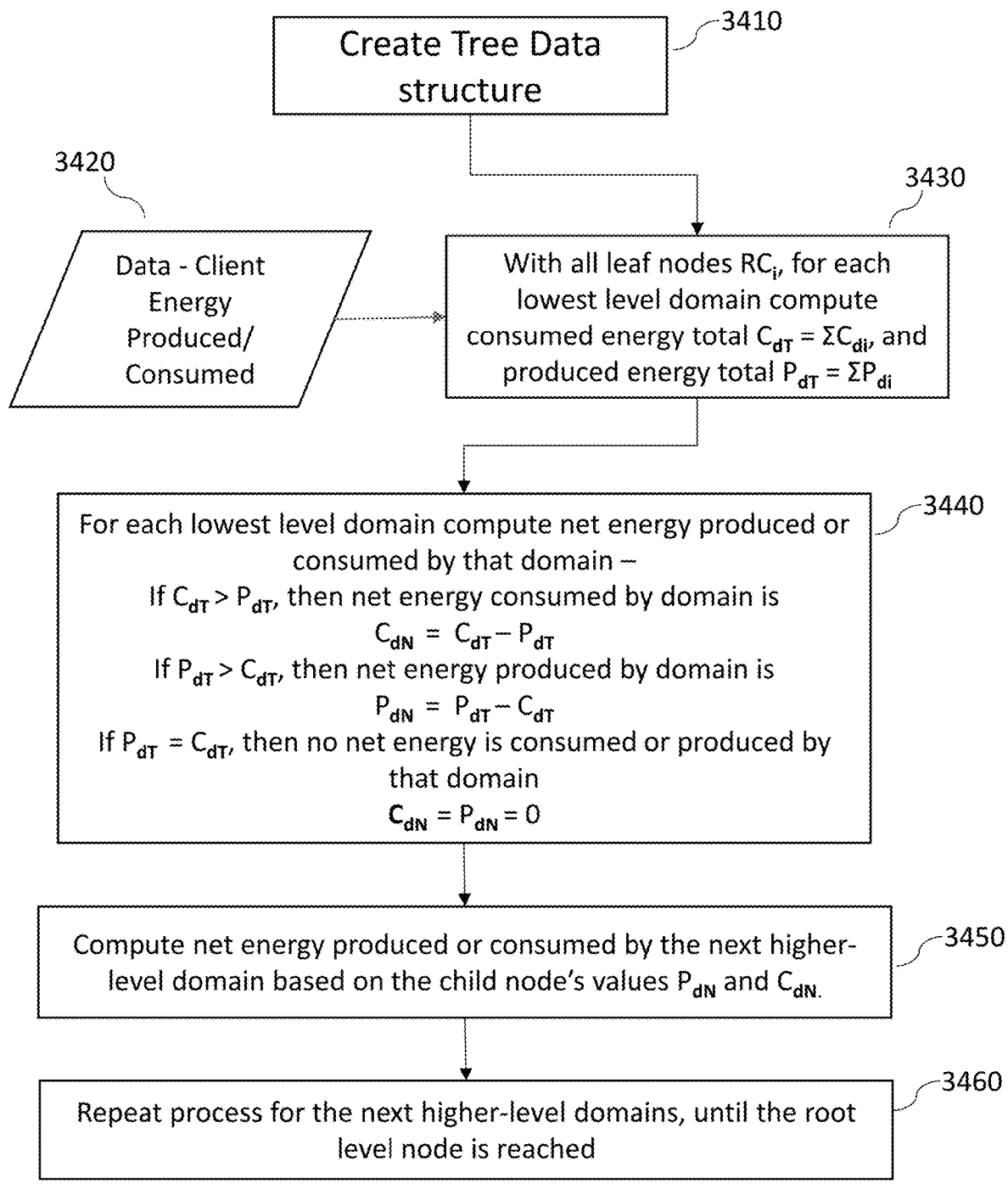
FIG. 34 illustrates the steps for determining energy consumed or produced at each domain level for a periodic time interval.

FIG. 34 shows how to divide the electric grid into domains. At step 3410, the electric grid must be mapped creating a tree data structure. A tree data structure consisting of parent nodes and child nodes is created to map the grid topology based on the grid topology, which consists of numerous end clients served via transmission lines and transformers. Domains are demarcated and domain levels assigned as described earlier. The tree data structure can remain static as long as the topography remains electrically unchanged. In situations of redundant grid circuits, the physical grid topography may appear to have a mesh structure that contains electrically unused portions for backup connections. When a portion of a grid fails, then the redundant unused portion can be switched in to restore power to some or all of the affected areas. (Wikipedia: https://en.wikipedia.org/wiki/Electrical_grid). The electrical topography can change based on actual physical changes to the grid layout or topography, addition or removal of clients, power outage scenarios, switching in or switching out portions of the grid, as in back up connections brought into service or put back to standby. All such scenarios are programmed into the tree data structure and when electrical topographical changes take place, the proper tree data structure to reflect the topology of the current periodic time window is updated or selected.

A tree data structure is created that maps the clients in the Service Area and the hierarchy of the clients connected to common distribution transformers. The distribution transformers are connected to Secondary Substation transformers, up to the step-up transformer, Grid Sub-station transformer, or another point, until forming the root node. Note, that depending upon the structure of a given Service Area, managed by one or more utility companies, there can be more than one tree data structure created, each with its own root node. The same method can be applied for any number of other tree data structures.

As noted earlier, structurally the network can appear as a mesh network with standby disconnected points to provide redundancy in the system creating alternate paths of energy in case of failure or maintenance in some parts of the energy transmission and distribution network. Electrically, the network is a tree network. When a certain segment of the grid network is switched in, while some other part is disconnected, it will likely form a slightly different electrical topology and hence tree structure. Any number of these electrically alternate topologies are mapped in the tree data structures. One representation of the electrical topology will be active at any given time. In a situation when a standby portion of the network needs to be switched in, then at that time, the tree data structure corresponding to the electrical topology after the standby portion is switched in, is made the active tree data structure. When such a change is affected the change is reflected in the active data tree structure, then the calculations of energy flows will be updated. More than one approach is possible to resolving such a situation. A couple approaches are presented:

1) A request to fetch, store and record the client energy information (whether client is producing or consuming energy, and the quantity of energy) from all the metering devices at all the clients in a service area is made the moment that switch-in of the standby portion of the network happens, or any other scenario in which a switch is made in the active tree data structure, then. The normal sampling times of the periodic time window are not affected. Therefore, this typically results in an extra sampling in between the two regular sampling periodic time windows.

2) The client energy information collected for that periodic time window is discarded for the periodic time window during which such a change of active data structure happens. Instead, the periodic time window just prior to the change of active data structure is replicated for the periodic time window. This method is more practical if the periodic time window is small, for instance about 1 minute or less.

The focus is on a single tree data structure, and uniform periodic time windows for energy flow reading devices (meters), with the sampling periodic time windows for all energy flow reading devices being synchronized within the Service Area.

Energy flow meters or Smart Meters energy flow readings are sampled periodically. It is preferred and practical to have the sampling time coincide with the actual time. That is, in case of 5-minute sampling interval, then every 5-minute interval must coincide with the actual time at 0, 5, 10, 15 . . . 55 mins, etc. of the hour.

The energy flow data collected periodically can be stored locally on the metering device and collected at a less frequent interval such as once a day or 4 times a day by a computing device, or transmitted to a remote server or servers, or stored in the cloud.

At step 3420, client energy data is collected periodically, where the client can be a producer or a consumer of energy. Such a sampling periodic time window for collecting energy consumed or produced within the window is uniform across the entire topmost level domain (Level 0). That is, all the client nodes in all the domain levels below the root node have their energy consumption and production quantity reading instances synchronized periodically. That is, the time windows are synchronized for all nodes.

An example of a device that measures the amount of energy consumed by a client is a Smart Meter. The Smart Meter can determine the direction of the flow of energy thereby determining whether the client is consuming or producing energy at any given instant. The Smart Meter can also measure the amount of flow of energy by periodically sampling the amount of energy consumed or produced and storing that information within the meter and providing that information to an interface device upon request. Such a request to the Smart Meter, and the subsequent furnishing of the information by the Smart Meter to the requesting device can take place over one or more modes of communication, such as, wireless, wired, optical, over power lines, etc. Such requested information may then be stored on another device for further processing of that information. The Smart Meter is an example of an energy measuring device, to measure a client's energy production or consumption quantities or rates (amount consumed over sampled periodic time windows). Any other device or devices that can provide similar information of client-side energy production and consumption data can also be used. For instance, energy measurement is also possible by an energy information aggregation device that collects periodic information of energy consumed or produced, from each and every energy consuming or energy producing device at the client's premises. For simplicity of discussion, wherever a reference to an energy measuring device at the client's premises is made, the term meter or Smart Meter will be used.

The Smart Meter can periodically measure, record, store locally, store remotely to a device, store in the cloud, etc., the energy produced or consumed by a client in a given periodic time window. Typically, the duration or each periodic time window is uniform. Each periodic time window need not be uniform, however, the precise start and stop of each periodic time window must be synchronized for all Smart Meters within a service area.

The duration of the periodic time window is chosen such that it can provide a meaningful and useful profile of energy flow for a given client. Optimization of energy produced or consumed is achieved by means of adjusting the production or consumption of a given client's energy profile based on the peer client's combined consumption or production profile. Note that for a given client's production or consumption function, the peers of opposite function are used to determine the adjustment needed.

While the duration of the periodic time window during which the metering device measures the direction and quantity of energy flow, could range from a fraction of a second to days, weeks, months, or years, a practical duration of a periodic time window is chosen that is first, meaningful, and second, viable.

First consider the periodic time window of a day or longer. Within the day itself there is likely to be a change in the direction of energy flow, this could happen possibly more than once. Such information, obtained from a periodic time window of a day, does not provide sufficient data to know during which hours the client's energy production complements the energy needs of its peers and during which hours the client's energy needs are complemented by the energy production of its peers. Therefore, the duration of the periodic time window of a day or longer does not serve the intended purpose and is ruled out.

On the other end of the spectrum, let's consider a periodic time window of a fraction of a second. There are two key parameters to be monitored regarding energy flow. One, is the direction of energy flow (client as a producer or consumer) for a given client, and two, the quantity of that energy flow. As for the direction of energy flow, the change from being a consumer to producer or vice-versa is not likely to happen too often in non-fault scenarios (fault scenarios could see frequent or rapid energy direction changes). In normal operation, such change of direction of energy flow is likely to be observed a few times in a day, that is in a 24-hour duration. Therefore, from the change of direction of energy flow consideration, a fraction of a second as the periodic time window is unnecessary. Considering the change of rate of energy consumed or the change of rate of energy produced, such changes may happen more often in a 24-hour duration. The rate of energy consumed or produced may change a few times within an hour. Therefore, a preferred periodic time window of 5 minutes or 15 minutes is reasonable.

Considering a 5-minute periodic time window to measure the amount of energy consumed or generated by a client, there would be 12 measurement samples every hour, or 288 samples per 24 hours. With a 15-minute periodic time window, there would be 4 samples every hour, or 48 samples per 24 hours. A periodic time window of 5 minutes will be used for the sake of explanation, unless for ease of illustration, a different time window is used. The duration of the periodic time window does not affect the idea in the disclosure. The periodic time window is mainly decided by the usefulness of the periodic time window at both ends of the time duration spectrum, and the speed of computations and data exchange achievable, within reasonable economic costs. That means, the more the computational and data exchange capabilities are available within reasonable economic cost, the shorter the periodic time window that can be used. The shorter the periodic time window, the larger the amount of data generated.

Using the data generated for a given client about its energy consumed or produced during the periodic time window (assuming 5-minute periodic time window as mentioned above) for a 24-hour period, the daily profile of energy consumed and produced from a client is generated. Note that the profile generated is for a 24-hour period. The period could be shorter or longer than 24-hours, potentially the period could be a week long. A pattern of the client energy profile when viewed over extended periods of time, typically has a periodicity of 24 hours, and a broader periodicity spanning a week, especially due to some difference in usage of energy between weekdays and weekends, or the difference in usage of energy between human working days and non-working days every week.

The energy flow data that is stored for each of the clients $RC_i$, where i varies from 1 to 11, representing each of the lowest level leaf clients, is collected for a given periodic time window. Similarly, energy flow values are obtained and used in calculations for other end leaf nodes as well such as, SOLAR ARRAY 2 405, BATTERY STORAGE 2 420, IC 1 505, SOLAR ARRAY 3 520. Energy flow values may also be obtained from clients connected to the GSS 205 such as BATTERY STORAGE 1 230, HIC 1 240, SOLAR ARRAY 1 220 and POWER PLANT 210, however, their values are not considered in this description since they are all considered to be operated by the GME (Grid Management Entity). However, if componentization of energy is needed from these sources, then their values can be considered as well.

To simplify the illustration, the end leaf node clients RC1 through RC11 will be referenced, even though other end leaf nodes described above are not referred unless otherwise noted, they should be involved in the calculations of energy flows at their appropriate domain levels. As an example, in FIG. 30, the energy information 3030 for a given periodic time window for each of the RCi clients are listed. The net energy for the lowest level domains, DomDTA 610, DomDTB 620, DomDTC 630, DomDTD 810, and DomDTF 820 is computed. For simplicity, the domain containing SSSC 270 is not included as shown in FIGS. 30-32.

At step 3430, the net energy at the lowest level for each domain is computed as follows:

For the periodic time window, compute $C_{dT}$, the total energy consumed for a given domain and also $P_{dT}$, the total energy produced in the domain.

$C_{dT} = \Sigma C_{di}$, where $C_{di}$ is each client that is a consumer of energy during the periodic time window.

$P_{dT} = \Sigma P_{di}$, where $P_{di}$ is each client that is a producer of energy during the periodic time window.

At step 3440, for each lowest level domain compute net energy produced or consumed by that domain. As an example, consider the domain DomDTA 610 encompassing the node DTA 305 and its children RC1 365, RC2 370, and RC3 375. RC1 365 is a producer of energy in the periodic time window, while RC2 370 and RC3 375 are consumers of energy during the same periodic time window. Therefore, $P_{d1}$=150 units, $C_{d2}$=75 units and $C_{d3}$=100 units.

$$C_{dT} = C_{d2} + C_{d3} = 75 + 100 = 175$$

$$P_{dT} = P_{d1} = 150$$

If $C_{dT} > P_{dT}$, then the domain is a net energy consumer consuming $$C_{dN} = C_{dT} - P_{dT}$$

If $P_{dT} > C_{dT}$, then the domain is a net energy producer consuming $$P_{dN} = P_{dT} - C_{dT}$$

In this example, $C_{dT}$ is greater than $P_{dT}$. Therefore, this domain encompassing node DTA 305 and its children, is a net energy consumer for the periodic time window. The net energy consumed is $$C_{dN} = 175 - 150 = 25 \text{ units}(906)$$

In case $P_{dT}$ is equal to $C_{dT}$, then no energy is consumed or produced in the periodic time window by this domain.

This process of computing the net energy consumed or produced in the periodic time window is carried out for all the lowest level domains encompassing all the end leaf node clients.

At step 3450, compute the net energy produced or consumed by the next higher-level domain based on the child node's values $P_{dN}$ and $C_{dN}$. At step 3460, repeat the process for the next higher-level domains until the root level node is reached. After finding the values of energy consumption or production for each of the lower level domains that encompass the lowest parent nodes DTA 305, DTB 310, DTC 315, DTD 425 and DTF 440, then the next higher domain's energy consumption or production is calculated. At this level the domains encompass the parent nodes SSSA 260 and SSSB 265. Moving further up, the energy consumption or production for the node encompassing PSS 255 is calculated.

Energy production or consumption for devices connected to the GSS 205 are not involved in the computations described in FIG. 34. The devices directly connected to the GSS 205 are POWER PLANT 210, SOLAR ARRAY 1220, BATTERY STORAGE 1 230 and HIC 1 240. Aside from HIC 1 240, the other devices may be managed by utility entities and as demarcated by the Level 1 domain are outside of the energy componentization. That is, when energy is produced by the PSS 255, it may not matter the amount of that energy that goes to BATTERY STORAGE 1 230 and how much goes to HIC 1 240. Similarly, when energy is consumed by the PSS 255, it may not matter how much energy is coming from the POWER PLANT 210, or from SOLAR ARRAY 1 220, or from BATTERY STORAGE 1

230, or from HIC 1 240, in case the heavy industry client also has power producing capabilities, via its own power plant, solar or stored energy. Also, HIC 1 240 is depicted as a single heavy industry client and its energy flow remains one-to-one between itself and the utility entity. No further componentization is needed. However, in instances where further componentization of energy flows is needed at levels up to the GSS 205, then the same method as described above can be applied.

Componentization of the Energy Flow

The componentization of the energy that flows from an energy producer to the farthest consumer and the splitting of that energy flow to other consumers along the way, while at the same time the flow merging with energy flows from other energy producers, is best illustrated with a few examples.

Figure 35:
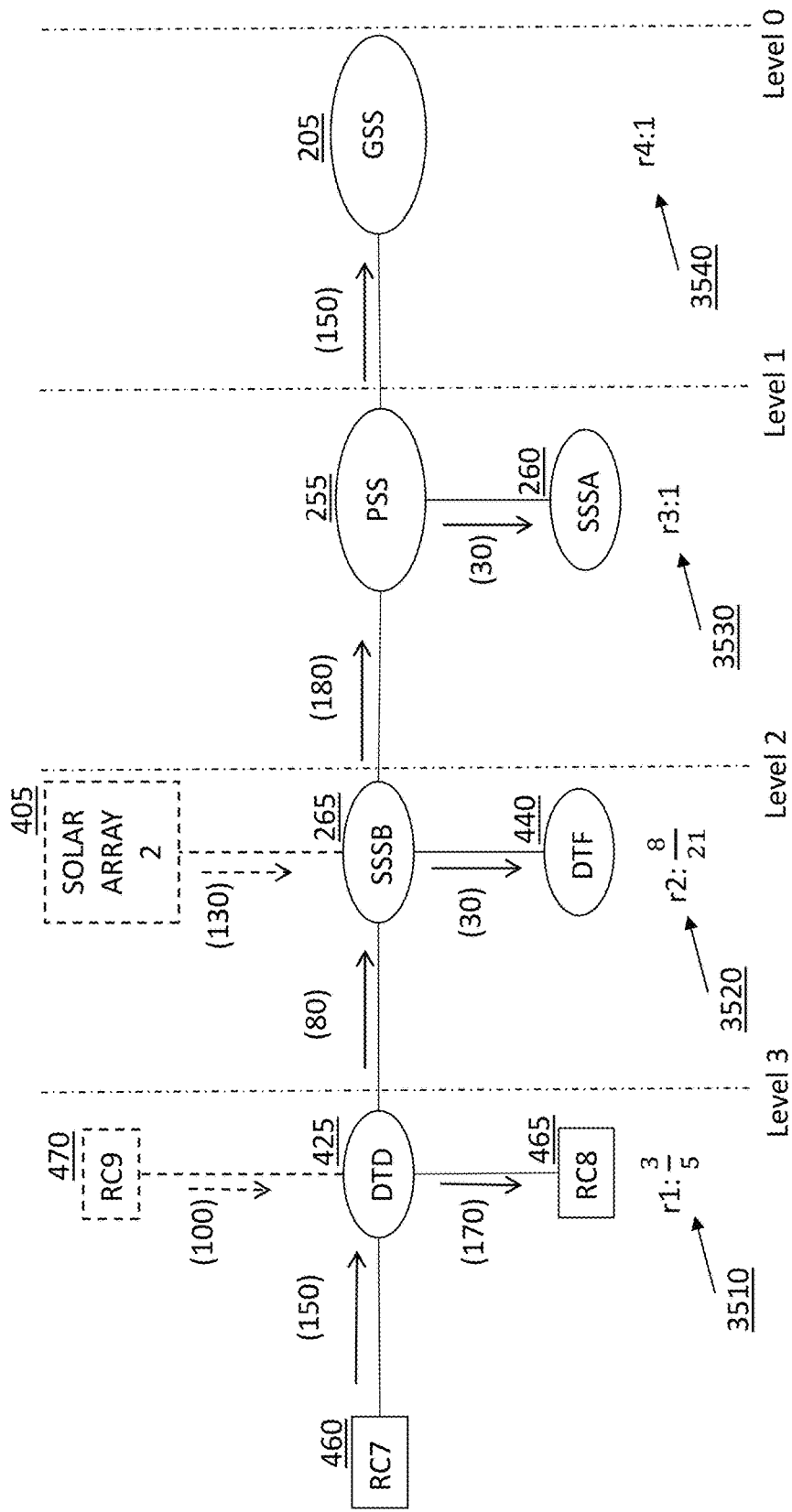
FIG. 35 shows the passage of energy produced and transmitted through the grid level domain hierarchy to the top node.

FIG. 35 shows the path of the energy flow in a linear fashion. The same energy flows are used as are shown in FIG. 31. The energy flow from client RC7 460 of 150 units of energy for a periodic time window. Traversing the path of energy flow up to the highest domain possible, a path of flow exists from RC7 460 to GSS 205. 150 units of energy flows from RC7 460 to DTD 425. DTD 425 is also connected to RC8 465 which is consuming energy and RC9 470 which is producing energy. The net energy at DTD 425 is an excess of energy in the amount of 80 units. That means that DTD 425 is an energy producer. The parent of DTD 425 is SSSB 265. At SSSB 265, energy is also received from SOLAR ARRAY 2 405, 130 units in the periodic time window. DTF 440 which is the other child node of SSSB 265, receives 30 units of energy in the periodic time window, via SSSB 265. There is a net excess energy of 180 units at SSSB 265, in the periodic time window. 30 units is consumed by SSSA 260 the other child of the PSS 255. The excess energy at the parent GSS 205 is 150 units. This path is also indicated as:

$$RC7\text{->}DTD\text{->}SSSB\text{->}PSS\text{->}GSS$$

The proportion of energy produced by a client (for instance RC7 460 here) and used by a consumer or consumed by the upper domain levels, is based on the ratio of the total incoming energy at the node to that of the energy injected by the client at that node. The total incoming energy at node DTD 425 is 150 units from RC7 460 and 100 units from RC9 470, which adds up to 250 units. Therefore, the proportion of RC7's 460 energy when distributed out to RC8 465 and SSSB 265, will be 150/250, or 3/5. This ratio is denoted as r1 3510. Similarly, ratios r2 3520, r3 3530 and r4 3540 are determined. Note that the values of r3 3530 and r4 3540 in this example are 1. Since, the amount of flow from the direction of RC7 460 into the PSS 255 is 180 units, and that happens to be the only energy coming into the PSS 255, the ratio of energy from the lower level domain to the total energy coming into PSS 255 is 180/180=1. Similarly, for r4 3540, the ratio is 150/150=1.

Energy produced by RC7 460 (150 units) is consumed by RC8 465, by clients via DTF 440, by clients via SSSA 260 and by clients via GSS 205.

FIG. 36 shows the calculations for the ratios that are used to determine the partial amount of energy produced at a node, here energy produced at RC7 460 is shown for illustration. The following equations (with values noted as J, K, L and M) show the partial amounts of energy produced by RC7 460 that are consumed or transitioning through various nodes—

At $RC8$: $r1 \cdot 170 = 3/5 \cdot 170 = 102\text{->}J$

At $DTF$: $r1 \cdot r2 \cdot 30 = 3/5 \cdot 8/21 \cdot 30 = 6.86\text{->}K$

At $SSSA$: $r1 \cdot r2 \cdot r3 \cdot 30 = 3/5 \cdot 8/21 \cdot 1 \cdot 30 = 6.86\text{->}L$ At $GSS$: $r1 \cdot r2 \cdot r3 \cdot r4 \cdot 30 = 3/5 \cdot 8/21 \cdot 1 \cdot 1 \cdot 150 = 34.28\text{->}M$ To clarify further—

At RC8: 102 units consumed by RC8 (within the same domain DomDTD as producer RC7)

At DTF: 6.86 units consumed by end node clients in DomDTF

At SSSA: 6.86 units consumed by end node clients in DomSSSA

At GSS: 34.28 units consumed by HIC 1 and/or utility entity device BATTERY STORAGE 1

This shows that the part of the energy (102 units) produced by RC7 460 is consumed by a peer client RC8 465 within its domain DomDTD 810. Some part of the energy (6.86) is consumed by clients in the peer domain DomDTF 820. Further, some part of the energy (6.86) is consumed by clients in the higher-level peer domain DomSSSA 710. Finally, the remainder of the energy (34.28) transitions through GSS 205 where it may be consumed in whole or in part by HIC 1 240, and in whole or in part by BATTERY STORAGE 1 230. Energy transitioning through GSS 205 may also mean that some part of the energy produced by RC7 460 has been utilized by the utility entity or entities.

Note that a portion of the energy was consumed by RC8 465, then that portion is within the same domain DomDTD 810, which is at the lowest level. The energy did not have to travel a larger distance. Distance meaning impedance, where the greater physical distance can also lend to increased impedance. The portion of energy consumed by clients in the DomDTF 820, must transition up through the lower level domain DomDTD 810 to DomDTF 820. Similarly, the portion of energy consumed by clients in DomSSSA 710, must transition up further through DomSSSB 910. Lastly, in this example, the portion of energy consumed by clients through GSS 205, must transition further up through DomPSS 1110.

The more layers of domains the energy is pushed through, the higher the impedance which is the losses, inefficiencies and wear and tear on the infrastructure. The most efficient use of the generated energy is when almost all of it is consumed locally within the same domain. By splitting the energy produced by RC7 460 in this example, the various flows or splits of energy are assigned a cost for transferring the energy through zero or more domain layers.

Note that domains can be structured by grouping any set of end node clients with the distribution transformers and also going further up the tree. Also, the end node clients can be a domain within themselves. Every transition up the domain levels can be assigned a weight or distance bias to reflect the impedance along those connections. For example, client RC7 460 may have longer transmission wires when connecting to DTD 425, and hence RC7 460 may have its own domain. So, when the energy crosses that domain, there will be a slightly higher cost for that energy transition, and therefore a higher weight could be assigned to that domain crossing. The method described in this disclosure to break the energy flows and assign cost based on impedance is flexible to mapping domains as described above. A more detailed explanation follows where the derivation of "SellingPrice" and "BuyingPrice" is explained.

Note that while theoretically, the ratio of the energy flows when more than one energy source or producer is present at a node, is as described above, the practical measurable, or not so easily measurable, parameters of impedance of interconnects, temperature effects, etc. can affect the ratios to some degree. All in all, the energy flows can be viewed as the energy getting pooled in at the node and flowing out to the consumers. The ratio method described above represents a fair spread of allocation of the quantities of energies for all practical purposes and is the basis for the calculation of quantities of energy flows in assigning the price of energy, either as a cost to the consumer or selling price for the producer. Based on actual node or client distances, or other factors, appropriate domains can be created around certain nodes to imply domain crossing costs associated with a certain node or nodes.

The above method can also be applied to determine the quantities of energy components when energy flows between two end leaf nodes, where one end leaf node is a producer and the other end leaf node is a consumer, together with other producers and consumers being connected along the path.

Figure 37:
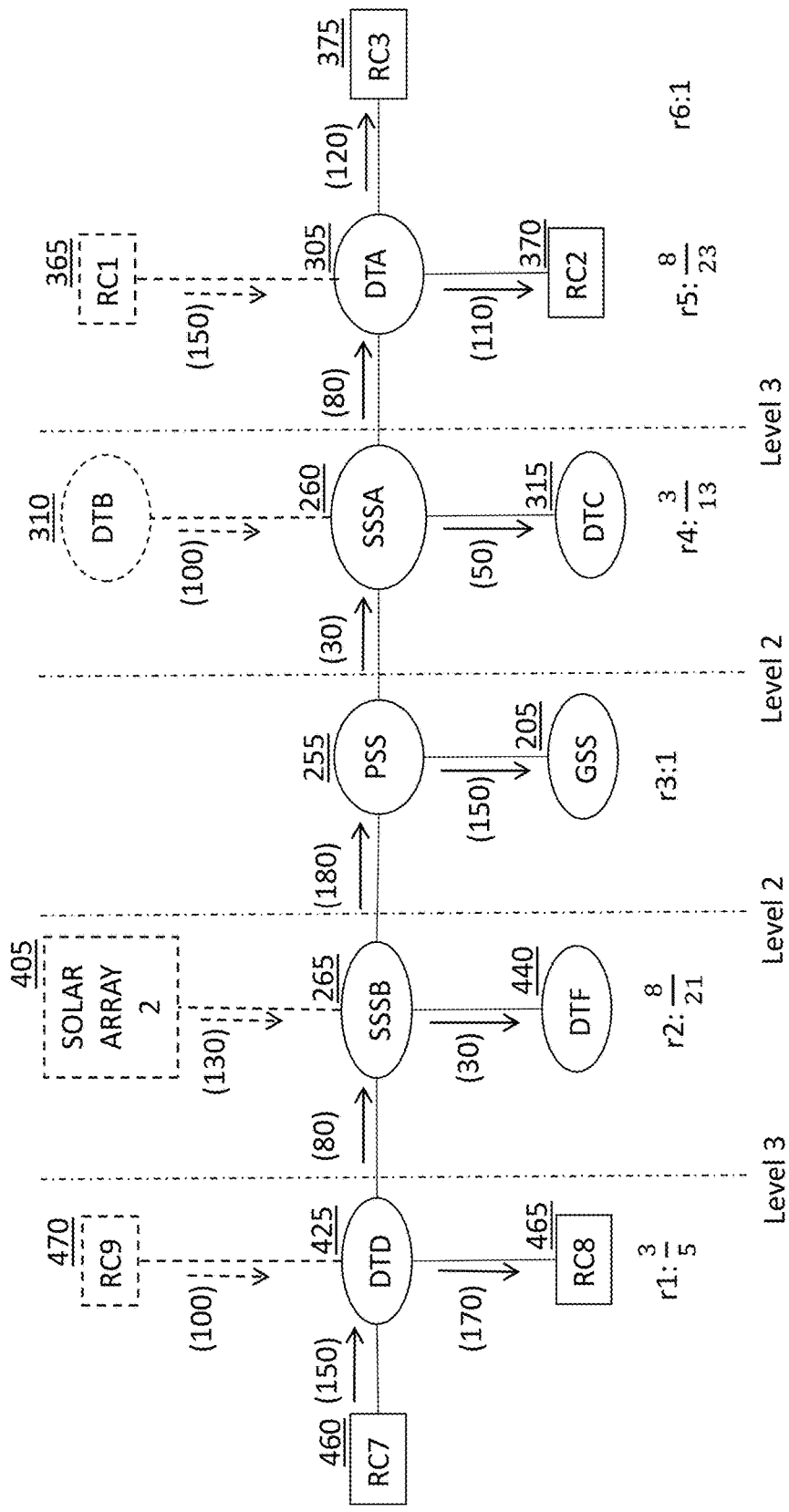
FIG. 37 shows the passage of energy produced and transmitted through the grid level domain hierarchy to a different client node.

FIG. 37 shows a new variation in the energy flow where the energy produced by RC7 460 flows to RC3 375. The same method as described above for determining the components or fractions of the energy produced by an end leaf node client consumed by various clients or domains, can be used for determining the components or fractions of energy, consumed by an end leaf node client that are, produced by various clients or domains.

FIG. 38 shows the calculations to determine the components of energy produced at RC7 460 that are consumed by various nodes as the energy travels from RC7 460 to RC3 375 where the final component of the energy generated is consumed.

Figure 39:
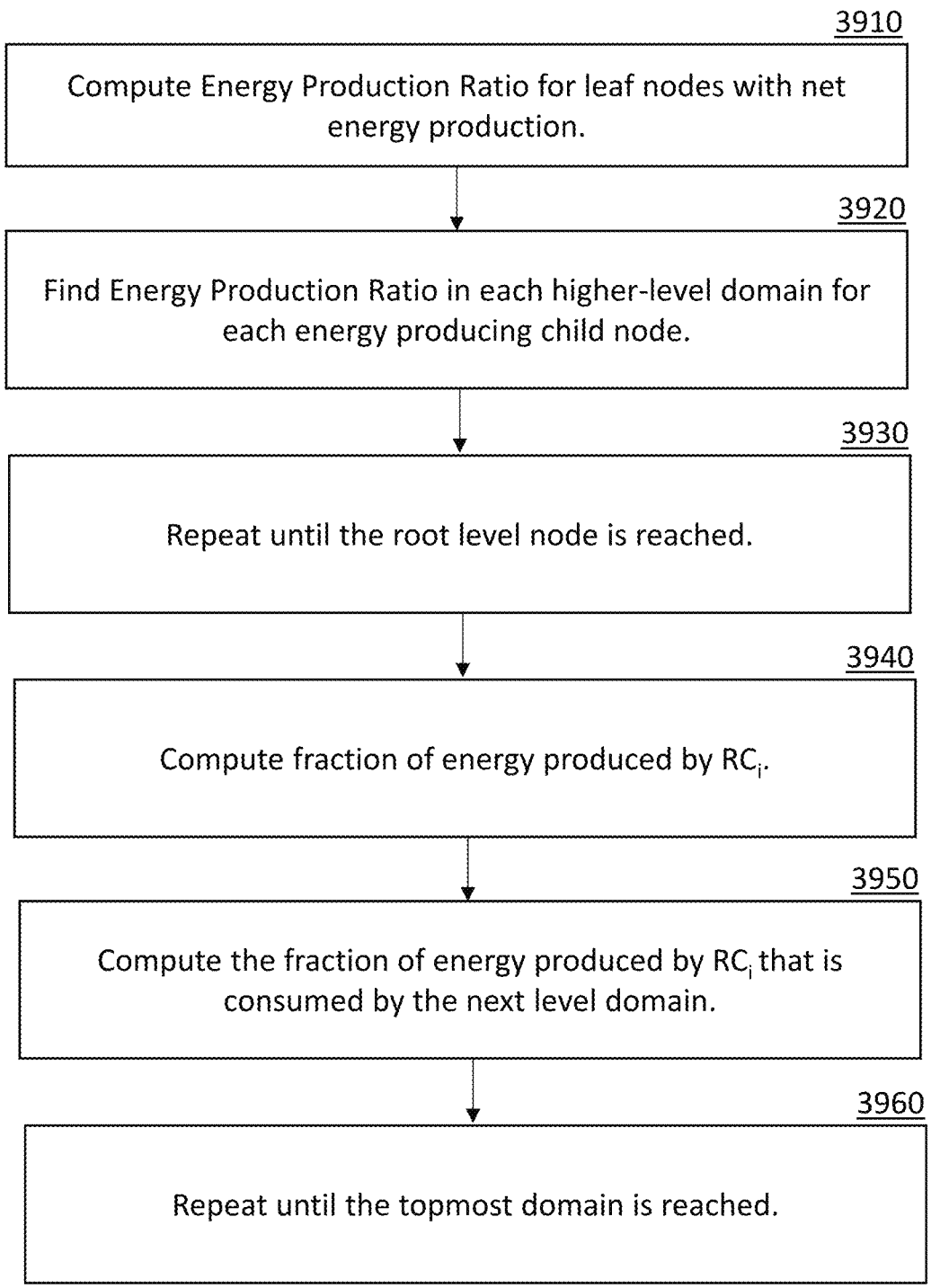
FIG. 39 illustrates the steps for breaking down the quantity of energy that is consumed at each domain level.

FIG. 39 shows the high-level flow chart steps for determining the component or fraction of energy produced by $RC_i$ that is consumed at each domain level as the energy propagates till the topmost node, if not entirely consumed prior to reaching the topmost node or root. Note, that adding all the fractional components of the energy produced will result in the original value of energy produced during that periodic time window.

At step 3910, for each leaf node $RC_i$ in the lowest level domains, if there is net energy production by the containing domain then, compute Energy Production Ratio $EPR_i=(P_{di})/(P_{dT})$ for each leaf node $RC_i$ in those lowest level domains. At step 3920, repeat process for the next higher-level domains in finding their Energy Production Ratio for each of its energy producing child nodes. At step 3930, repeat until the root level node is reached. At step 3940, compute fraction of energy produced by RCi that is consumed in its lowest level domain by multiplying the Energy Production Ratio for that leaf node RCi for that domain (lowest level domain) and the total energy consumed in that domain: $FPdi=EPRi \times CdT$. At step 3950, compute the fraction of energy produced by RCi that is consumed by the next level domain by cascaded multiplication of Energy Production Ratios of the current domain and its child domains along the path from the leaf node RCi, and multiplying that by the total energy consumed in that domain: $FPdN=EPR1 \times EPR2 \times \ldots \times EPRN \times CdT$. At step 3960, repeat until the topmost domain is reached.

Figure 40:
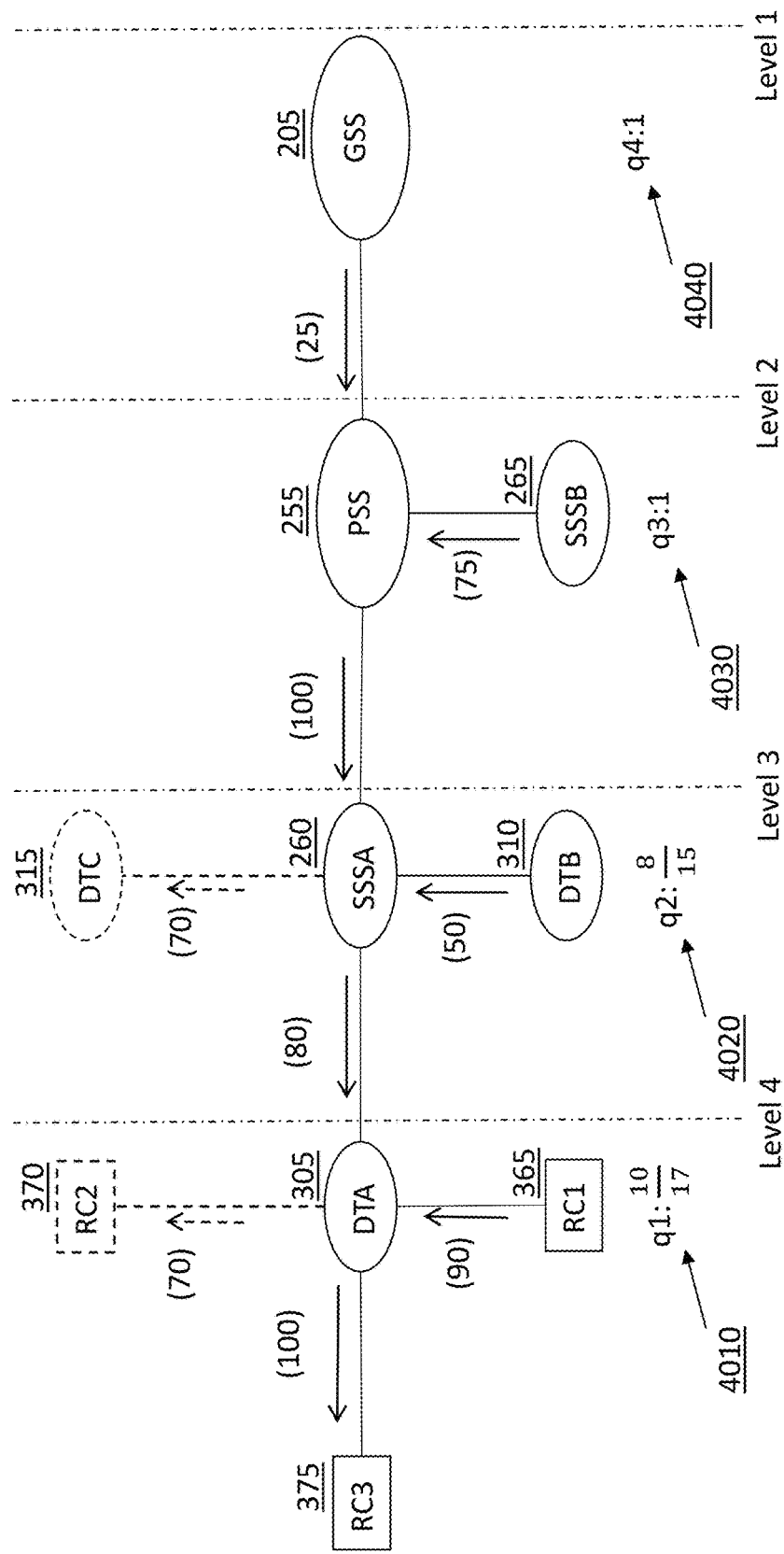
FIG. 40 shows the passage of energy produced and transmitted through the grid level domain hierarchy from substation to clients.

FIG. 40 shows another example of energy production and consumption within different level domains. This example shows an energy consumer client RC3 375 where 100 units of energy is consumed in a given time window. Components or fractions of energy that RC3 375 consumes from different producers starting from its own local domain DomDTA 610, then from the next level up from domain DomSSSA 710, from domain DomPSS 1110 and finally from the topmost node GSS 205.

This path is also indicated as—

RC3<-DTA<-SSSA<-PSS<-GSS

Note the ratios at each domain level q1 4010, q2 4020, q3 4030, and q4 4040 are determined. Here, the fraction or the proportion of energy consumed by the client node RC3 375 to that consumed at the domain level is computed. Client level energy consumed is 100 units. Total energy consumed at that domain level DomDTA 610 is 170 (100+70). Therefore, the ratio of energy consumed by RC3 375 is 10/17. Similarly, ratios at higher level domains are computed for all energy at that domain level moving towards RC3 375.

FIG. 41 shows the computations for the component breakdown of energy source from each domain. Those resulting calculations all add up to 100 the total energy consumed by RC3 375.

Energy consumed by RC3 375 (100 units) is produced by RC1 365, by clients via DTB 310, by clients via SSSB 265 and by clients via GSS 205.

The following equations (with values noted as P, Q, R and S) show the partial amounts of energy consumed by RC3 375 that are produced or transitioning through various nodes—

At $RC1$: $q1 \cdot 90 = 10/17 \cdot 90 = 52.94 \text{->} P$

At $DTB$: $q1 \cdot q2 \cdot 30 = 10/17 \cdot 8/15 \cdot 50 = 15.69 \text{->} Q$ At $SSSB$: $q1 \cdot q2 \cdot q3 \cdot 30 = 10/17 \cdot 8/15 \cdot 1 \cdot 75 = 23.53 \text{->} R$ At $GSS$: $q1 \cdot q2 \cdot q3 \cdot q4 \cdot 30 = 10/17 \cdot 8/15 \cdot 1 \cdot 1 \cdot 25 = 7.84 \text{->} S$ To clarify further—

At RC1: 52.94 units are produced by RC1 (within same domain DomDTA as consumer RC3)

At DTB: 15.69 units produced by end node clients in DomDTB

At SSSB: 23.53 units produced by end node clients in DomSSSB

At GSS: 7.84 units produced by POWER PLANT and/or SOLAR ARRAY 1 and/or BATTERY STORAGE 1

This shows that the part of the energy (52.94 units) consumed by RC3 375 is produced by a peer client RC1 365 within its domain DomDTA 610. Some part of the energy (15.69) is produced by clients in the peer domain DomDTB 620. Further, some part of the energy (23.53) is produced by clients in the higher-level peer domain DomSSSB 265. Finally, the remainder of the energy (7.84) transitions through GSS 205 where it may be produced in whole or in part by POWER PLANT 210 and/or SOLAR ARRAY 1 220 and/or BATTERY STORAGE 1 230. Energy transitioning through GSS 205 may also mean that some part of the energy consumed by RC3 375 has been produced by the utility entity or entities.

Figure 42:
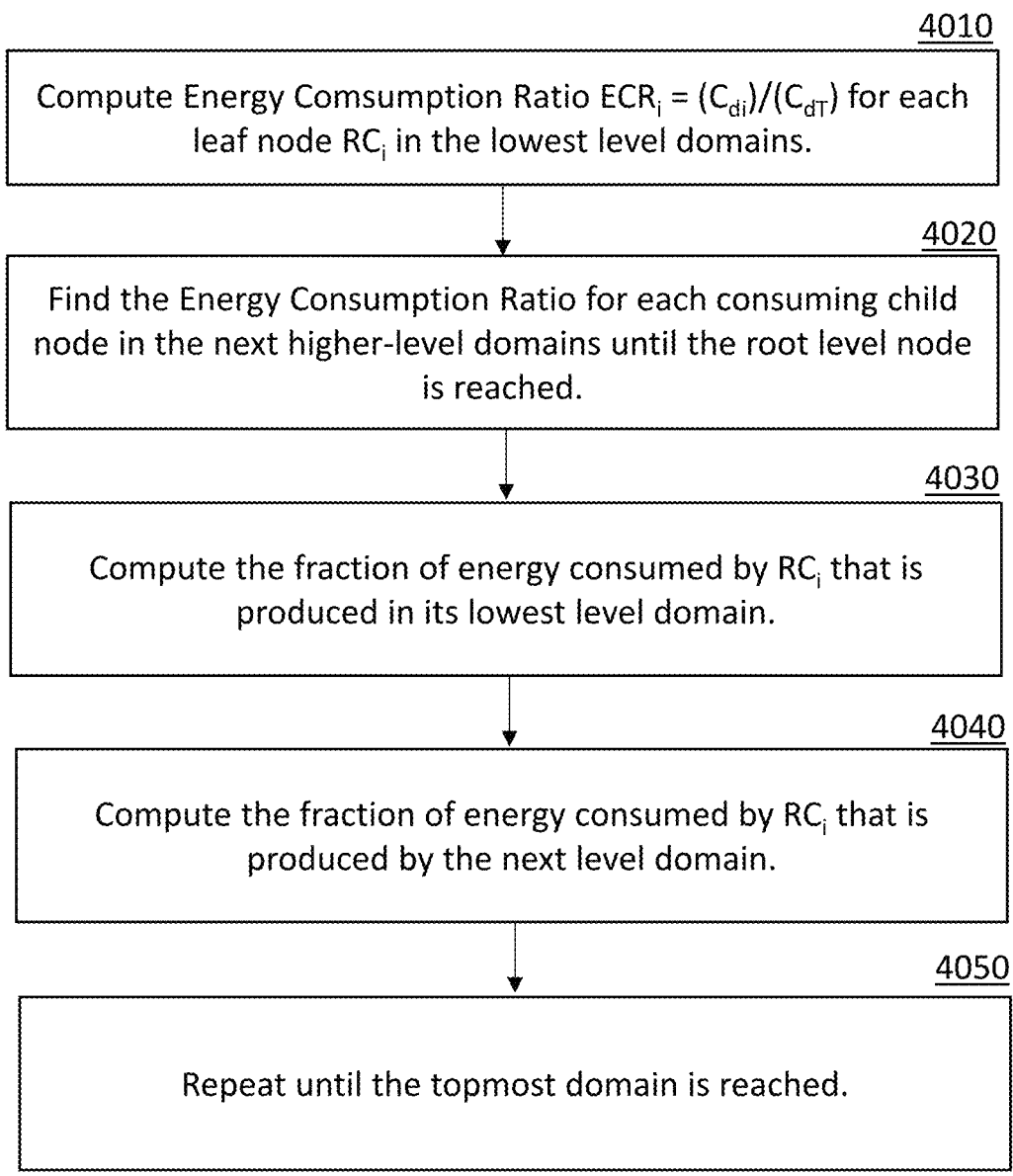
FIG. 42 illustrates the steps for breaking down the quantity of energy that is provided by each domain level to form the total energy consumed by the client.

FIG. 42 shows the high-level flow chart steps for determining the component or fraction of energy consumed by $RC_i$ that is produced at each domain level all the way up to the topmost node or root, or if not entirely produced prior to reaching the topmost node or root. Note, that adding all the fractional components of the said energy consumed from different domains will result in the original value of energy consumed by $RC_i$ during that time window.

At step 4010, for each leaf node $RC_i$ in the lowest level domains, if there is net energy consumption by the containing domain then, compute Energy Consumption Ratio $ECR_i=(C_{di})/(C_{dT})$ for each leaf node $RC_i$ in those lowest level domains. At step 4020, repeat the process for the next higher-level domains in finding their Energy Consumption Ratio for each of its energy consuming child nodes, until the root level node is reached. At step 4030, compute the fraction of energy consumed by $RC_i$ that is produced in its lowest level domain by multiplying the Energy Consumption Ratio for that leaf node $RC_i$ for that domain (lowest level domain) and the total energy produced in that domain: $FC_{di}=ECR_i \times P_{dT}$. At step 4040, compute the fraction of energy consumed by $RC_i$ that is produced by the next level domain by cascaded multiplication of Energy Consumption Ratios of the current domain and its child domains along the path from the leaf node $RC_i$, and multiplying that by the total energy produced in that domain: $FC_{dN}=ECR_1 \times ECR_2 \times \ldots |ECR_N \times P_{dT}$. At step 4050, repeat until the topmost domain is reached.

Figure 43:
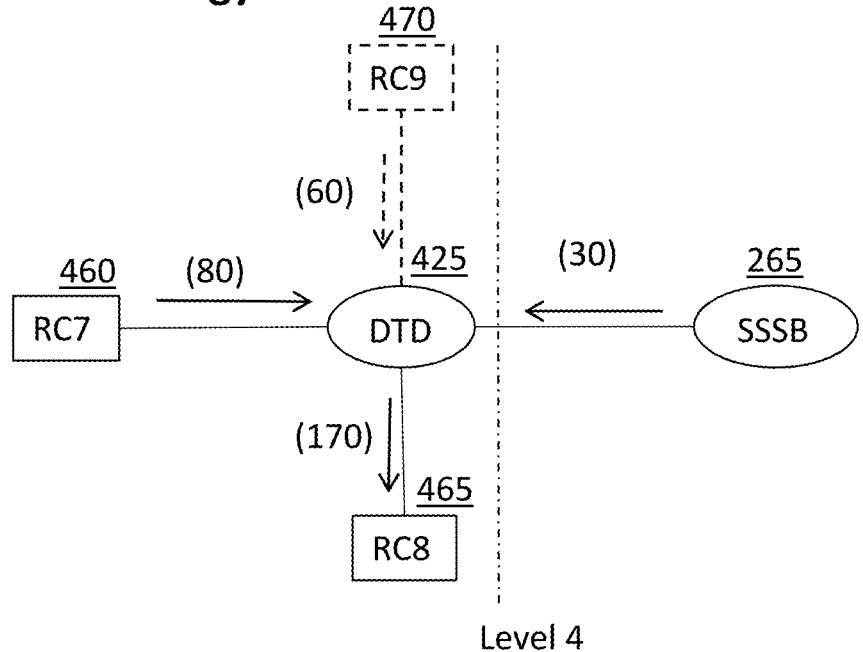
FIG. 43 illustrates an energy flow scenario where all the energy produced by the lowest level client stays within the lowest level client's domain.

FIG. 43 shows a portion of the grid topology with new energy flow values. In FIG. 43, the client node RC7 460 is a producer node in the periodic time window. The domain DomDTD 810 is a consumer domain for the periodic time window. DomDTD 810 receives energy of 30 units from the parent node SSSB 265. From the point of view of RC7 460, all the energy that it produces gets consumed entirely within the domain DomDTD 810.

Figure 44:
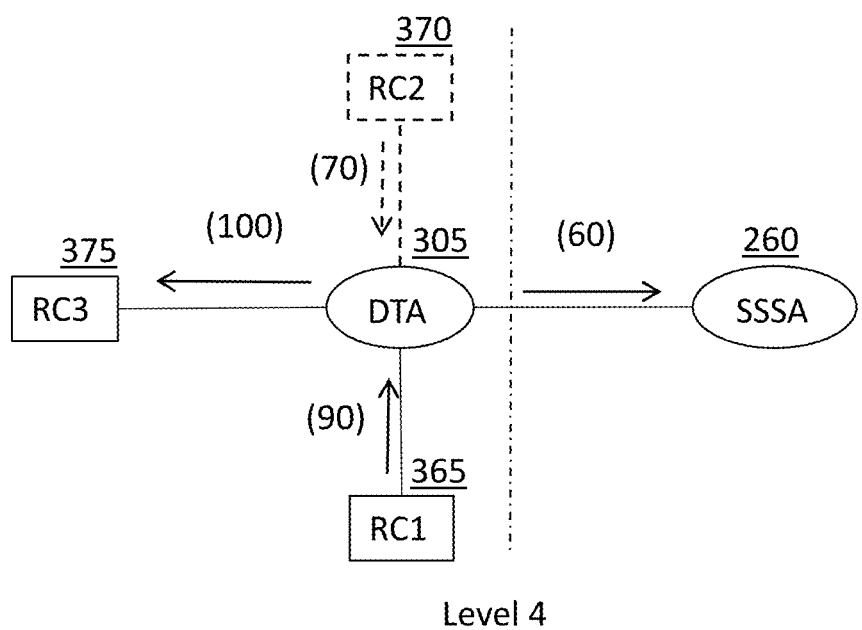
FIG. 44 illustrates an energy flow scenario where all the energy consumed by the lowest level client comes from within the lowest level client's domain.

FIG. 44 shows a portion of the grid topology with new energy flow values. In FIG. 44, the client node RC3 375, is a consumer node in the given periodic time window. The domain DomDTA 610 is a producer domain for the periodic time window. DomDTA 610 provides energy of 60 units to the parent node SSSA 260. For client node RC3 375, all the energy that it consumes is produced entirely within the domain DomDTA 610.

Consider the values J, K, L, M from the equations referred earlier pertaining to the view from RC7 460 as producer.

Energy produced by RC7 460 in the time window=$P_{TW}$=J+K+L+M=150 units.

Note that the J portion of energy gets consumed in the local domain of RC7 460, DomDTD 810.

Portion K gets consumed in the next higher-level domain DomSSSB 910.

Portion L gets consumed in still the next higher-level domain DomPSS 1110.

And Portion M gets consumed by the utility entity or entities.

The energy flow experiences the least impedance and wear and tear of the infrastructure when the energy produced is consumed after traveling the shortest distance. The shortest distance would be within the same domain, while there would be most wear and tear on the infrastructure when energy travels the farthest distance, that is to the root node, or topmost node which is typically at the utility level.

The preferred selling price for selling the energy produced by RC7 460 in this example is as follows—

SellingPrice=$S_3 \cdot J + S_2 \cdot K + S_1 \cdot L + S_0 \cdot M$ where $S_0$, $S_1$, $S_2$, and $S_3$ are the per unit rates for those components of energy consumed at the topmost domain level 0 being $S_0$, the rate for energy consumed at the next lower level 1 being $S_1$, and so forth. The per unit rates should be structured as $S_3>S_2>S_1>S_0$, for effective incentivization in the adjustment of an energy production profile. The portion of energy that gets consumed by the closest distance or least impedance client fetches the highest price for the producer. Therefore, as much energy produced by the producer client in the given periodic time window can be entirely consumed by clients within the same domain as the producer client, then the higher the revenue the client can get for that time window. Note that any portion of the energy from one producer end leaf node traversing up the domain hierarchy and then down to another consumer leaf node through other peer domains, does have a larger distance to traverse (or experiences more impedance) and hence costs more. It is possible to set the higher domain traversing related rates, for instance $S_0$ or $S_1$ such that they account for the traversal of energy in the downward journey from the higher domains. Alternatively, as shown in FIGS. 37 and 38, it can be possible to figure out the price of the portions of energy from both, the producer perspective to determine the SellingPrice and from the consumer perspective to determine the BuyingPrice, as the portions of energy traverse from one producer end leaf node to another consumer end leaf node in another domain, by applying the method just described above.

Similarly, consider the values P, Q, R, S from the above equations pertaining to RC3 375 as a consumer.

Energy consumed by RC3 375 in the time window=$C_{TW}$=P+Q+R+S=100 units.

Note that P portion of energy is produced in the local domain of RC3 375, DomDTA 610.

Portion Q is from the next higher-level domain DomSSSA 710.

Portion R is from still the next higher-level domain DomPSS 1110.

And Portion S is provided by the utility entity or entities.

There is least impedance and wear and tear of the infrastructure when the energy consumed, is produced by sources having the closest distance which would be within the same domain, on the other hand there would be the most wear and tear on the infrastructure when the energy travels the farthest distance, that is from the root node, or from the topmost node which is typically at the utility level. This is depicted by the example in FIG. 44, which are also referenced in the preceding paragraphs above.

The preferred buying price for buying the energy consumed by RC3 375 in this example can be as follows—

BuyingPrice=$B_3 \cdot P + B_2 \cdot Q + B_1 \cdot R + B_0 \cdot S$ where $B_0$, $B_1$, $B_2$, and $B_3$ are the per unit rates for those components of energy produced at the topmost domain Level 0 being $B_0$, the rate for energy produced at the next lower level 1 being $B_1$, and so forth. The per unit rates should be structured as $B_3<B_2<B_1<B_0$, for effective incentivization in the adjustment of an energy production profile. The portion of energy that is produced by the closest distance or least impedance client is the least expensive for the consumer. Therefore, as much energy consumed by the consumer client in the given periodic time window that can be entirely produced by clients within the same domain as the consumer client, then the cost to that consumer client will be the lowest in that time window.

Energy Profiles and Optimization Feedback

Let the energy producing clients A, B, C, and energy consuming clients J, K, L, belong to the same local domain U. Note that the terms J, K, and L are reused here, and represent clients, and not the equations referred to earlier.

Figure 45:
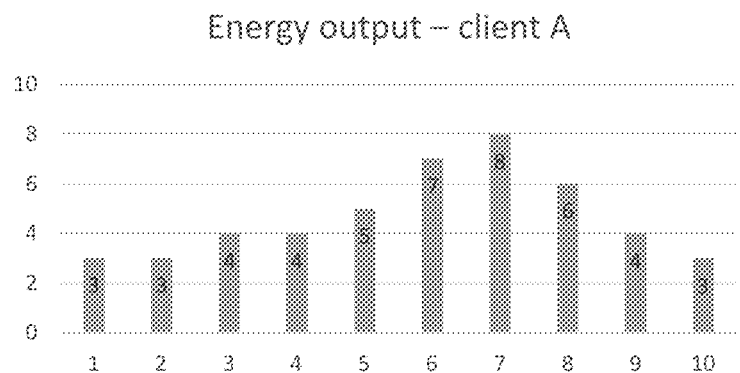
FIG. 45 illustrates one embodiment of energy production profiles for a client.
Figure 46:
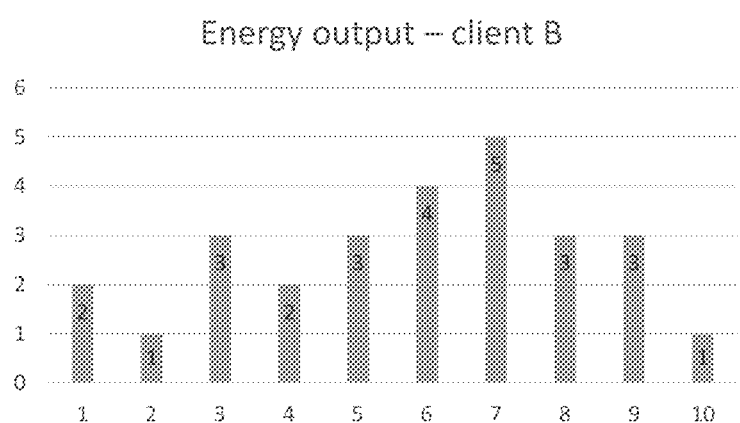
FIG. 46 illustrates one embodiment of energy production profiles for a client.
Figure 47:
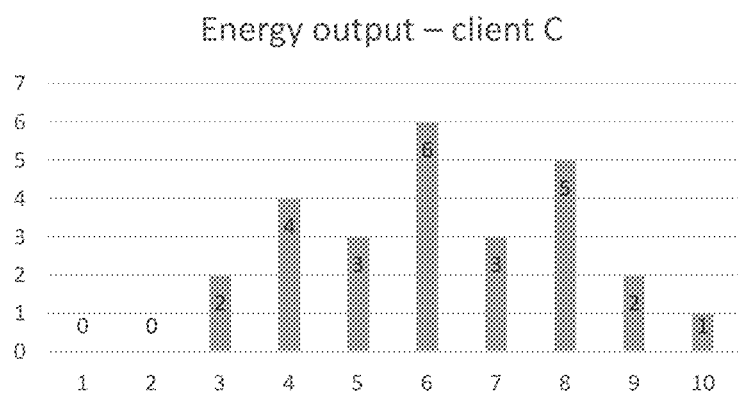
FIG. 47 illustrates one embodiment of energy production profiles for a client.

FIG. 45 shows a sample energy production profile for client A. FIG. 46 shows a sample energy production profile for client B. FIG. 47 shows a sample energy production profile for client C. Ten periodic time windows are shown in each graph marked 1 through 10. The energy produced in each periodic time window for each client are plotted on the x-axis of the bar graph and the value of energy produced is plotted on the y-axis and is also noted at the top of each bar. While, using a 5 minute periodic time window will generally be used in practice, these graphs show a periodic time window of 1 hour for ease of illustration.

Figure 48:
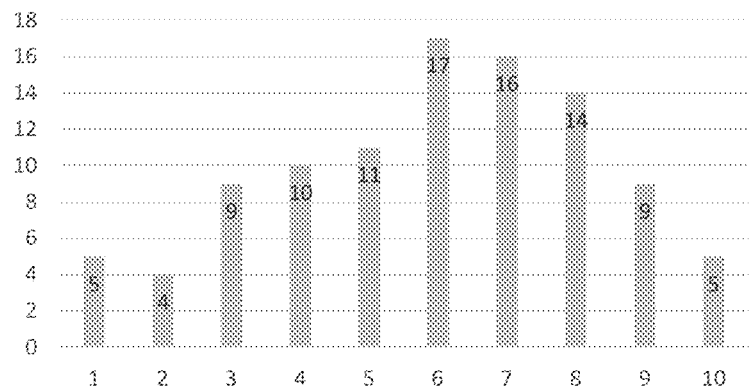
FIG. 48 shows the summation of the energy production profiles for clients within the same domain.

FIG. 48 shows the aggregation of the values of energy produced by clients A, B, and C for the periodic time windows.

Figure 49:
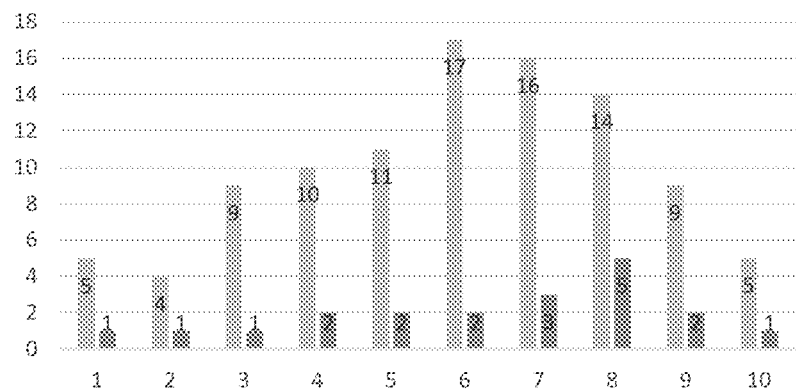
FIG. 49 shows a comparison between the summation of the energy production profiles of clients A, B, and C with the energy consumption of client J.

FIG. 49 shows the aggregation values of energy produced by clients A, B and C as in shown in FIG. 48, together with energy consumption values of client J for the same periodic time windows. The energy consumption values for client J are shown with darker energy profile bars. Client J can see their own consumption profile and also the aggregate profile of the energy producers mapped in the same periodic time windows. The objective is to incentivize client J to modify or adjust client their energy consumption profile so that it follows closely with the energy production profile in the domain. Client J is incentivized by lower energy costs resulting from more efficient use of the generated energy.

While FIG. 49 shows consumer client J's energy profile together with the energy producing client profiles (clients A, B and C). The same type of consumer energy profile is also generated for the other consumer clients K and L. The method will be described for client J, but also applies in this example to clients K and L.

Client J's energy profile is modified or adjusted to increase or decrease energy use during certain periodic time windows. These modifications or adjustments to the amount of energy used by client J are made on a per periodic time window or time-slot basis.

Let the following be the client's energy consumption and production for clients A, B, C, J, K and L, in a periodic time window, all of which belong to the lowest level domain U—

Energy produced by client A—$EP_A$
Energy produced by client B—$EP_B$
Energy produced by client C—$EP_C$
Energy consumed by client J—$EC_J$
Energy consumed by client K—$EC_K$
Energy consumed by client L—$EC_L$
Total energy produced in the domain U—

$$P_{dT}=EP_A+EP_B+EP_C$$

Total energy consumed in the domain U—

$$C_{dT}=EC_J+EC_K+EC_L$$

The ratio of energy consumed by client J, to the total energy consumed in the domain is determined—

$$RC_J=EC_J/C_{dT}$$

In order to close the gap of energy consumption and energy production within the same domain U, client J's energy consumption needs to be adjusted for each periodic time window. Client J cannot adjust to accommodate the full gap in the domain, instead, client J can adjust to its proportional consumption in the periodic time window. This is where the ratio for client J, $RC_J$ is used. Each consumer client is expected to adjust their consumption for the periodic time windows to bridge the gap for consumption of the total energy produced in the domain. The amount of adjustment needed for client J, for a given periodic time window is determined by the method described below:

The difference between the total energy produced and the total energy consumed in the domain by the clients is calculated (this does not count any energy movement through the link to parent of the domain).

$$DPE_U=P_{dT}-C_{dT}$$

Amount of change to be made by client J for the periodic time window is calculated as follows—

$$dEC_J=RC_J \cdot DPE_U$$

Similarly, the change to be made by clients K and L for the periodic time window is calculated as follows—

$$dEC_K=RC_K \cdot DPE_U, \text{ and}$$

$$dEC_L=RC_L \cdot DPE_U$$

In practice, the preferred change to be made must be slightly less than $dEC_J$, $dEC_K$, and $dEC_L$.

That is, $$dEC_J=df \cdot RC_J \cdot DPE_U$$

$$dEC_K=df \cdot RC_K \cdot DPE_U, \text{ and}$$

$$dEC_L=df \cdot RC_L \cdot DPE_U$$

where df is the damping factor having a value between 0 and 1. Preferred value can be about 0.8. Note, that the damping factor will have the effect of not fully bridging the gap, but leaving a slight amount of gap.

Both consumer clients and producer clients will be motivated to bridge the gap between production and consumption within a periodic time window. To bridge the gap, energy producing clients may adjust their energy output up or down based on whether there is a shortage or an excess of energy within the domain. Energy consuming clients may adjust their energy use up or down based on whether there is an excess or a shortage of energy within the domain. Since, the consumer clients and the producer clients will be adjusting in opposite directions this will result in new energy consumption and production profiles that may cause the consumers and producers to overshoot their targets since both profiles are moving targets. The process of balancing production and consumption could repeat endlessly in an oscillating fashion.

Thus, the introduction of the damping factor ensures that there won't be significant overshoot, and that with subsequent cycles of adjustment, the overshoot would keep getting minimized until it reaches an equilibrium. The damping factor value can be evaluated continuously based on the amount of recent changes in the predetermined cycle, be it daily, weekly, etc., of energy consumption or production in a given periodic time window in that cycle, where the damping factor is assigned a value closer to 1 when such changes, between the corresponding periodic time windows in the cycles are the least. If one of the profiles, that is the total of energy production profiles or the total of energy consumption profiles, cannot be adjusted, that means no change for the periodic time window in the cycle, then that time window in the profile will not be a moving target. If an energy profile cannot be adjusted then the other profile time windows where the energy produced or consumed that can be adjusted could will have a damping factor (df value) of 1 that would attempt to bridge the complete gap in one adjustment.

Figure 50:
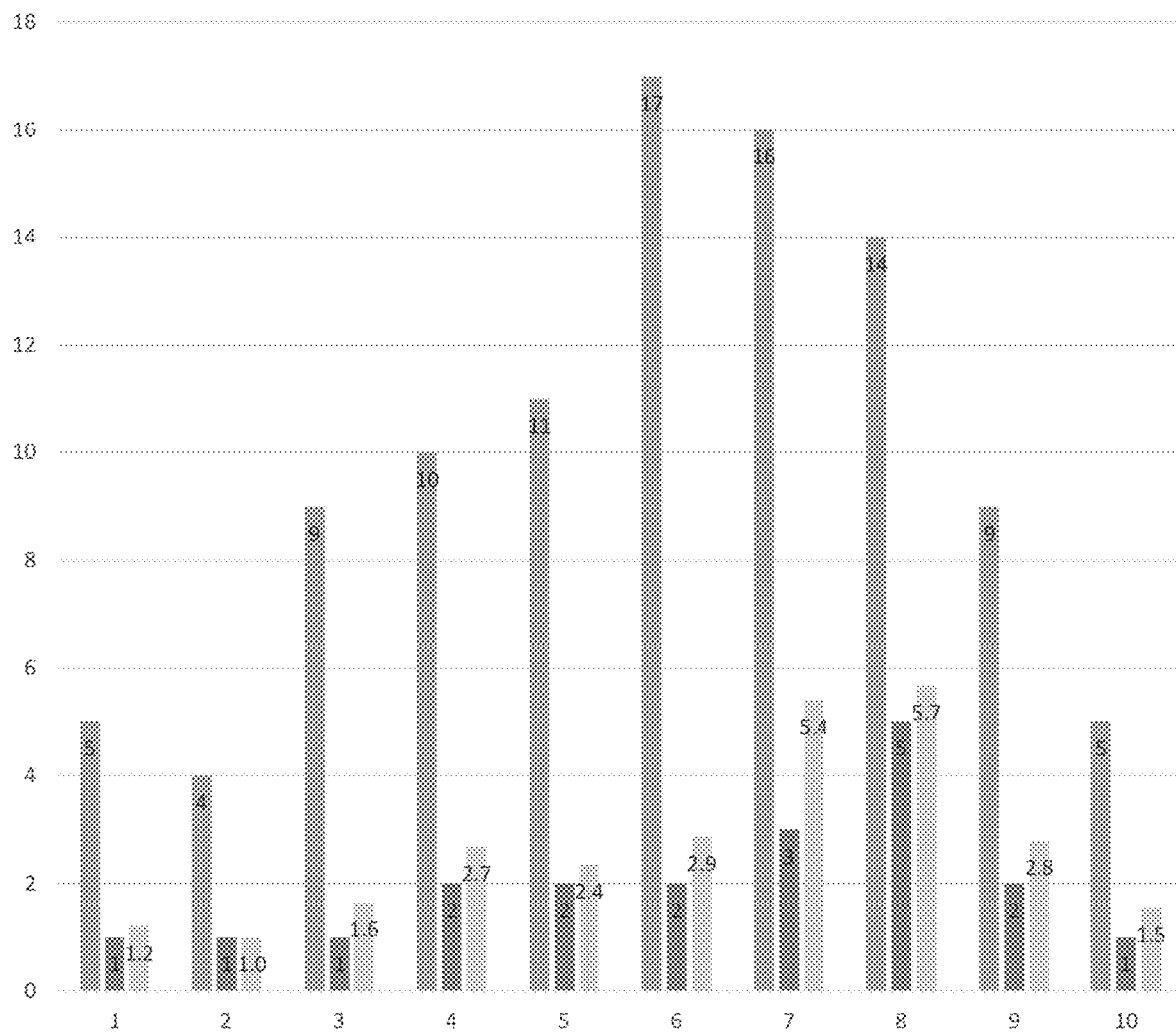
FIG. 50 shows a comparison between the summation of the energy production profiles of clients A, B, and C, the energy consumption of client J, and the target energy consumption to be achieved by client J.

FIG. 50 shows the aggregation values of energy produced by clients A, B and C, the energy consumption values of client J and the target values to be reached by consumer client J. The target values to be reached by consumer client J are computed as described above. The aggregation values of energy produced by clients A, B, C are the left bars in each periodic time window. The energy consumption values of client J are the center bars in each periodic time window. The target values to be reached by consumer client J are the right bars in each periodic time window.

Figure 51:
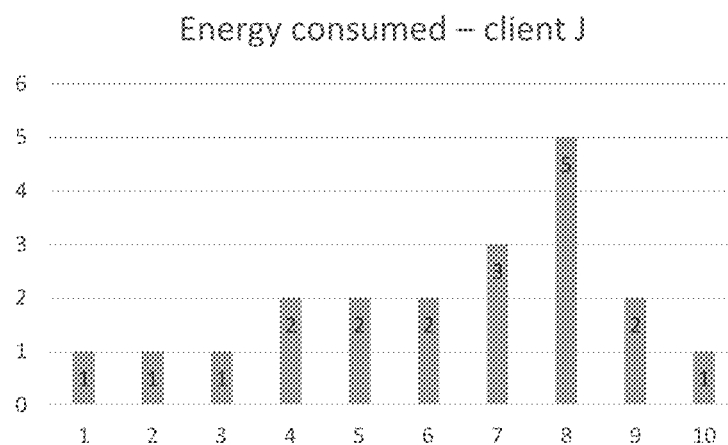
FIG. 51 illustrates one embodiment of an energy consumption profile for a client.
Figure 52:
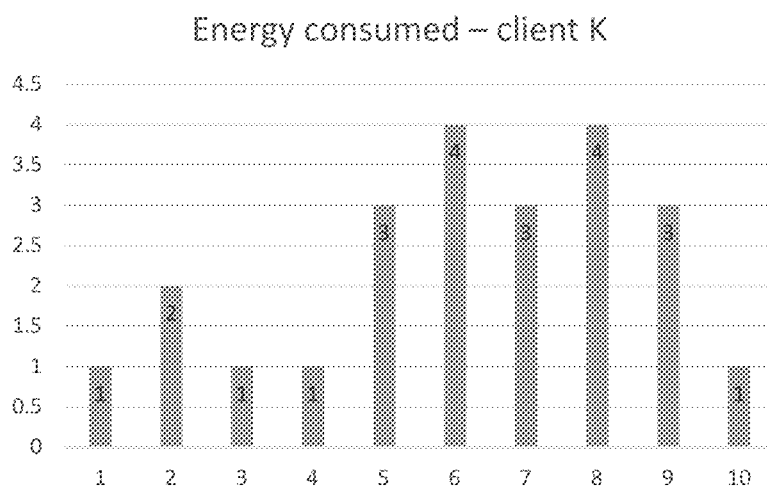
FIG. 52 illustrates one embodiment of an energy consumption profile for a client.
Figure 53:
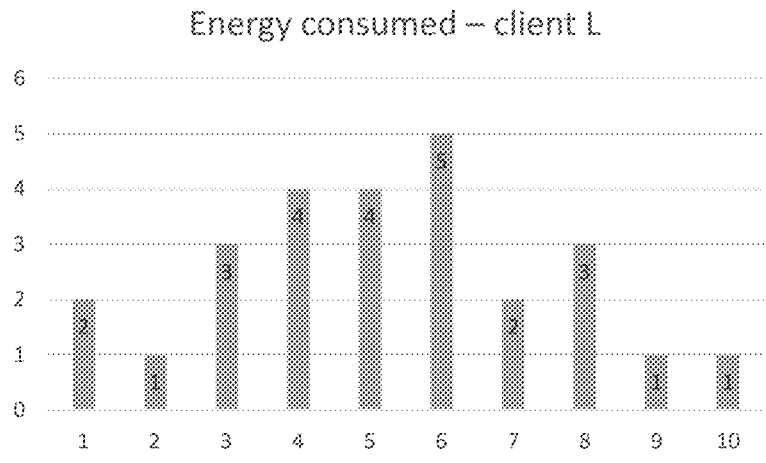
FIG. 53 illustrates one embodiment of an energy consumption profile for a client.
Figure 54:
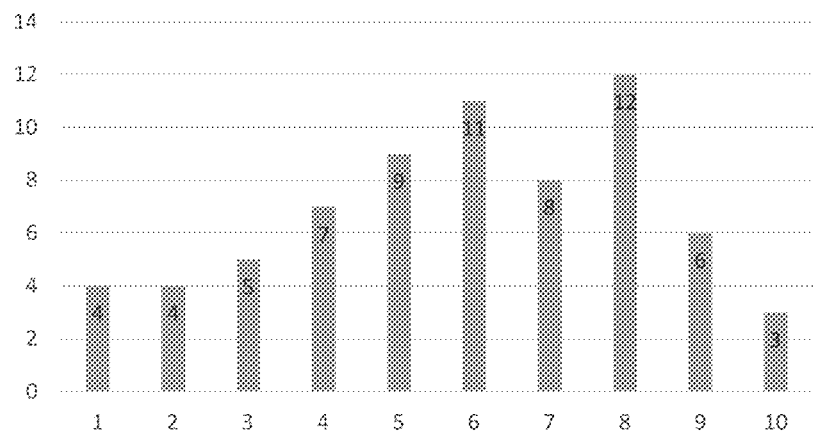
FIG. 54 shows the summation of the energy consumption profiles for clients within the same domain.
Figure 55:
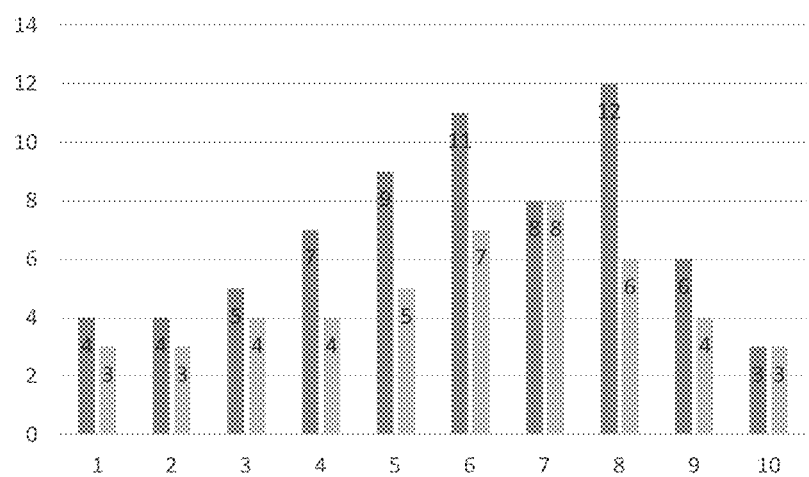
FIG. 55 shows a comparison between the summation of the energy consumption profiles of clients J, K, and L with the energy production of client A.
Figure 56:
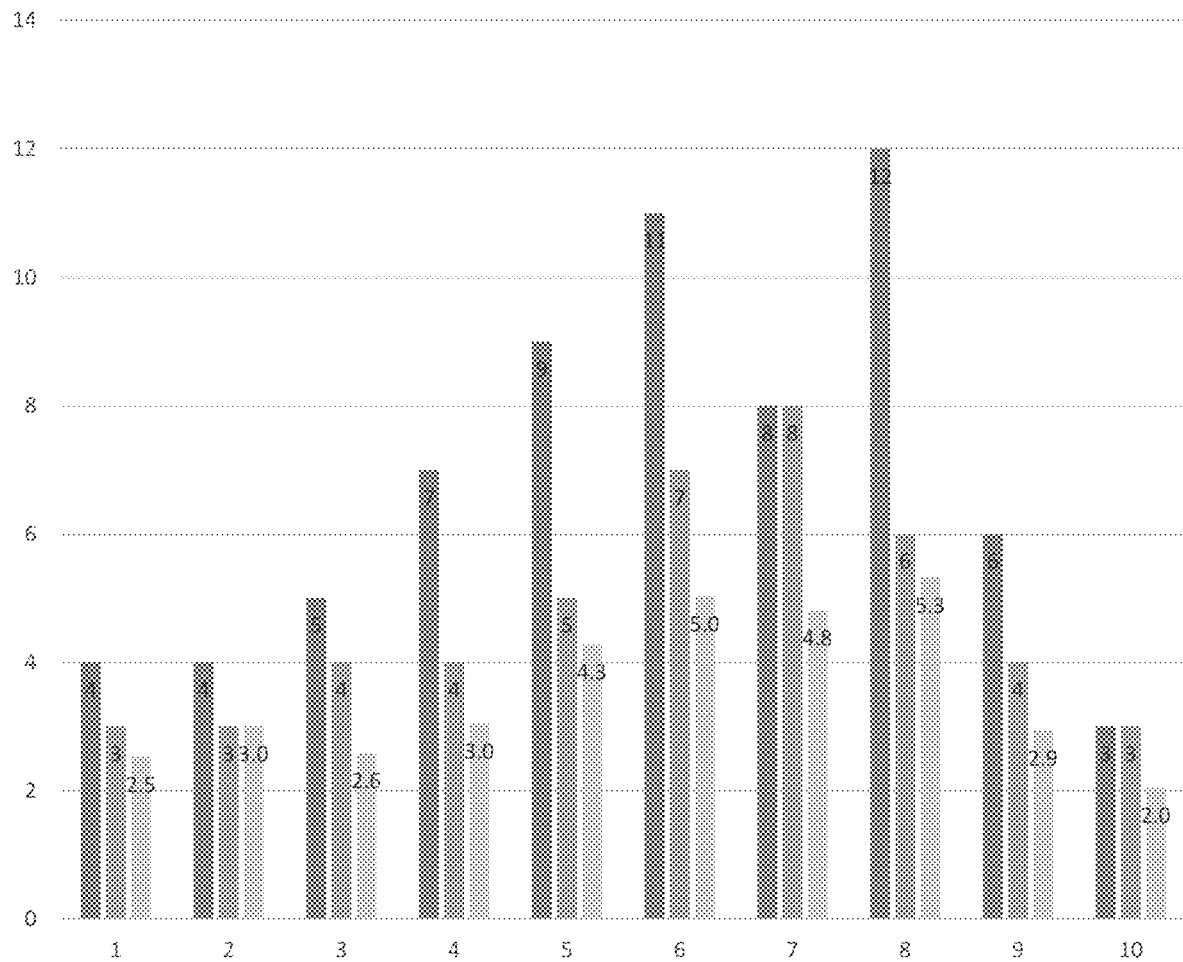
FIG. 56 shows a comparison between the summation of the energy consumption profiles of clients J, K, and L, the energy production of client A, and the target energy production to be achieved by client A.

FIG. 51 shows a sample energy consumption profile for client J. FIG. 52 shows a sample energy consumption profile for client K. FIG. 53 shows a sample energy Consumption profile for client L. FIG. 54 shows the total energy consumed by clients J, K, and L. FIG. 55 shows the total energy consumed by clients J, K, and L in the left bars and the energy produced by client A in the same periodic time windows in the right bars. FIG. 56 shows the aggregation values of energy consumed by clients J, K, and, L the energy production values of client A and the target values to be reached by producer client A. The target values to be reached by producer client A are computed as described below. The aggregation values of energy consumed by clients J, K, and, L are the left bars in each periodic time window. The energy production values of client A are the center bars in each periodic time window. The target values to be reached by producer client A are the right bars in each periodic time window.

In FIGS. 51-56, ten periodic time windows are shown in each graph marked 1 through 10. The energy consumed in each periodic time window is plotted on the x-axis of the bar graph and the value of energy consumed is plotted on the y-axis and is also noted at the top of each bar.

Consider, similar calculations for one of the energy-producing clients A when attempting to adjust its profile to match closely to the energy consumption profile of the domain it is in. The related Figures are shown in FIGS. 51-56.

The ratio of energy produced by client A, to the total energy produced in the domain is determined—

$$RP_A = EP_A / P_{dT}$$

In order to close the gap of energy production and energy consumption within the domain U, client A's energy production needs to be adjusted for each periodic time window. Client A, cannot adjust to the full gap in the domain, instead, client A can adjust to its proportional production in the time window. That is where the ratio for client A, RCA is used. As explained above, here each producer client is expected to adjust their production for the time windows to bridge the gap by producing energy to match the total energy consumed in the domain. The amount of adjustment needed for client A, for a given periodic time window is determined by the method described below:

The difference between the total energy produced and the total energy consumed in the domain by the clients is calculated (this does not count any energy movement through the link to the parent of the domain).

$$DCE_U = C_{dT} - P_{dT} \text{>this is the same as above.}$$

Amount of change to be made by client A for the periodic time window is calculated as follows—

$$dEP_A = RP_A \cdot DCE_U$$

Similarly, the change to be made by clients B and C for the periodic time window is—

$$dEP_B = RP_B \cdot DCE_U, \text{ and}$$

$$dEP_C = RP_C \cdot DCE_U$$

The damping factor, df, is used which produces the following equations—

$$dEP_A = df \cdot RP_A \cdot DCE_U$$

$$dEP_B = df \cdot RP_B \cdot DCE_U, \text{ and}$$

$$dEP_C = df \cdot RP_C \cdot DCE_U$$

The method explained above, is also applied to the higher-level domains until the topmost domain is reached. First energy profiles of the domains are created by propagating the energy values from the end leaf nodes up, just as shown in the topology in FIG. 30. Also, the sum of all the profiles of the lower level energy domains is created. Next, the amount of energy that needs to be adjusted to optimize energy use within the domain is calculated. The amount of energy that needs to be adjusted to optimize energy at the next higher domain is calculated by treating each lowest level domain as energy clients.

For domain level energy profile creation, we refer to the topology in FIG. 31. Energy profiles are created for domains DomDTA 610, DomDTB 620 and DomDTC 630. Then, an energy profile is created for the aggregate of the domains (similar to the aggregate profiles in FIGS. 48 and 54). Then, the appropriate ratios are determined as described above, for consumer and producer domains for the given periodic time window. From the end client node, such as RC1-RC6, the feedback value at the next level domain, is the cascaded multiplication of the ratios of the newly calculated ratio, with the ratio calculated at the lowest level for the end client as shown in FIGS. 36 and 41 for clients. This new ratio is then multiplied by the energy value at the domain level. Similarly, the damping factor df is also applied to avoid oscillation of the adjusted values. This process is repeated until the topmost domain is reached, and the ratios are multiplied in a cascaded fashion.

Figure 57:
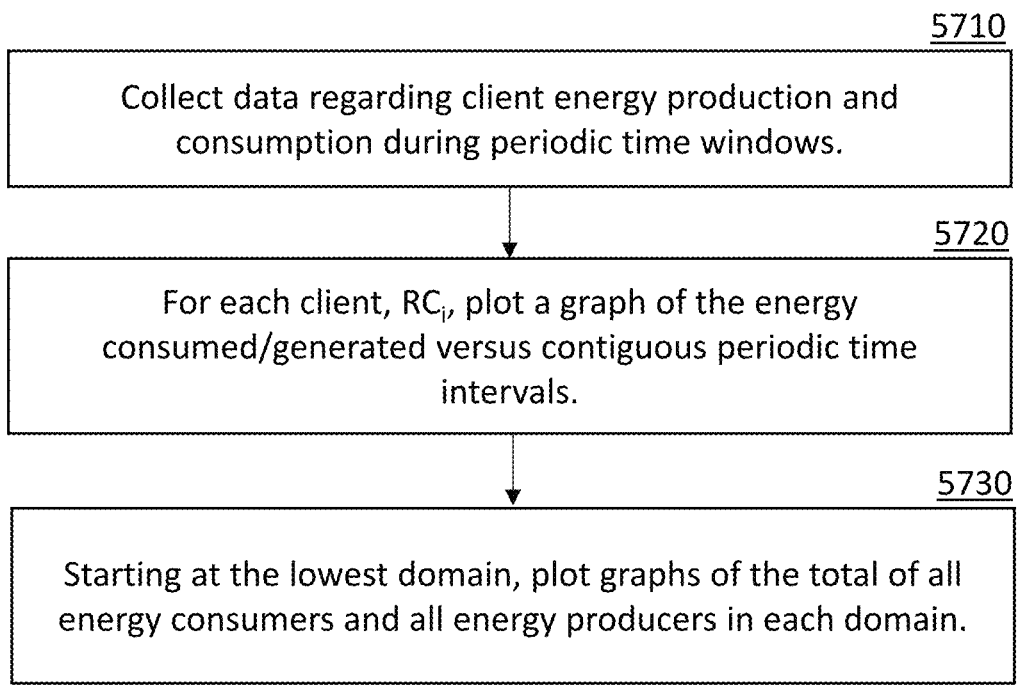
FIG. 57 illustrates the steps for plotting the profile or determining energy consumed or produced at each domain level for a periodic time interval.

FIG. 57 shows the method for creating energy profiles. At step 5710, collect data regarding client energy production and consumption during periodic time windows. At step 5720, for each client, $RC_i$, plot a graph or graphs along the y-axis indicating energy consumed or energy generated, versus contiguous multiple periodic time intervals along the x-axis. If $RC_i$ produces energy in the interval, then that value is termed as $RCP_i$. If $RC_i$ consumes energy, then that value is termed as $RCC_i$. See FIGS. 45, 46, 47, 51, 52 and 53. At step 5730, starting at the lowest domain, plot graphs of the total of all energy consumers and all energy producers in each domain. This corresponds to $P_{dT}$ and $C_{dT}$ as computed above. Plot energy produced by $RCP_i$ values together with $C_{dT}$, and $RCC_i$ values together with $P_{dT}$. This gives the correlation of energy produced/consumed by clients $RC_i$ in the domain with energy consumed/produced by other clients in the domain. Providing a mapped measure of energy creation and usage in the domain, and energy consumption and its source within that domain. See FIGS. 49 and 55.

Figure 58:
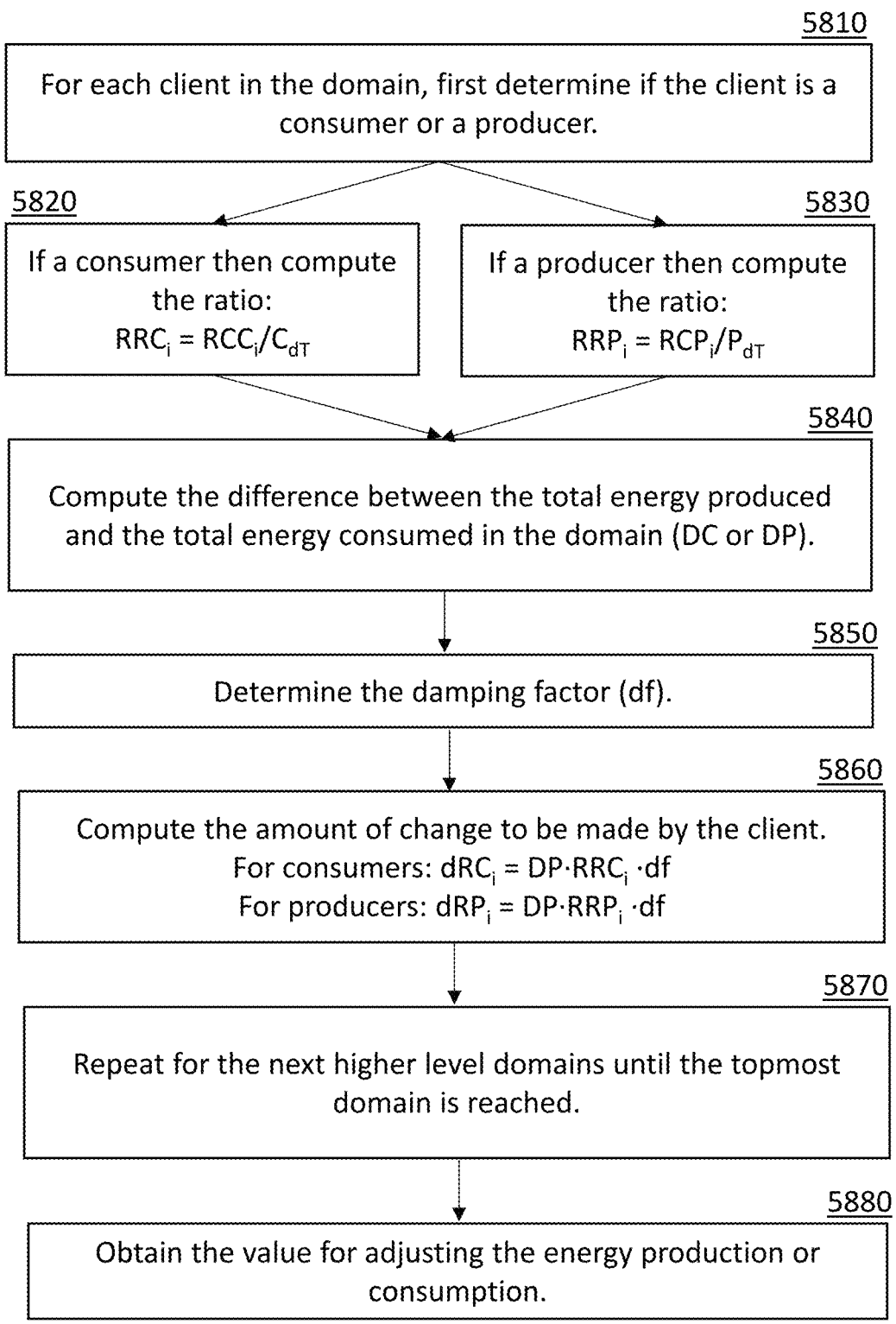
FIG. 58 illustrates the method for computing the target value of each client RCi either as an energy producer or as an energy consumer to optimally match the consumer needs or producer output, respectively.

FIG. 58 shows the method for creating optimum feedback profiles for target energy consumption. At step 5810, for each client $RC_i$ in the domain, first determine if the client is a consumer or a producer. At step 5820, if the client is a consumer of energy in the time window, then compute the ratio—RRCi=RCCi/CdT, where CdT is sum of consumers in that domain. At step 5830, if the client RCi is a producer of energy in the time window, then compute the ratio— RRPi=RCPi/PdT, where PdT is sum of producers in that domain. At step 5840, if the client is a consumer compute the difference or gap between total energy produced in the domain and total energy consumed in the domain— DP=PdT−CdT. If the client is a producer, compute the difference or gap between total energy consumed in the domain and total energy produced in the domain— DC=CdT−PdT. At step 5850 determine the damping factor, df. At step 5860, if the client is a consumer, the amount of change to be made by client RCi is—dRCi=DP·RRCi·df, where df is the damping factor. If the client is a producer, the amount of change to be made by client RCi is—dRPi=DC·RRPi·df, where df is the damping factor. See FIGS. 50 and 56.

At step 5870, the above process is repeated for the next higher level domains, by treating the lower child nodes as consumers or producers of energy and applying the same method as above. The ratio is calculated between one child node acting as producer or consumer, and the sum of energies of all other producers or consumers, respectively. This ratio is the multiplied by the ratio from the child node. This multiplied ratio is then used just as in the previous step. At step 5880, the value for adjusting the energy production or consumption is obtained by repeating the steps for the next higher level domains until the top level domain is reached, and the ratios are multiplied in a cascaded fashion to obtain the value for adjusting the energy production or consumption in the given time window.

Presentation to the End Node Clients the Profiles and Energy Adjustment Feedback Values For each end node client, its own energy profile together with the energy profiles of its domain, and all the domains higher up are presented. The suggested adjustment that needs to be made to optimize energy use is presented based on the method of calculations described above. The adjustments for the periodic time windows are presented for all domains for the end node client. The presentation can be in a display of graphical views, or numerical values or a combination of both.

The energy adjustment feedback values derived and presented to the end node clients may also be integrated into an end node controller device sitting behind the meter that can control the devices behind the meter. The controller device that sits behind the meter uses the feedback values to control the devices to achieve optimized use of energy within the domain. There may also be devices behind the meter that are intelligent that can corroborate with other devices behind the meter and coordinate energy usage or production without the need of a controller device behind the meter, to achieve optimized energy use.

Flexibility in Limiting the Domain Levels

The embodiment described here illustrates all possible domain levels with their hierarchy. However, in certain implementations, utility entities together with end node clients may decide to limit the domain hierarchy to fewer levels.

The least number of levels possible, would be one level, where the Distribution transformer and its attached end node clients would form the lowest level domain and no further domains are formed in the data structure. The one domain level need not be at the lowest Distribution transformer level. It could be one level higher at the Secondary Substation transformer level, where the clients connected to different Distribution transformers could be treated as being in the same local domain as the secondary substation transformer(s).

The same logic applies to breaking down the energy flows to constituent components of the flow and applying the pricing structure. In a situation with only one level of domain hierarchy, the pricing structure would appear binary. That means, from the end point of view of the node producer client, during a periodic time window, all energy consumed in the local domain would fetch the highest price, and any energy not used in the domain and pushed out would be treated as part of the grid and fetch a lower price.

Similarly, from the end node consumer client point of view during a given time window, all energy obtained from the local domain would cost less and any energy obtained from outside the domain would be treated as sourced from the grid and cost more.

Likewise, if two or more domain levels were to be used that were less than the all the possible domain levels, then they could each be at any level in the possibility of all the domain levels, and they also need not be contiguous. That means the two or more domain levels may be separated by any number of intermediate domain levels in the electrical topology.

Duration of Periodic Time Windows

Any reasonable duration of a periodic time window can be used without adversely impacting the implementation of the embodiment. If the duration of the periodic time windows is too small or too large then that may have negative impacts on the feedback values as has been explained above.

A 5-minute periodic time window has been used for the sake of explanation and as one possible embodiment. Any other reasonable value for the periodic time window such as 1, 10, 15, 30, 60, etc. minutes may also be used.

To illustrate a point regarding the periodic time windows for energy pricing and for creating energy profiles, let us consider the duration of the time window to be 5-minutes, where, every 5 minutes, all the metering devices at all the end node clients collect energy information during the periodic time window simultaneously. From a pricing point of view the 5-minute time window may be sufficient. Resulting in 288 time windows in a 24 hour period.

From the energy profile creation and energy production or consumption adjustment point of view, 288 samples per 24-hour period would be too many samples if the consumption and production will be adjusted manually. Assuming, manual adjustment, the shortest reasonable periodic time window would be 30, or 60 minutes. This would give 48 or 24 time slots in a 24-hour period. Note that the energy profile creation could still utilize 288 time slots. However, the periodic time windows for energy adjustment would be increased for the sake of practicality when production and consumption will be manually adjusted. The periodic time window for energy adjustment must be a multiple of the periodic time window used in energy pricing. For example, the 5-minute periodic time window for energy pricing can have periodic time windows of 10, 15, 30 or 60 minutes for energy adjustment.

Figure 59:
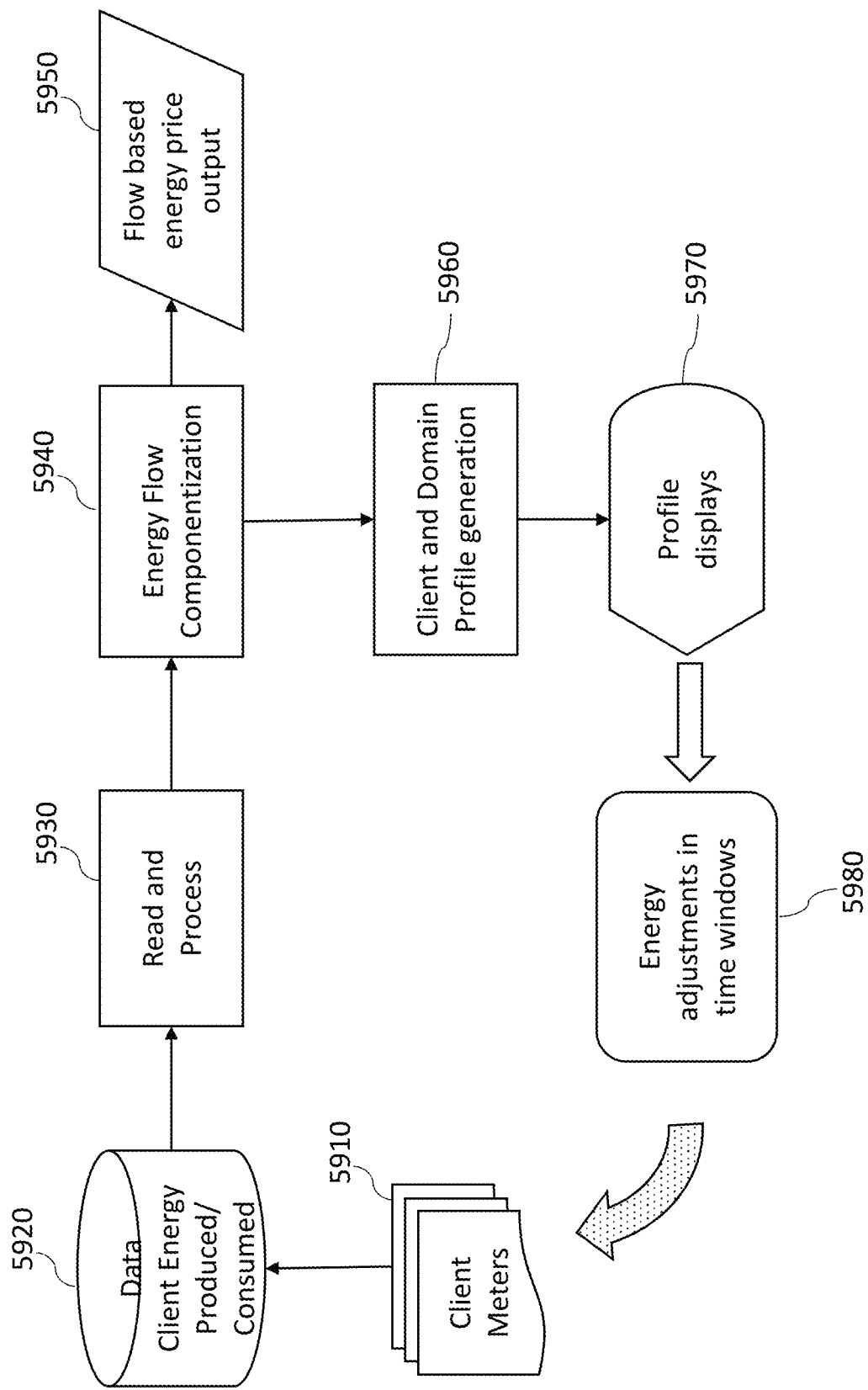
FIG. 59 illustrates by means of a flow chart an overview of the high-level computing process that has an effect on the energy price via client energy adjustments based on feedback mechanisms.

FIG. 59 illustrates by means of a flow chart an overview of the high-level computing process that has an effect on the energy price via client energy adjustments based on feedback mechanisms. At step 5910, client meters collect data on energy production and consumption. At step 5920, the data collected by the client meters is aggregated. At step 5930, the data is read and processed. At step 5940, energy flow componentization is calculated. At step 5950, flow based energy prices are generated. At step 5960, client and domain profiles are generated. At step 5970, the profile displays are generated and can be sent to a client device. At step 5980, energy adjustment feedback values are generated and sent to a client device. The process repeats any time that there is a change in production or consumption within a periodic time window.

A system that is processing the data and generating profiles, prices and feedback values may be a smart system that learns patterns and behaviors for each client node and uses that information to predict what future profiles, prices, and feedback values will be experienced at a client node.

In summary, the present inventive embodiments provide a method to optimize the price structure of energy based on the efficiency of the path of the flow of energy. The energy flow is split into components for individual pricing of each split flow based on the distance or impedance to be overcome by that portion of the energy flow. The concept of domains is created and mapped as tree data structures to create split flows of energy. The present inventive embodiments also provide a method for obtaining feedback values based on prior energy production or consumption behavior to adjust such energy production or consumption for maximum future revenue for the producer and minimum costs to the consumer. Such feedback for adjusting energy production or consumption allows adjustments to be made at the domain levels which in turn results in the adjustments in the proportion of the split flows. When the best adjustment is achieved, the portion of the energy with the most efficient energy transfer would be a larger component of the energy flow. In such a case, the client producing energy would receive a higher revenue for energy production. If it is a client consuming energy, the cost of energy would be lower for that client.

Although the method has been illustrated and described herein with reference to preferred embodiments and specific examples, it is understood that other embodiments and examples may perform similar functions and/or achieve like results. All such equivalent embodiments and examples are within the spirit and scope of and are contemplated by the present disclosure.

Example Embodiment

A method for reducing energy loss of an electric power grid, comprised of partitioning a digital representation of the electric power grid into multiple domains. Each domain includes a leaf node and a parent node, the parent node is a medium through which energy passes and includes a grid substation node, a substation node, or a transformer node. The leaf node is a node that consumes or produces energy and includes a storage node, a solar array node, an industrial client node or a residential client node, the leaf node having only one connection, the one connection connecting the leaf node to a parent node.

The domains are classified into a hierarchy of levels, each higher level is associated with additional parent nodes and leaf nodes connected to parent nodes and leaf nodes of a lower level, Data is received from multiple leaf nodes within a domain regarding energy consumption and energy production that is sampled in a periodic time window for each of the leaf nodes. Using the data received an energy profile is generated for a leaf node within a domain. An aggregate energy profile of the domain is also generated by aggregating energy profiles of the plurality of leaf nodes of the domain.

The energy profile of the leaf node is compared with the aggregate energy profile of the domain. Determine whether consumption of energy exceeds production of energy in the domain. Generate an energy adjustment feedback value for the leaf node for each periodic time window and provide the energy adjustment feedback value to the particular leaf node.

Generating the energy adjustment feedback value, if the leaf node is a consumer, comprises determining net energy consumed by the domain in the periodic time window, determining a net energy consumption ratio for the leaf node during the periodic time window by dividing an energy consumed by the leaf node during the periodic time window by the net energy consumed in the domain during the periodic time window; obtaining a damping factor for the leaf node; and multiplying the net energy consumed in the domain by the net energy consumption ratio by the damping factor.

Generating the energy adjustment feedback value if the leaf node is a producer, comprises determining a net energy produced in the domain in the periodic time window; determining a net energy production ratio for the leaf node during the periodic time window, by dividing an energy produced by the leaf node during the periodic time window by the net energy produced in the domain during the periodic time window; obtaining a damping factor for the leaf node; and multiplying the net energy produced in the domain by the net energy production ratio by the damping factor.

A higher level domain includes a leaf node and a parent node of a lower level domain and an additional parent node or an additional child node. A lower level domain is nested within a higher level domain. A first lower level domain and a second lower level domain are separate and distinct within a high level domain.

The energy profile for the domain can be graphically represented. The graphical representation can take on any suitable form including a two-dimensional graph, a bar graph, a pie graph, or a line graph.

Updating the energy profile and feedback values can be done by detecting a status change of the leaf node; sampling the energy consumption or production data of the leaf node during a periodic time interval associated with the status change; updating the energy profile for the leaf node; and generating new energy adjustment feedback values for the leaf node for each periodic time window; and providing the new energy adjustment feedback values to the leaf node.

Pricing of energy can also be affected by the feedback value. Based on the energy adjustment feedback value, determine a production price for energy produced at the leaf node and a consumption price for energy consumed at the leaf node. Dynamic pricing of energy can be provided to each leaf node based on impedances experienced by energy flows as the energy flows travel from a producer leaf node to a consumer leaf node.

The above method can also be performed by a system comprised of a processor; and memory storing instructions that, when executed by the processor, cause the system to perform the method described above.

The above method can also be performed by a computer program product comprised of a non-transitory computer-readable medium having computer program instructions stored therein. Execution of the computer program instructions by one or more computing devices causes the computing devices to: a processor; and memory storing instructions that, when executed by the processor, cause the processor to perform the method described above.

Figure 60:
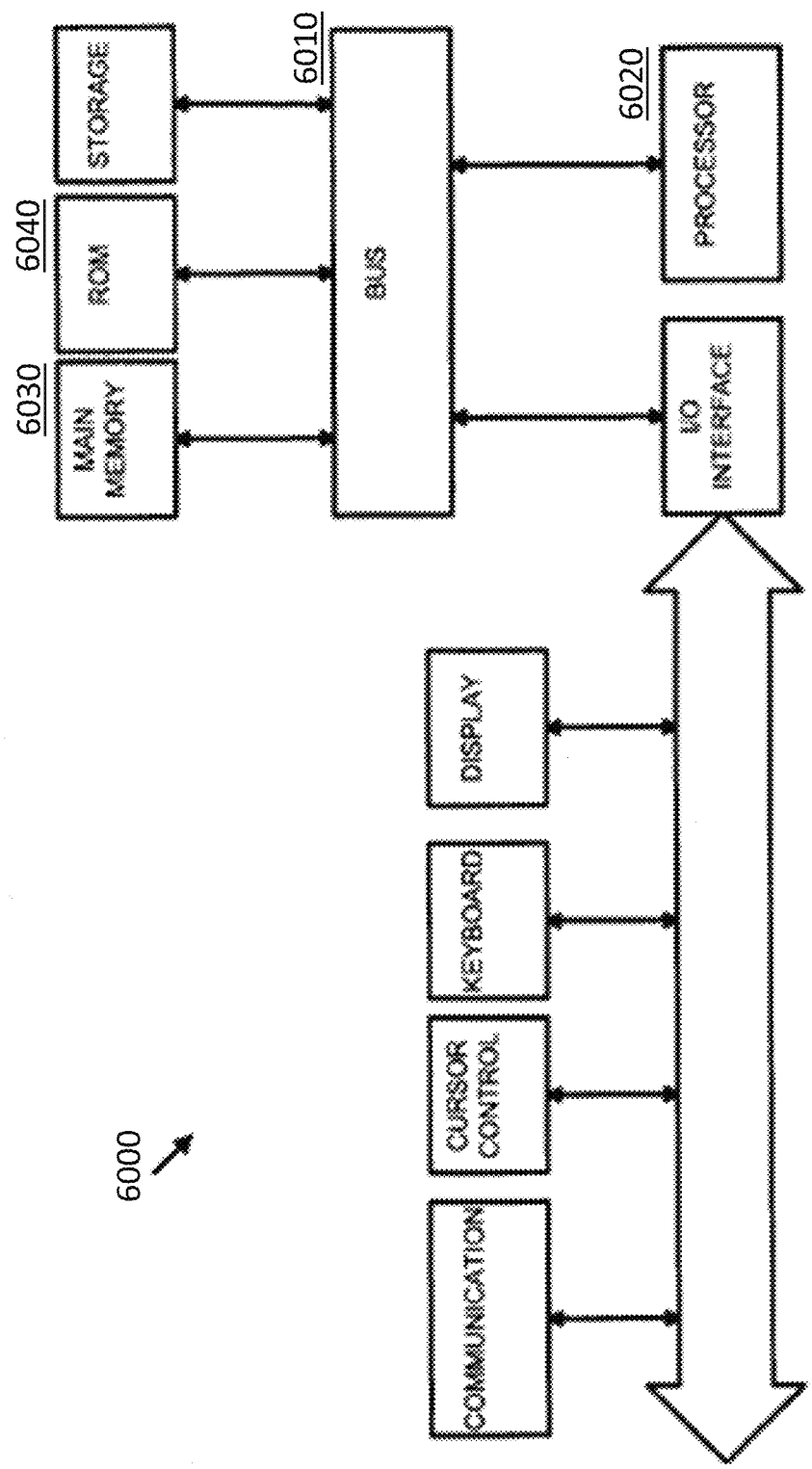
FIG. 60 illustrates an exemplary computer architecture for use with the present system, in accordance with some embodiments.

FIG. 60 illustrates an exemplary computer architecture for use with the present system, according to one embodiment. One embodiment of architecture 6000 comprises a system bus 6010 for communicating information, and a processor 6020 coupled to bus 6010 for processing information. Architecture 6000 further comprises a random access memory (RAM) or other dynamic storage device 6030 (referred to herein as main memory), coupled to bus 6010 for storing information and instructions to be executed by processor 6020. Main memory 6030 also may be used for storing temporary variables or other intermediate information during execution of instructions by processor 6020. Architecture 6000 also may include a read only memory (ROM) and/or other static storage device 6040 coupled to bus 6010 for storing static information and instructions used by processor 6020.

References in this specification to "an embodiment," "one embodiment," or the like mean that the particular feature, structure, or characteristic being described is included in at least one embodiment of the present disclosure. Occurrences of such phrases in this specification do not necessarily all refer to the same embodiment.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

I claim:

1. A method for reducing energy loss of an electric power grid, the method comprising:
partitioning a digital representation of the electric power grid into a plurality of domains,
wherein each domain includes a leaf node and a parent node,
wherein the parent node is a medium through which energy passes including a grid substation node, a substation node, or a transformer node, and wherein the leaf node is a node that consumes or produces energy including a storage node, a solar array node, an industrial client node or a residential client node, the leaf node having only one connection, the one connection connecting the leaf node to a parent node;

classifying the plurality of domains into a hierarchy of levels, wherein each higher level is associated with additional parent nodes and leaf nodes connected to parent nodes and leaf nodes of a lower level,
wherein energy flows among a plurality of nodes in each domain experience increased impedance when crossing a domain boundary;

receiving data from a plurality of leaf nodes within a particular domain in the hierarchy of levels, the received data containing energy consumption data and energy production data sampled in a periodic time window for each leaf node of the plurality of leaf nodes;

generating an energy profile for a particular leaf node based on the received data, the particular leaf node belonging to the particular domain;

generating an aggregate energy profile of the particular domain by aggregating energy profiles of the plurality of leaf nodes of the particular domain;

comparing the energy profile of the particular leaf node with the aggregate energy profile of the particular domain;

determining, based on the comparison, whether consumption of energy exceeds production of energy of the particular domain;

generating an energy adjustment feedback value for the particular leaf node for each periodic time window,
wherein generating the energy adjustment feedback value further comprises:
determining a net energy consumed by the particular domain in the periodic time window,
determining a net energy consumption ratio for the particular leaf node during the periodic time window by dividing an energy consumed by the particular leaf node during the periodic time window by the net energy consumed in the particular domain during the periodic time window,
obtaining a damping factor for the particular leaf node, and
multiplying the net energy consumed in the particular domain by the net energy consumption ratio by the damping factor; and providing the energy adjustment feedback value to the particular leaf node.

2. The method of claim 1, wherein generating the energy adjustment feedback value further comprises:
determining a net energy produced in the particular domain in the periodic time window;
determining a net energy production ratio for the particular leaf node during the periodic time window, by dividing an energy produced by the particular leaf node during the periodic time window by the net energy produced in the particular domain during the periodic time window;
obtaining a damping factor for the particular leaf node; and
multiplying the net energy produced in the particular domain by the net energy production ratio by the damping factor.

3. The method of claim 1, wherein the hierarchy of levels comprises:

a higher level domain includes a leaf node and a parent node of a lower level domain and an additional parent node or an additional child node.

4. The method of claim 1, wherein a lower level domain is nested within a higher level domain.

5. The method of claim 1, wherein a first lower level domain and a second lower level domain are separate and distinct within a higher level domain.

6. The method of claim 1, wherein the energy profile for the particular domain is graphically represented.

7. The method of claim 6 wherein graphical representation of the energy profile for the particular domain comprises:
a two-dimensional graph,
a bar graph,
a pie graph, or
a line graph.

8. The method of claim 1 further comprising:
detecting a status change of the particular leaf node;
sampling the energy consumption or production data of the particular leaf node during a periodic time interval associated with the status change;
updating the energy profile for the particular leaf node; and
generating new energy adjustment feedback values for the particular leaf node for each periodic time window; and
providing the new energy adjustment feedback values to the particular leaf node.

9. The method of claim 1 further comprising:
based on the energy adjustment feedback value, determining a production price for energy produced at the particular leaf node and a consumption price for energy consumed at the particular leaf node.

10. The method of claim 1 further comprising:
providing dynamic pricing of energy to each leaf node based on impedances experienced by energy flows as the energy flows travel from a producer leaf node to a consumer leaf node.

11. A system comprising:
a processor; and
memory storing instructions that, when executed by the processor, cause the system to:
partition a digital representation of an electric power grid into a plurality of domains wherein each domain includes a leaf node and a parent node;
wherein the parent node is a medium through which energy passes including a grid substation node, a substation node, or a transformer node; and
wherein the leaf node is a node that consumes or produces energy comprising a storage node, a solar array node, an industrial client node or a residential client node, the leaf node having only one connection, the one connection connecting the leaf node to a parent node;
classify the plurality of domains into a hierarchy of levels, wherein each higher level is associated with additional parent nodes and leaf nodes connected to parent nodes and leaf nodes of a lower level;
wherein energy flows among a plurality of nodes in each domain experience increased impedance when crossing a domain boundary;
receive data from a plurality of leaf nodes within a particular domain in the hierarchy of levels, the data containing energy consumption data and energy production data sampled in a periodic time window for each leaf node of the plurality of leaf nodes;

generate an energy profile for a particular leaf node based on the data received, the particular leaf node belonging to the particular domain;

generate an aggregate energy profile of the particular domain by aggregating energy profiles of the plurality of leaf nodes within the particular domain;

compare the energy profile of the particular leaf node with the aggregate energy profile of the particular domain;

determine, based on the comparison, whether consumption of energy exceeds production of energy within the particular domain;

generate energy adjustment feedback values for the particular leaf node for each periodic time window; and wherein to generate the energy adjustment feedback values further comprises causing the system to:

determine a net energy consumed by the particular domain in the periodic time window, determine a net energy consumption ratio for the particular leaf node during the periodic time window, by dividing an energy consumed by the particular leaf node during the periodic time window by the net energy consumed in the particular domain during the periodic time window, obtain a damping factor for the particular leaf node, and multiply the net energy consumed in the particular domain by the net energy consumption ratio by the damping factor; and provide the energy adjustment feedback values to the particular leaf node.

12. The system of claim 11, wherein to generate the energy adjustment feedback values further comprises causing the system to:

determine a net energy produced in the particular domain in the periodic time window;

determine a net energy production ratio for the particular leaf node during the periodic time window, by dividing an energy produced by the particular leaf node during the periodic time window: by the net energy produced in the particular domain during the periodic time window;

obtain a damping factor for the particular leaf node; and multiply the net energy produced in the particular domain by the net energy production ratio by the damping factor.

13. The system of claim 11 further caused to:

detect a status change of the particular leaf node;

sample the energy consumption or production data of the particular leaf node during a periodic time interval associated with the status change;

update the energy profile for the particular leaf node;

generate new energy adjustment feedback values for the particular leaf node for each periodic time window; and provide the new energy adjustment feedback values to the particular leaf node.

14. The system of claim 11 further caused to:

use the energy adjustment feedback values to determine a production price for energy produced at the particular leaf node and a consumption price for energy consumed at the particular leaf node.

15. A computer program product comprising a non-transitory computer-readable medium having computer program instructions stored therein, execution of which by one or more computing devices causes the one or more computing devices to:

a processor; and memory storing instructions that, when executed by the processor, cause the processor to:

partition a digital representation of an electric power grid into a plurality of domains wherein each domain includes a leaf node and a parent node;

wherein the parent node is a medium through which energy passes including a grid substation node, a substation node, or a transformer node;

wherein the leaf node is a node that consumes or produces energy comprising a storage node, a solar array node, an industrial client node or a residential client node, the leaf node having only one connection, the one connection connecting the leaf node to a parent node;

classify the plurality of domains into a hierarchy of levels, wherein each higher level is associated with additional parent nodes and leaf nodes connected to the parent nodes and leaf nodes of a lower level;

wherein energy flows among a plurality of nodes in each domain experience increased impedance when crossing a domain boundary;

receive data from a plurality of leaf nodes within a particular domain in the hierarchy of levels, the data containing energy consumption data and energy production data sampled in a periodic time window for each leaf node of the plurality of leaf nodes;

generate an energy profile for a particular leaf node based on the data received, the particular leaf node belonging to the particular domain;

generate an aggregate energy profile of the particular domain by aggregating energy profiles of the plurality of leaf nodes within the particular domain;

compare the energy profile of the particular leaf node with the aggregate energy profile of the particular domain;

determine, based on the comparison, whether consumption of energy exceeds production of energy within the particular domain;

generate energy adjustment feedback values for the particular leaf node for each periodic time window, wherein to generate the energy adjustment feedback values causes the one or more computing devices to:

determine a net energy consumed by the particular domain in the periodic time window, determine a net energy consumption ratio for the particular leaf node during the periodic time window, by dividing an energy consumed by the particular leaf node during the periodic time window by the net energy consumed in the particular domain during the periodic time window, obtain a damping factor for the particular leaf node, and multiply the net energy consumed in the particular domain by the net energy consumption ratio by the damping factor; and provide the energy adjustment feedback values to the particular leaf node.

16. The computer program product of claim 15, wherein to generate the energy adjustment feedback values causes the one or more computing devices to:

determine a net energy produced in the particular domain in the periodic time window;

determine a net energy production ratio for the particular leaf node during the periodic time window, by dividing an energy produced by the particular leaf node during the periodic time window by the net energy produced in the particular domain during the periodic time window;

obtain a damping factor for the particular leaf node; and multiply the net energy produced in the particular domain by the net energy production ratio by the damping factor.

17. The computer program product of claim 15 further causes the one or more computing devices to:
detect a status change of the particular leaf node;
sample the energy consumption or production data of the particular leaf node during a periodic time interval associated with the status change;
update the energy profile for the particular leaf node;
generate new energy adjustment feedback values for the particular leaf node for each periodic time window; and
provide the new energy adjustment feedback values to the particular leaf node.

* * * * *